US006031545A

United States Patent [19]
Ellenby et al.

[11] Patent Number: 6,031,545
[45] Date of Patent: Feb. 29, 2000

[54] VISION SYSTEM FOR VIEWING A SPORTING EVENT

[75] Inventors: John Ellenby; Thomas Ellenby; Peter Ellenby, all of La Jolla, Calif.

[73] Assignee: Geovector Corporation, San Francisco, Calif.

[21] Appl. No.: 09/007,558

[22] Filed: Jan. 15, 1998

Related U.S. Application Data

[63] Continuation-in-part of application No. 08/119,360, Sep. 10, 1993, Pat. No. 5,815,411.

[51] Int. Cl.[7] ...................................................... G06F 15/00
[52] U.S. Cl. ............................................................. 345/435
[58] Field of Search ..................................... 345/419, 435, 345/425, 427, 428, 113, 114

[56] References Cited

U.S. PATENT DOCUMENTS 5,798,761  8/1998  Isaacs ........................................ 345/419
5,933,146  8/1999  Wrigley .................................... 345/426

*Primary Examiner*—Phu K. Nguyen
*Attorney, Agent, or Firm*—Page Lohr

[57] ABSTRACT

The systems combine images of a real scene with computer generated imagery where the computer generated imagery is particular to the position and pointing attitude of the device. Being useful to spectators of the game baseball, the device can produce images showing where a strike zone is relative to the position of the players; can produce images of ball tracks; of replays and many other forms of information having characteristics dependent on a viewer's position and attitude.

10 Claims, 95 Drawing Sheets

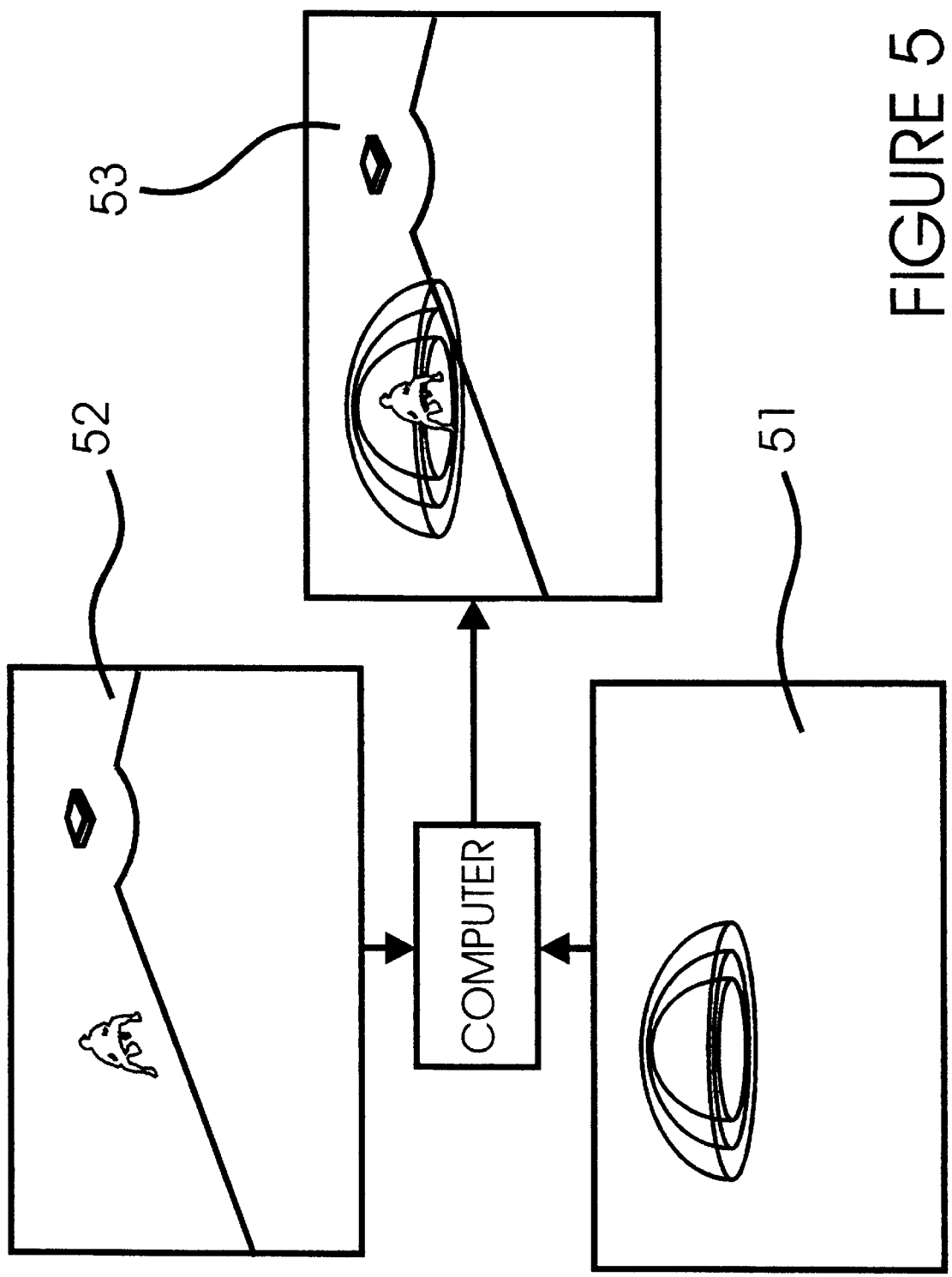

Game Mode
Setup
Save Setup
Level 6

**Game Mode
Offense
Graphics
Default
Level 6**

Pitch Location Key

As viewed by the catcher
- - - - = Strike Zone

**Game Mode
Pitching
Graphics
Default
Level 6**

Post-Game Mode
Main Menu Options
Input Location

VISION SYSTEM FOR VIEWING A SPORTING EVENT

This application is a continuation-in-part of a previously filed application having a Ser. No. of 08/119,360 filed on Sep. 10, 1993, now U.S. Pat. No. 5,815,411 issued Sep. 29, 1998.

BACKGROUND OF THE INVENTION

The instant invention is generally concerned with an electro-optic vision system which exploits knowledge of position and attitude to display information in a perspective unique to that position and attitude, and is specifically concerned with a vision system for use in a sporting event to view various features associated with the game from a users perspective. This disclosure relies on the teachings of the above-identified application therefore the entire content of that application is incorporated herein by reference. As preferred embodiments are directed to the specific game of baseball and many references are made thereto, the "Rules of Baseball" as set forth by the Commissioner of Baseball are assumed to be well known by those familiar with the art. It should be understood that all of the herein referenced materials are provide considerable definition of elements and features of the present invention.

Currently, electronic devices to aid in the comprehension and understanding of the game of baseball are being tested in stadium environments. Particularly, a device called "SportsTrax" made by Motorola is being tested at the Toronto Blue Jays games. Users can program an audible alerts that indicate the end of an inning, a run scored, a home run, and when a rally is taking place. If an opposing player belts one out, a crying sound is heard. Because data is entered from the press box and transmitted to users after a two minute delay, the usefulness is limited for spectators present at the game. The technology is crude and has been adapted from the pager technologies known in messaging arts. Whereas baseball is a fascinating sport with great opportunities of pleasure for spectators in attendance at the game, systems of the present invention are configured to enhance visual aspects of the game.

SUMMARY OF THE INVENTION

Comes now, an invention of a vision system including devices and methods wherein a computer generated image is merged with an image of a real scene such that a composite image is presented in proper perspective and aligned to the real scene as the scene is viewed from the location of the user. Devices of the invention being primarily characterized by having a camera for collecting an image, a computer, a data store which is responsive to a position determining means and an attitude determining means, and a display for presenting an augmented image to a user.

A camera can be used to form an electronic image of a particular scene of interest, the image having the identical perspective as the scene would appear to have to a person viewing the scene without a vision aid. Using image processing routines, a computer can be used to manipulate the electronic image before it is presented at a display. The original image may be altered according to many known technologies such as color enhancement, edge improvements, anti-vibration schemes, etc., but more importantly, the original image may be augmented with information from a data store where the information is particular to the scene being addressed as defined by the position and attitude of the vision system. Information is arranged by the computer to appear in the proper perspective and is combined with the image of the real scene. The information which relates to the scene can be embodied in many forms, but is generally related to certain spatial features of the scene. It is critical to note that the information relates to a particular scene, and is merged with a real electronic image of the scene by a computer such that the perspective of the displayed information corresponds to the user's perspective and is aligned to the scene being addressed.

Some types of information that may be merged with an image of a real scene being addressed include historic, statistical, symbolic, abstract symbolic, action tracks, histogram of action tracks, computer graphical user interface devices. Each of these types, can be combined with an image of a real scene in a spatially dependent fashion to contribute to further understanding of the scene being addressed. We call the composite image that has been augmented with information from memory: "Augmented Reality". To present a basic understanding of the various information types, a simple example of some of them follows; a complete and detailed explanation appears in the detailed description portion of this disclosure. Images of real scenes can be combined with recordings of images and image series from past times which share same or similar spatial features of present scenes. A real scene can be improved by inserting statistical information relating to spatial features of the scene. Symbols to represent otherwise invisible image features of a scene can be added in appropriate locations. Similarly, symbols to represent abstract geometrical features such as property lines or planar boundaries can also be added to real images. Motion can be illustrated by highlighting a path across a scene to show where a moving object has traveled. When an object takes a similar path in a series of related motions, a history of those paths can be presented together to form a histogram type plot. As with many computer systems, user inputs can be via a computer graphical user interface means such as "windows", "point and click", "click and drag". A special form of window we call a "Panel" is used in some versions of the invention. Panels are used for user interface and are sometimes related to spatial features of a scene.

Although many sporting events have a large spectator participation, the present disclosure is directed to the particular features of baseball. It will be easily appreciated that the devices and methods taught here can apply to other sports without deviation from the spirit of the invention. A better understanding can be had with reference to the detailed description, preferred embodiments and the appended drawings. These embodiments represent particular ways to realize the invention and are not inclusive of all ways possible to benefit from the invention. Therefore, there may exist embodiments that do not deviate from the scope and spirit of the invention as set forth by the claims, but do not appear here as specific examples.

Wherefore the demands are high, the invention answers those demands with the following objects:

It is a primary object of the invention to provide a vision system for augmenting real images.

It is also an object of the invention to provide a vision system operable for combining computer generated images with real images where the computer generated images are presented in a perspective which corresponds to the user's perspective of a scene being addressed and further being aligned to the scene being addressed.

It is a further object to provide a vision system which combines the electronic image from a camera with information recalled from a data store where the information from the data store is particular to the position and attitude of the camera.

It is another primary object of the invention to provide a vision system for use in sporting events such as baseball.

It is a further object of the invention to provide a vision system for viewing a live baseball game where images from the game are augmented with a computer.

To arrive at these and other objects, features and advantages, devices having:

an electro-optic vision system for viewing a sporting event comprising: a camera for producing an electronic image of a scene being addressed, position and attitude determining means for determining the position and attitude of the camera, a data store responsive to the outputs of said position and attitude determining means and having information stored therein, computer operable for combining the stored information with the electronic image to produce an augmented image, and an electro-optic display operable for displaying the augmented image;

and methods having the steps of:

producing an electronic image of a real scene with a imaging device, determining the position and attitude of the imaging device, recalling information from a data store which depends on the position and attitude of the imaging device, augmenting the electronic image with the information from the data store, are provided.

BRIEF DESCRIPTION OF THE DRAWINGS

The features, aspects, and advantages of the present invention will become better understood with regard to the following description, appended claims and drawings where:

FIG. 5 shows an image of a real scene and a computer generated image combined to form a composite image;

DETAILED DESCRIPTION AND PREFERRED EMBODIMENTS OF THE INVENTION

Figure 1:
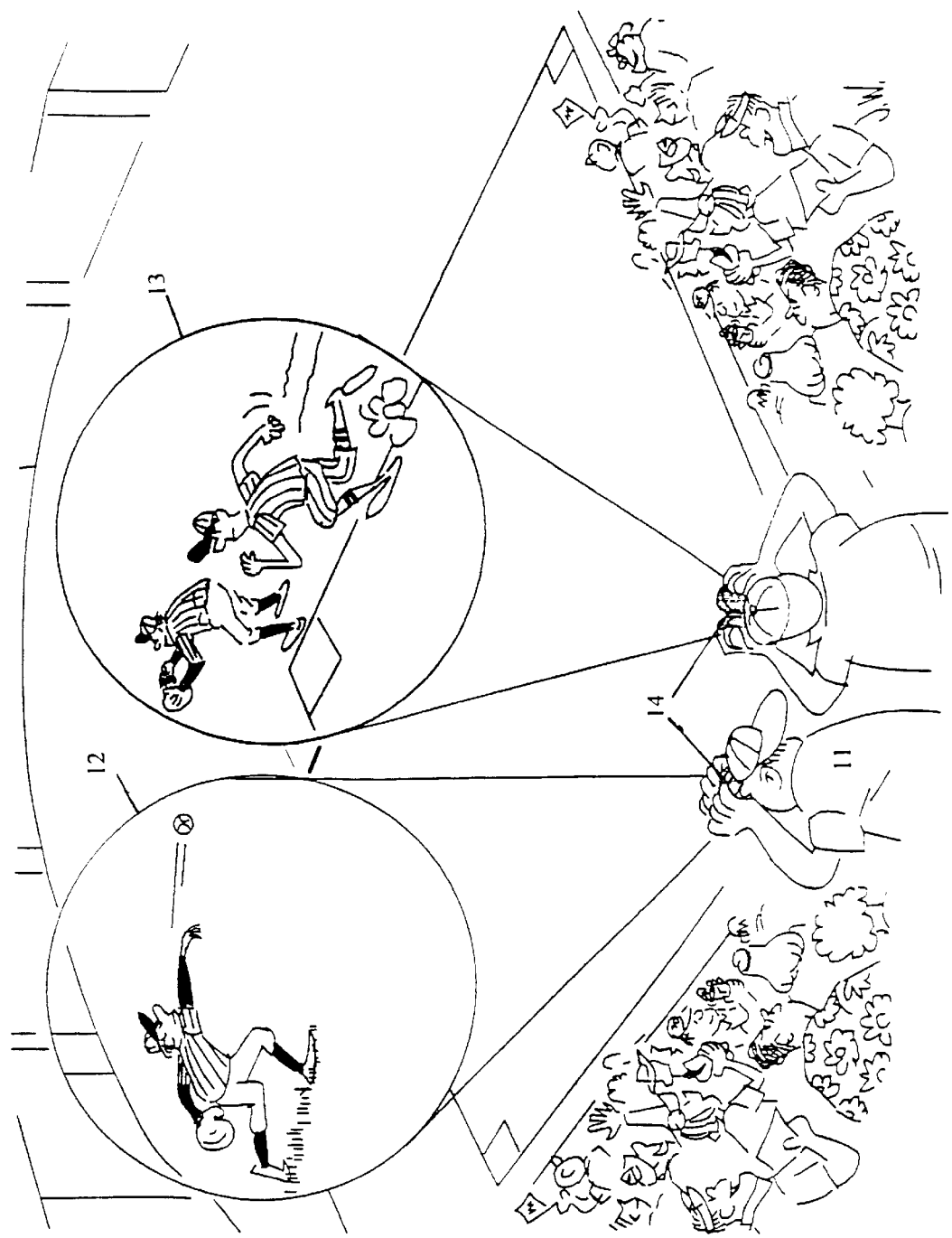
FIG. 1 is scenario showing baseball fans viewing a game through systems of the invention.
Figure 2:
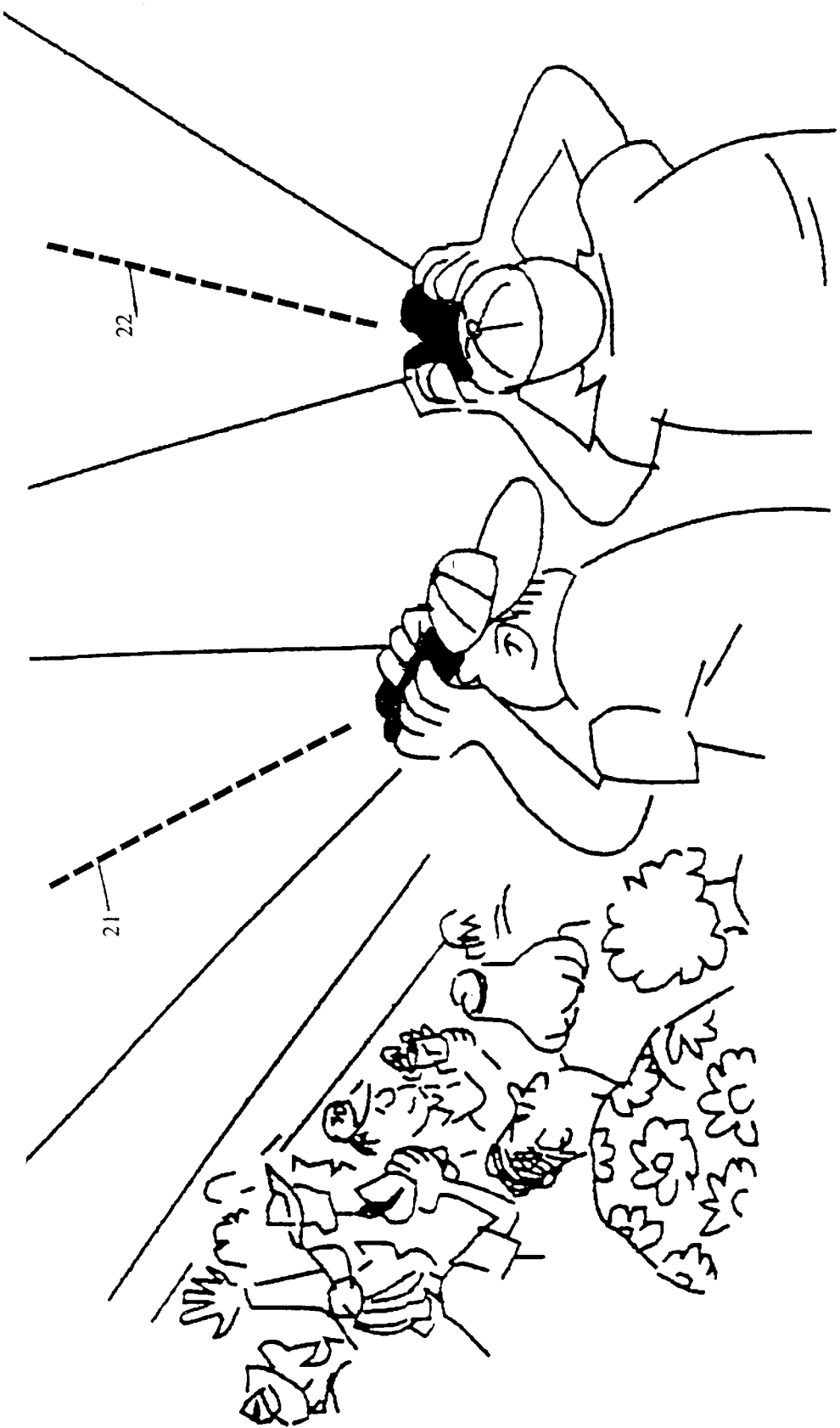
FIG. 2 is a close-up showing the augmented images of FIG. 1.
Figure 3:
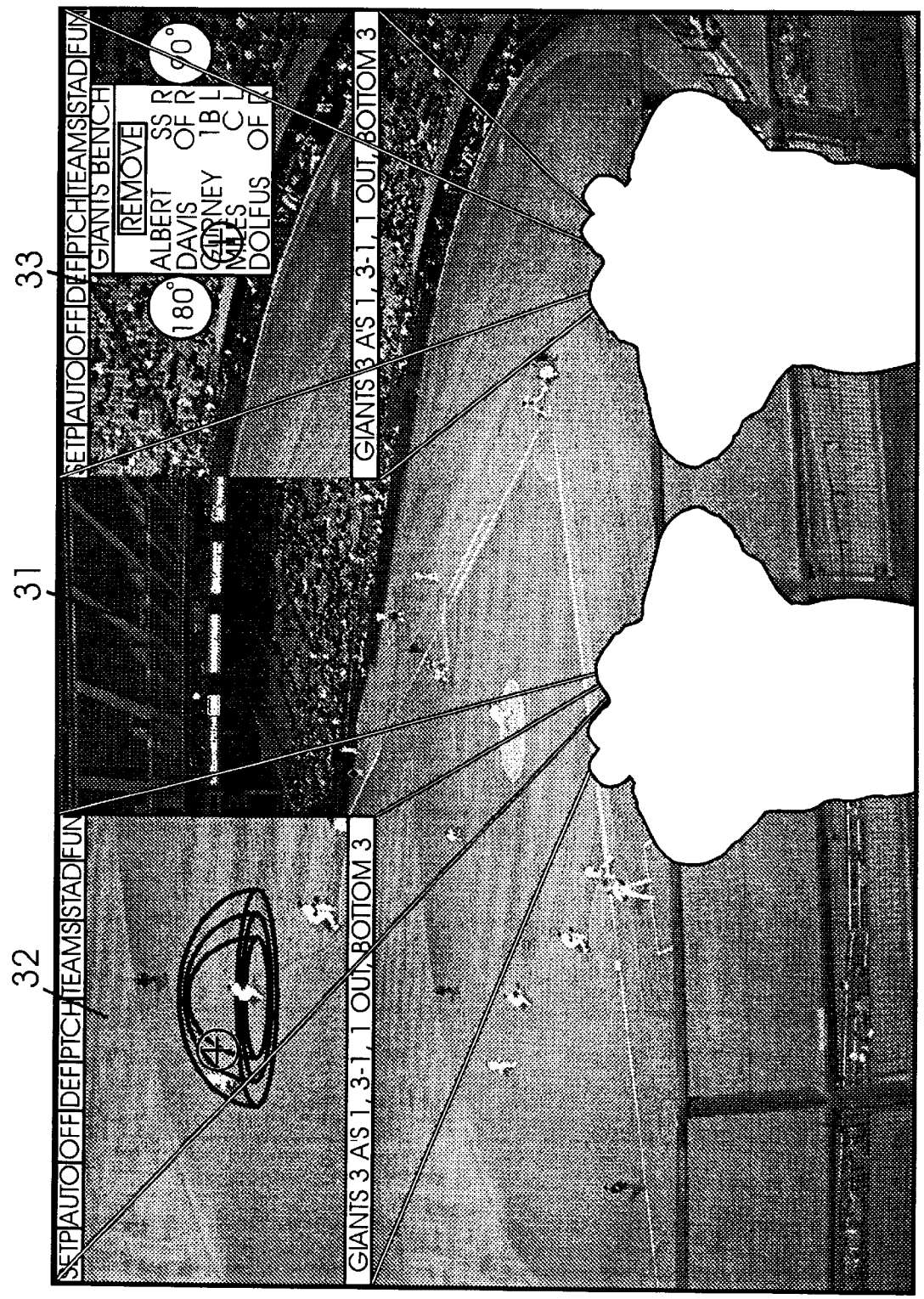
FIG. 3 is an image of a baseball field and two composite images as viewed by two users.
Figure 4:
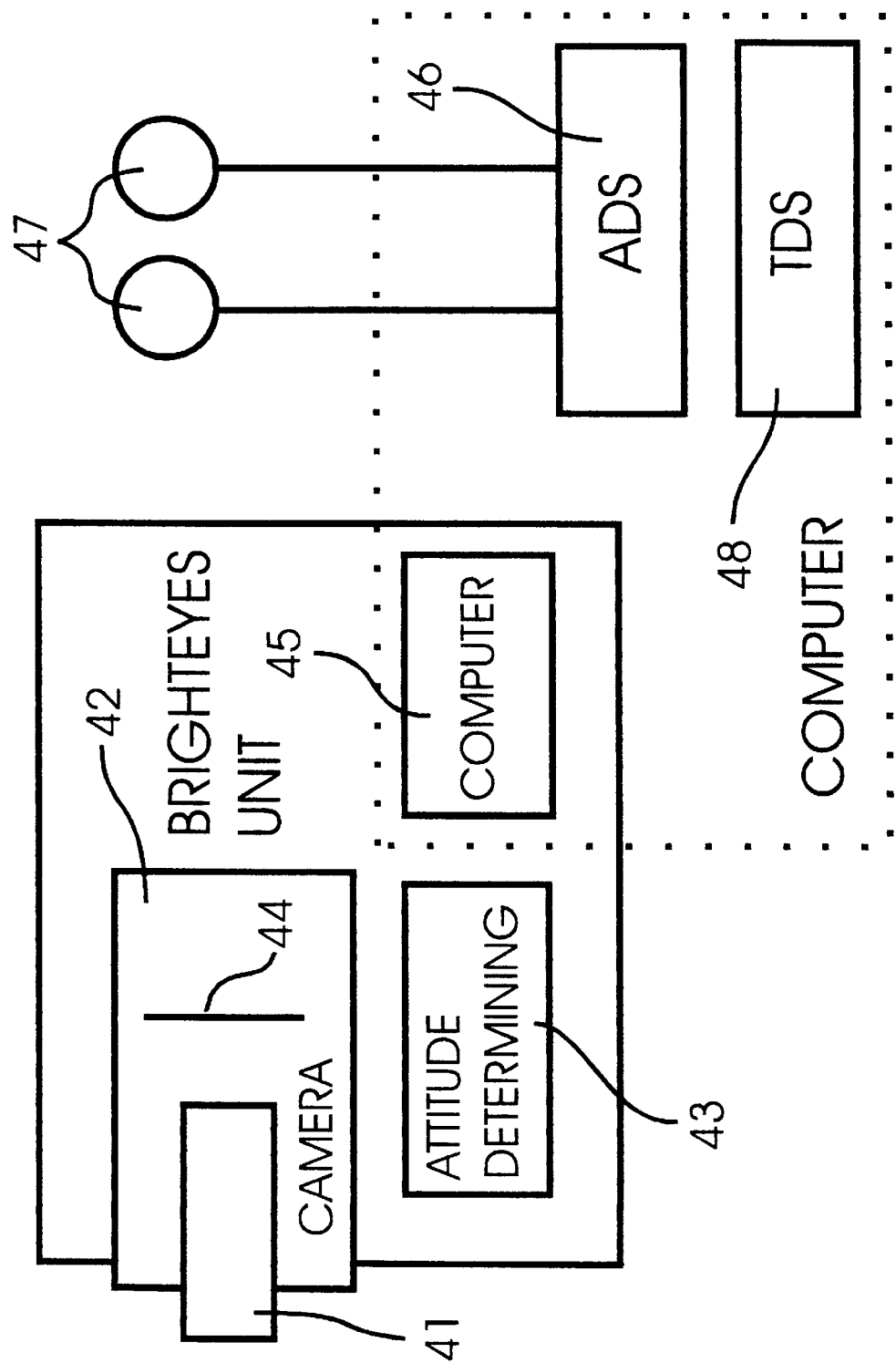
FIG. 4 is a block diagram of a version of the invention.

The baseball system is a dynamic, innovative system that allows a fan to observe things they otherwise couldn't see, understand things they might not otherwise comprehend, and greatly enrich the game experience. The system exploits data related to the user's position and orientation to generate graphics that are combined with real images derived directly from a real world view. Using this system, the user would be able to see and, in some cases, interact with graphical representations that allow the user to see things that are not there or are obstructed. The system may have various elements in communication with each other where each element may be located remotely from one or more of the other elements. An important element of the system is a hand held instrument which the user interacts with is sometimes herein called a "Brighteyes" unit or "hand held unit". Similar in size and weight to an electronic camcorder, it is generally in communication with remote computers and also has some computing facilities therein. FIG. 1 shows two fans 11 in a similar location within the stadium but looking in different directions. The scene that a first fan might see is an outfielder throwing a ball 12. The scene the second fan may be viewing is the play at second base 13. It is fundamental to the invention that the system recognize what scene is being addressed. To accomplish this, the hand held device 14 has a reference viewing axis associated with it. The pointing direction of this viewing axis of the first fan's unit 21 is pointing in a different direction than the viewing axis of the second fan's unit. The unit has a facilities to determine the pointing direction of the unit. The position of the fans within the stadium is also measurable. Having position and attitude measurements, a computer can determine what scene is being addressed by each fan. The computer can then respond by augmenting an electronic image made with a camera with information generated by a computer in accordance with the position and attitude measurements.

System Hardware Configurations

For baseball, or similar applications, a "Brighteyes" unit 14 is supported by data services that are accessed by wireless means. Suitable radios, with repeaters if required, are commercially available. The radio provides communication between the Brighteyes unit and larger computer systems having larger computing and memory capacity. There could be a large number of users present at the baseball park and that these users could be making simultaneous use of Brighteyes systems. To support this large number of users, the radio communication system may operate by broadcasting some information. We divide the computer into sub-systems based on function. A broadcasting sub-system is herein called an "Action Data System 46". Certain computer requests and services would also be available on a single user request basis. Single user requests are handled by a "Transaction Data System 48".

Therefore, in preferred versions there are three computer sub-systems: a first which is a battery operated Brighteyes unit held by a user; a second which is called an Action Data System 46, a computer sub-system required to track and broadcast the position of the ball and all the players, managers, umpires and coaches involved in the play to the Brighteyes units; and a third which is called a Transaction Data System 48, a computer sub-system that provides statistics, information and other services on a broadcast or request basis to the Brighteyes units. Each of these computer sub-systems may be in communication with one or each of the others.

Brighteyes Hand Held Units

Best versions of the hand held battery operated Brighteyes unit contain: an input lens assembly 41 with auto focus and zoom and a color CCD 44 whereby real images are acquired; an attitude sensing system 43 that provides information on the pointing direction of the Brighteyes unit; user input keys whereby the user of the Brighteyes unit may interact with or input information to the unit; a two way radio whereby the Brighteyes unit may interact with and receive information from, and give information to, remote computers and other Brighteyes units; a pair of color liquid crystal displays with viewing lens assemblies such that the output images may be observed by the user of the Brighteyes unit; a computer that has access to: the video stream from the electronic camera assembly; data from the digital radio; keyed input from the user; attitude information from the attitude sensing system and position data. The unit may be equipped with an audio in/out system enabling speech processing to input spoken information to the Brighteyes computer. This may be in addition to or in substitution for other means for information input within the preferred embodiment. The computer in the Brighteyes unit also has access to the lens assembly for the purpose of sensing the zoom and focus position of the lens and for the further purpose of commanding the lens to zoom and focus as required by the control program running on the Brighteyes computer and in response to requests from the user. The computer within the Brighteyes unit 45 can input images from the real world from the lens assembly and augment, delete, and substitute information in graphical form before presenting the augmented composite images to the user at the display.

The computer within the Brighteyes unit 45 contains a small amount of non-volatile read only storage in which a unique identification number is stored during manufacture. Also within this read only storage is a control program that when accessed by the computer at power up causes the Brighteyes unit to initialize and commence operation. The computer within the Brighteyes unit 45 also has random access memory and, read-write non-volatile storage (for example battery backed up CMOS RAM or a hard-disk drive) for the storage of software and for the storage of information between games. For purposes of cost, size and reduction in power consumption, it would be possible to dispense with this read-write non volatile storage by increasing the amount of software within the read-only storage to include the capability to initiate data transfer over the radio and by depending on the remote services from the Transaction Data System 48 described below for the down-loading of additional software to the Brighteyes units and for the storage of information on behalf of specific Brighteyes units between games. It is possible that a number of different versions of the Brighteyes units could be operating at any particular event. Since each unit has a unique identification number and can make this number available over the digital radio to the Transaction Data System 48 it is entirely possible for the Transaction Data System 48 to provide customized services to a large variety of different Brighteyes units of varying configuration. Since the exact location of the seat within the stadium occupied by the user can be uniquely identified from the user's ticket required for entrance to the park and the X, Y, and Z position coordinates of the seat in relation to a reference datum (the "Stadium Datum") can be transmitted to the Brighteyes unit by the Transaction Data System 48 the preferred embodiment of a Brighteyes unit especially configured for this application does not require a position sensing system. An alternative means for positioning the individual Brighteyes unit using triangulation to two points whose position is accurately known to the Brighteyes unit is discussed later and may used in alternate versions. In the event that a Brighteyes unit containing a position sensing system such as GPS was brought to and was operable at the game then, providing that Brighteyes unit was equipped with a two-way digital radio and was registered with the stadium, the user of that GPS equipped unit could wander at will throughout the stadium and make use of all the services described in this application from any viewpoint. Similarly, Brighteyes units equipped with additional optional equipment such as the capability to record and play back video information, and or with an optional higher speed radio making use of a TV sub-carrier (e.g. TVT1) could operate at the stadium or ball park providing only that those Brighteyes units were equipped with a suitable digital radio and were registered with the ball park or stadium such that remote data services could be requested and provided.

Within the random access memory of the Brighteyes unit, would be the operating software of the Brighteyes computer unit and a variety of data variables defined below. (Many other variables would also be stored such as: the control policy for the radio, the lighting threshold to enable blanking of the flood lights, user selected information).

Within the random access memory of the Brighteyes unit would be a digital representation of the stadium ("Stadium Model") stored in such a way that the X, Y, Z positions and identities of every significant non-moving object and surface can be determined by software within the Brighteyes unit accessing the digital representation. Additionally the digital representation would provide information enabling physical surfaces such as the walls and playing surface to be differentiated from open spaces such as the sky. This Stadium Model could be downloaded to the Brighteyes units as periodically broadcast from the Transaction Data System 48 or it could be stored between games within the non-volatile read write storage if fitted.

Within the RAM of the Brighteyes unit would be the position in terms of X, Y, Z of the ball in play and each player, manager, coach and umpire taking part in the current play. We refer to these as "Action Data Elements". In the game of baseball there are generally 21 Action Data Elements at any one time (see below). The Action Data Elements position and movements would be broadcast to the Brighteyes units by the Action Data System 46. Each Action Data Element would have a unique identifier to enable retrieval of further information relating to that Action Data Element. Upon receiving the X, Y, Z information based on the stadium zero datum the hand held unit would convert the data to its own zero datum. The unit would do this by subtracting its own X, Y, Z ($X_u$, $Y_u$, $Z_u$) from the X, Y, Z ($X_e$, $Y_e$, $Z_e$) of each Action Data Element as transmitted by the Action Data System 46. Thus the calculations $X_e - X_u = X_n$, $Y_e - Y_u = Y_n$ and $Z_e - Z_u = Z_n$ give a new set of coordinates ($X_n$, $Y_n$, $Z_n$) with the position of the hand held unit as the new zero datum for each Action Data Element. Other methods of translation of axes may be equally effective. The unit would also use the same calculations to produce its own location specific version of the Stadium Model and generate new coordinates for any graphics requested from the Transaction Data System 48.

The location of the Brighteyes unit in terms of X, Y, Z ($X_u$, $Y_u$, $Z_u$) in relation to the Stadium Datum such that the position of the Brighteyes unit may be accessed by the software within the Brighteyes computer. The pointing attitude of the Brighteyes unit stored such that the heading and attitude of the Brighteyes unit may be accessed by software within the Brighteyes computer. The focus and zoom position of the lens is similarly stored so that both the focus of the lens and the zoom position of the lens may be accessed by the software within the Brighteyes unit. Using the heading, attitude and location of the unit and the focal length and zoom position of the lens the field of view would be calculated for the unit at that instant and the scene being addressed is then better known to the computer.

The X, Y, and Z position of an Action Data Element in relation to the unit zero datum of the designation point on the boresight of the Brighteyes unit could be calculated by using the position and orientation data of the unit to project the boresight axis of the unit forward while searching that part of digital model of the park, Action Data Elements and objects within the field of view as calculated above to find the point where the boresight axis intersects with the object, surface or Action Data Element. The user may put the cross hairs of the unit on a particular Action Data Element, surface or other image object and by pressing a "designate" key may select the item so selected for further processing. Multiple items may be selected and variables relating to such designation such as location and time of designation recorded within the Brighteyes unit for further processing. To calculate the coordinates of the designated point in terms of the stadium zero datum the unit would add its own Xu, Yu, Zu to the coordinates of the point thus reversing the process.

Action Data System 46

The purpose of the Action Data System 46 is to track and identify the location of each Action Data Element and to broadcast that information in real-time by wireless means to the Brighteyes units.

In baseball examples of the Action Data Elements are: the ball in play, each player on the field (nine defense and a maximum of four offense), two base coaches, four umpires, and one manager or pitching coach. Typically there are 21 Action Data Elements in baseball.

The preferred embodiment for the Action Data System 46 is an industry standard personal computer with: at least 66 Mhz clock rate; two "frame grabbers"; a two way digital radio; a keyboard; a high resolution color screen equipped with a light-pen or other pointing system to enable an operator to rapidly select items on the screen. Connected to the two frame grabbers would be two high speed color video cameras. Optional disks and peripherals could also be attached providing the primary mission of the Action Data System 46 was not reduced by bandwidth contention.

The two high speed video cameras could be located in fixed and calibrated positions within a stadium to enable the position of every Action Data Element to be in view. Each camera would be connected by links to a frame grabber within the Action Data System 46. Each frame grabber would enable the computer processor in the Action Data System 46 to use stop frame action to track the location of each Action Data Element in view. Additionally, the Action Data System 46 could receive a feed from the ball speed radar typically located immediately behind home plate.

As each Action Data Element entered the field of play it would be identified to the software of the Action Data System 46 either by checking off a pre-arranged list or roster or by the operator designating a player, umpire, manager, coach or umpire using the light-pen and indicating by keystrokes a unique identifier. The ball in play would also be designated in this way. Using the unique identifier the Action Data System 46 would have access to data relating to each player to allow the image processing software in the Action Data System 46 to better analyze the stop-frame images of the game and, where required, to enable the operator to resolve difficulties in machine recognition of play. Such information would include the color of the uniforms, the height of the player, left or right handed in play and other information. Typically the operator would be required to designate the general area where the ball would first appear from the pitcher's hand so that the image processing software could commence tracking the ball in play rather than those in use in the bullpens or other visually similar and confusing objects such as sea birds or garbage on the field. The operator may also be required to re-designate players where two or more players crossed and/or doubled back at a plate or elsewhere on the field.

Alternative technologies exist for various versions of the tracking function of the Action Data System 46 including the use of: precision radar, laser scanners, radio determination using passive or active transponders, and other more exotic techniques using interferometry. It may well be that a combination of techniques could be used to determine the position and identification of each Action Data Element and that a more automatic and possibly more effective method may be introduced.

Having determined the position and identification for each Action Data Element the Action Data System 46 transmits this information over the digital radio to the Brighteyes units and to the Transaction Data System 48.

The Action Data System 46 would also transmit results of the previous play as it relates to statistics. Each piece of information relating to a specific player would be tagged with a personal ID number. These results would be received by both the Transaction Data System 48, which would update its database to include the new information, and the Brighteyes hand held units themselves if the unit had, at that time, any of the different statistical lists of the players in question displayed. Software in the Brighteyes hand held unit would use this new data to update the displayed statistics, thus saving the bandwidth necessary to transmit the players entire statistics after each play.

Transaction Data System

The purpose of the Transaction Data System 48 is to handle all of the non-real time processing required to support the remote Brighteyes units. Unlike the Action Data System 46 the Transaction Data System 48 is equipped to respond to individual requests from the Brighteyes units. It is also equipped to broadcast information, typically between innings, to all Brighteyes Units. Furthermore, the Transaction Data System 48 is equipped with long-haul data links to access systems in other stadiums and in other facilities.

A version of the Transaction Data System 48 is an industry standard personal computer in a configuration similar to the ADS but with the following exceptions and additions. The Transaction Data System 48 does not have frame grabbers and associated video cameras. To store the large amount of information required, the Transaction Data System 48 is equipped with large memory. In addition to provision for one or more radios the Transaction Data System 48 is equipped with data links giving access to: other stadiums; ticketing systems; credit card centers; wire line news systems; gaming services; transportation information and dispatch systems; and potentially other remote data services.

The Transaction Data System 48 has access to an extended version of the Stadium Model. The Stadium Model is a specialized data-base and includes information relating to the location in terms of X, Y, and Z of every significant non-moving object and surface within the stadium. The standard Stadium Model is the version that can be transmitted and stored in each Brighteyes unit. The extended version of the Stadium model includes the position of every seat in the Stadium and the location of every: concession; fire hydrant; electrical junction box; and other information relating to the operation and management of the Stadium. From this extended version of the Stadium Model it is possible for the Transaction Data System 48 to provide customized services either by radio to standard and specialized version of Brighteyes units (for example for fire-fighters, security services, and stadium maintenance) or by means of printed or other reports. Additionally the extended version of the Stadium Model could be made available such that ticketing outlets could be equipped with color or monochrome CRT or other screens to display the exact location and a digitized version of the view from the seat being sold or offered at point of sale. The extended and standard version of the Stadium Model could be created and updated from existing plans of the appropriate Stadium. By using a Brighteyes unit and the designate capability outlined above it would be possible for the managers of the Transaction Data System 48 to readily update the Stadium Models with additional or changed information.

The Transaction Data System 48 would have a data-base containing information relating to all aspects of the game of baseball. Major league baseball currently maintains a very comprehensive data-base of facts relating to all aspects of the game and this information, updated by the Action Data System 46 after each play, would be available via the Transaction Data System 48 to Brighteyes units either on a broadcast or individual query basis.

A Brighteyes unit within range of a stadium radio system after power up would send a request to the Transaction Data System 48 for the current radio schedule and for the frequency policy. In addition to information relating to channel allocations, frequencies and protocols to be used the radio schedule would define the times and on which channel the Stadium Model; software and software updates; initializing statistics; and other information would be broadcast. In parallel with this transaction the Transaction Data System 48 would refer to the data base of Brighteyes units and would establish ownership identification either from the data-base or by query to the Brighteyes unit that the user provide additional identification. If the Transaction Data System 48 could not verify that the Brighteyes unit was in the hands of a registered and authenticated user then it would alert stadium security but otherwise proceed as normal.

Following user and Brighteyes unit identification and authentication, the Transaction Data System 48 would query the ticketing system for information relating to that user and would establish, as in the case of a season ticket holder, if a seat number had been issued and was known to the system. The Transaction Data System 48 would verify with the Brighteyes user that the issued ticket was the seat number to be actually used or would request from the user for the seat number to be used. To facilitate correct input of the seat number (e.g.: URES28 row: 15; Seat: 20) the ticket could be encoded with a bar-code or other graphic and by allowing the unit to "see" the ticket the information could be acquired from the ticket when held in the appropriate position with relation to the input lens of the Brighteyes unit. Alternatively the ticket number could be entered by the user using keys on the Brighteyes unit. Once the seat number is known to the Transaction Data System 48 a look-up of the information in an extended version of the Stadium Model will provide the position of the seat in relation to the Stadium Datum. This information would then be transmitted to the individual Brighteyes unit for storage within the Brighteyes unit and in the case of a mislaid or stolen Brighteyes unit the information would be transmitted to Stadium security. There are other ways in which an individual Brighteyes unit could establish accurate positioning with the Stadium. It would be possible to use the digital radio system to locate a Brighteyes transmitter by means of radio determination. Given the multi-path problem associated with a large enclosed area with many radio reflective surfaces this determination of location would be non-trivial and would potentially either lack in sufficient accuracy or may take an undesirable length of time. However, for a stationary Brighteyes unit it would be quite possible to locate the unit with sufficient accuracy that fine tuning of the position could be accomplished by the user entering just part of the ticket number (e.g. instead of URS28, Row: 15; Seat 20 simply use Row: 15; Seat 20) or by means of triangulation where the Brighteyes user would "designate" two points known to the Transaction Data System 48 which could then calculate the position of the Brighteyes Unit and transmit that back to the unit. Alternatively the individual Brighteyes units could calculate position from similar triangulation to two points in the Stadium Model. Exploiting triangulation in this latter fashion may indeed be chosen as the preferred embodiment. Additionally, a GPS equipped Brighteyes unit could operate within the Stadium, even in a covered stadium, assuming pseudo-satellites could be positioned within the Stadium or differential GPS was available in a suitable form.

The Transaction Data System 48 maintains a data-base of Action Data from previous plays and can broadcast replays either recorded from the ADS at the stadium or received by communication link from the Transaction Data System 48 at other stadiums. In the case of replays from other Stadiums or recreating scenes and events from the past the Transaction Data System 48 would preface the replay by broadcasting the stadium Model for that remote Stadium or, on the assumption that there had been physical changes to the Stadium in the interim, for that historical play. These replays could be either in the form of stick-figures or could include computer generated animation of the players in action. The Transaction Data System 48 maintains a data-base of animated information. Computer animation of replays and other events could be provided either by broadcast using the digital spread spectrum radio and/or at some increased bandwidth to suitably equipped Brighteyes units.

Information Displayed in Perspective

Having the above described hardware in place and operable, the system can now address a scene, collect an electronic image of that scene 52, identify the scene, generate information relating to the scene 51, combine the computer generated information with the image to form a composite image 53. It is particularly important to consider the computer generated information. It is known to display "low battery" indicia in prior art systems but the system of the invention considers information which is particular to the scene being addressed being identifiable to the computer by determination of the position and attitude of the device.

Figure 7:
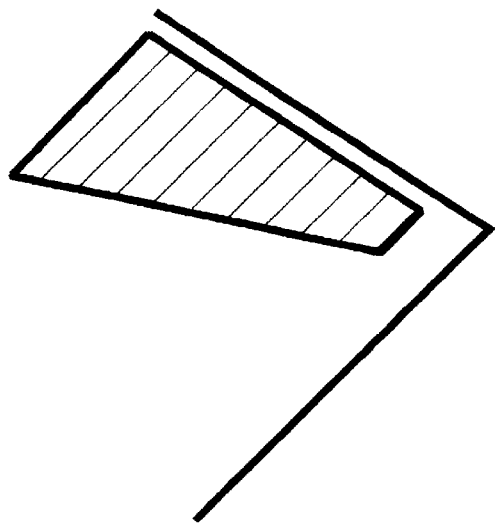
FIGS. 6, 7, and 8 show a simple geometry appearing in three different perspectives.
Figure 8:
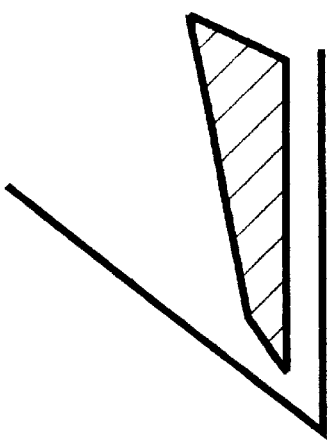
Figure 6:
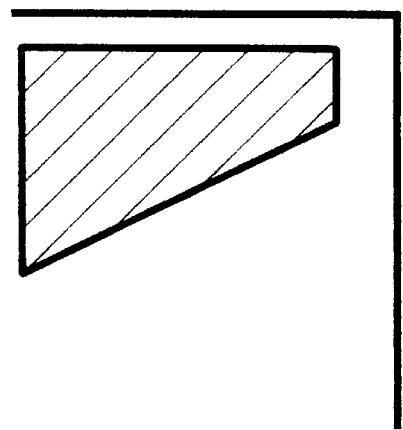
Figure 9:
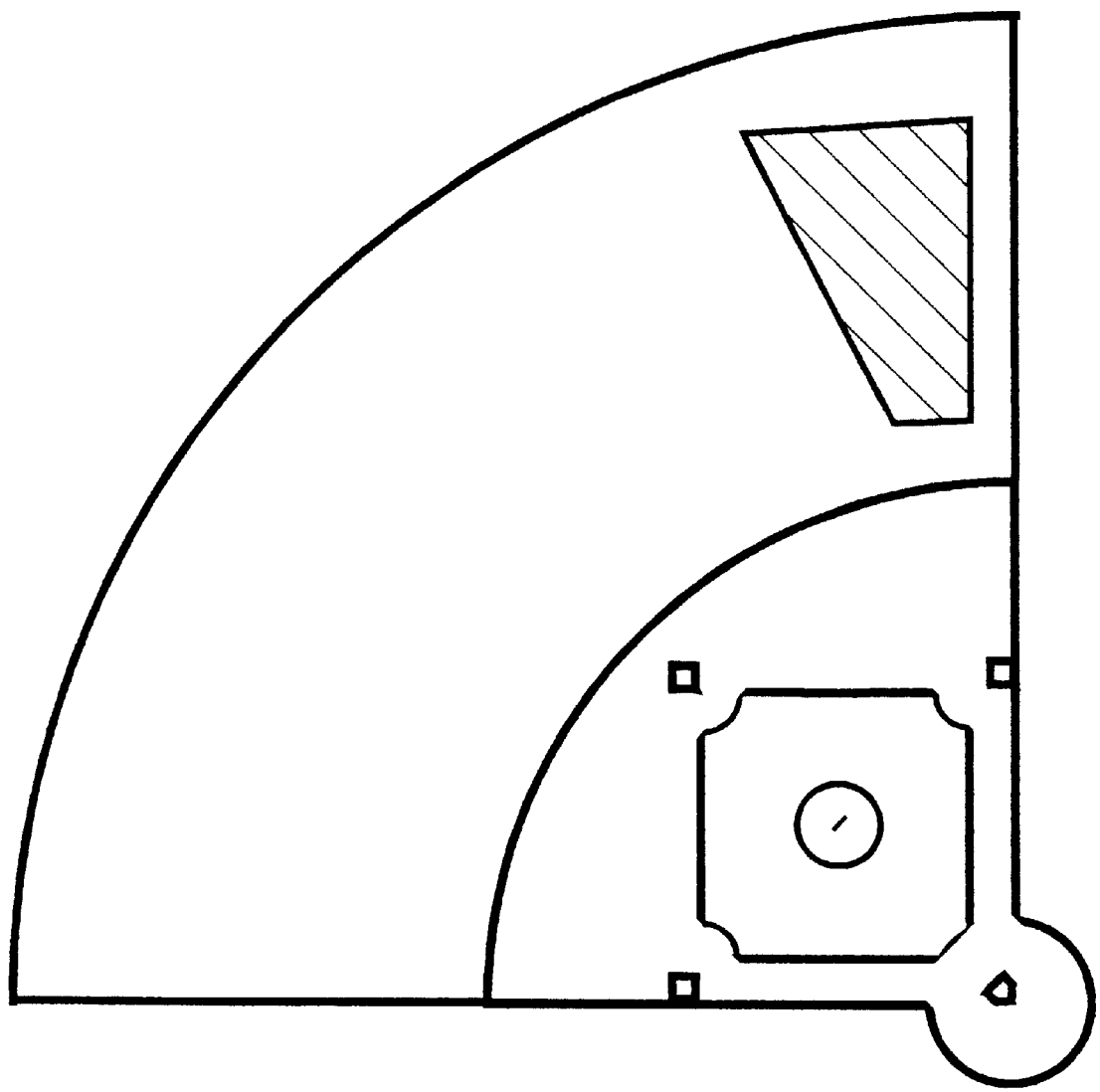
FIGS. 9, 10, and 11 show a detailed scene as it relates to baseball in three different perspectives.

It is further important to note that "low battery" indicia do not have associated therewith any particular perspective. In contrast, the information of the invention typically is spatially dependent and therefore has associated therewith a particular perspective. FIGS. 6, 7 and 8 show a geometric shape in three different perspectives. It then can be appreciated from FIGS. 9, 10, and 11 that each seat of a baseball stadium represents a different perspective of the field. Composite images generated by systems of the invention are presented in a perspective associated with a particular user and are aligned to the real scene such that the normal direction of the composite image plane is in the pointing direction of the camera.

Special information types and features include: historic, statistical, symbolic, abstract symbolic, action tracks, histogram of action tracks, computer graphical interface devices, et cetera.

History

With systems of the invention it is possible to combine images from other time periods onto live images of real scenes. Historic recordings can be played-back with live scenes. Also, computer generated "futuristic" scenes can be combined onto real images.

If a user of the vision system desires to see how it appeared when Hank Aaron broke the career home runs record in Fulton County Stadium in 1974, the images from that time can be recalled from the data store, adjusted for proper perspective according to the users position and attitude, and replayed onto the field as the field appears today. A replay of a film simply shows the perspective as it was recorded on the day of the actual event. Because that perspective may have no relation with the viewers present perspective, the replayed film is like simple video play-back. To give a strong feeling of "being there" systems of the invention align the events of a historic event to the field as it surrounds the user. If the user chooses to watch the ball fly over the fence, then the camera is pointed into left field as the ball fly's over. If the user decides instead to watch the reaction of Hank Aaron, the device is pointed to the home plate—first base line. In either case, the viewer "sees" the historic event superimposed with the present stadium.

In similar fashion, events that have not yet happened but that are generated artificially can also be "replayed" onto present scenes. This can be used to "imagine" "what-if" scenarios.

Representation of Statistical Data

Statistical data can be represented in many forms. "80% of all 0.300 hitters are heavier than 220 pounds" is a simple numeric (80) representation of information regarding a player's weight. Sometimes information can be presented in a graphical form which relates the data to the subject of the data. For example an outline of a player's figure that is 80% shaded on the inside. Presentation of data in relation to images may give the user a better feeling of its significance and may be easier to interpret.

When statistical data relates to a geographic area, the data may be presented superimposed onto the geographic area as one views it from various perspectives. By using the system of the invention, one looks into a display having an image of a real scene aligned to the position and attitude of the user with respect to that scene. The perspective of the scene as viewed normally looks the same as the perspective of the image displayed when the system is pointed towards the scene. An area of interest within the scene may have statistical data associated with it. In this case, the display can superimpose indicia onto or around that area in a predetermined way to represent that data.

Considering FIG. 6, we can imagine looking down on a right triangle defined by the perpendicular black lines. The shaded area could indicate some high probability density or other statistical feature. If one moves from viewing the triangle from directly "above" or normal to the plane of the paper, then the perspective of the triangle changes FIG. 7. FIG. 8 shows how the same triangle looks at a glancing angle off to the right side of the apex. The shaded area, perhaps representing a region associated with some statistical information changes as well. In all three perspectives, the shaded area indicates a particular area of interest. It is the same area in all three figures.

This can be further illustrated by considering what a baseball field looks like from each seat in a stadium. In baseball it is common to present statistical data associated with a portion of the field. If a particular batter frequently hits to left field, a display can be arranged to indicate the trend.

Users of the system are distributed throughout the stadium seats and each has a different perspective of the field. By looking into the display of their Brighteyes system with the device pointed in the direction of interest, the Action Date System could instruct the units to shade the left field as defined by a particular set of coordinates. When the coordinates are plotted, the resultant area will appear differently for every Brighteyes unit.

As a new batter that is up to bat is identified, the computer could find that the batter has hit the current pitcher to left field 90% of the time. The Action Data System 46 then transmits an instruction to shade the left field by defining the region with three points. The handheld unit processors receive the shading instruction that corresponds to the statistical information and the coordinates of the area that will need to be shaded. Each unit being located in a unique position with respect to the left field, will uniquely represent the left field on its display in accordance with the perspective as viewed from the user's location. Although the left field is a simple two dimensional area, statistical information can also be represented in many three dimensional forms.

Figure 12:
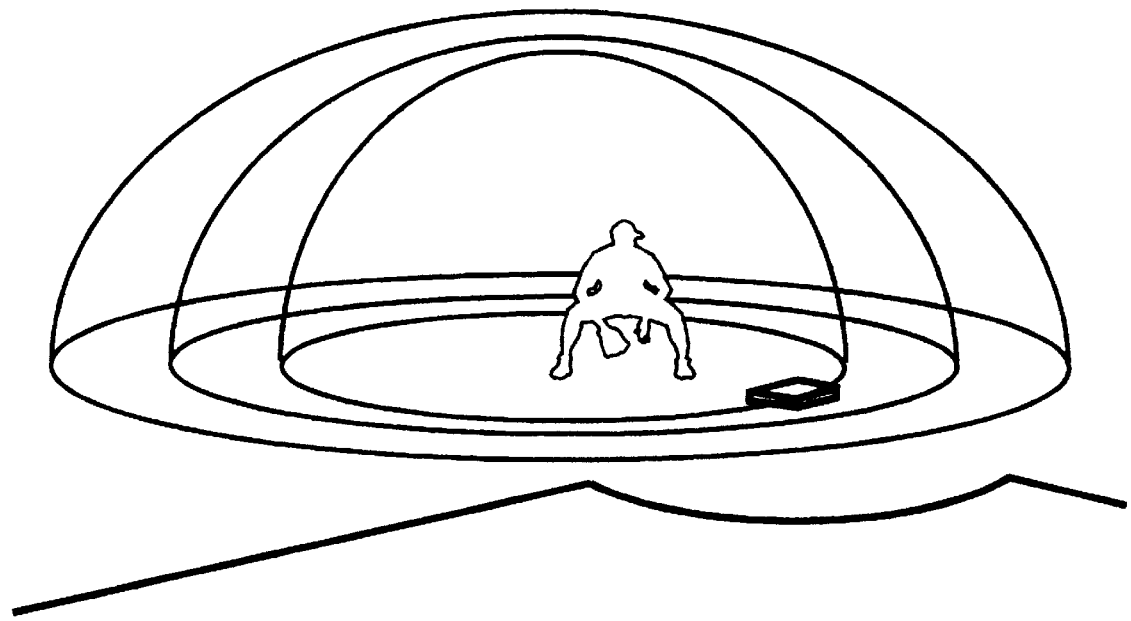
FIG. 12 shows an image of a player as recorded by a camera and a computer generated graphic superimposed thereon.

This can be further illustrated by considering a players defensive range in a baseball scenario. If we choose a probability threshold of a player responding to a ball in play as a function of position near the player, and indicate where that threshold lies, the limit would surround the player in the shape of some dome like form (FIG. 12). Extending perhaps further in the direction ahead of the player than in the direction behind (this is due to the fact that a player can run much faster in the forward direction than in the reverse direction). Whereas a player wears a glove on one hand, there may be some bias to either side. (backhand plays are more difficult than open handed plays.) This could be predicted by a history of plays made for a certain player or by averages for a certain league or team. The dome, being determined by whatever means, would be embodied by a some surface with the baseball player inside and the baseball field completing an enclosure. This enclosure would appear differently from every seat in a stadium. If the drawing in FIG. 12 existed as a printed image in a game program with an explanation of a centerfielder's range, it would be extremely difficult for a fan sitting in the outfield bleachers to translate where on the field in the direction of second base corresponds to the limit of the fielders range. However, if the data of FIG. 12 were plotted with the proper perspective according to a particular fan viewing the drawing and aligned and superimposed onto an image of the real scene, then it would be trivial to interpret the field locations in all directions which define the players defensive range.

Symbols

A common problem shared by most attendees of stadium events is the difficulty of locating facilities such as the restrooms, concessions, or police. Because a large stadium event could be visited by more than 100,000 people, it is easy for an individual to become lost. Particularly annoying is the problem of locating one's car after an event. As the stadium parking lots are generally very large and contain many similar looking cars, it is quite difficult for one to relocate their parking place. Since users of the systems of the invention will have a device capable of locating itself and having previously recorded the position of the parking space, by pointing and scanning over large areas of a parking lot, they will be able to look into the display to see an image of the parking lot with an indication of their parking space highlighted. Similarly, the other facilities of the stadium can be located by looking into the Brighteyes unit. Symbols can be used to indicate locations like a restroom hidden by a wall or image features that may be too small to be seen.

Abstract Symbols

Figure 14B:
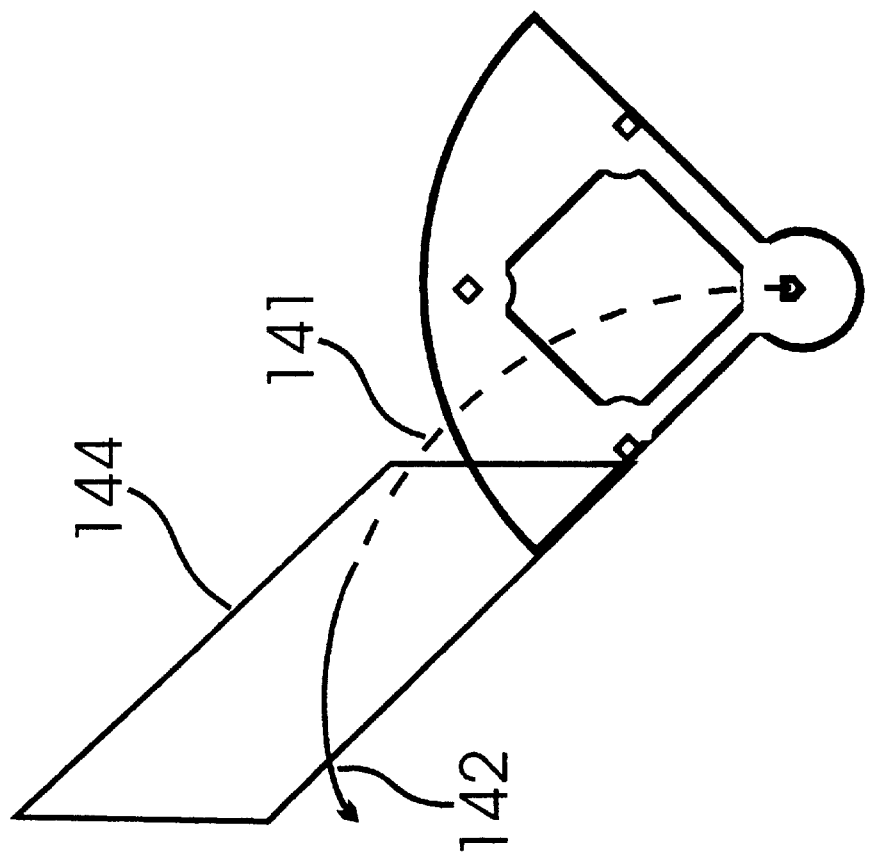
FIGS. 14A and 14B show abstract graphic data superimposed onto real field images.
Figure 14A:
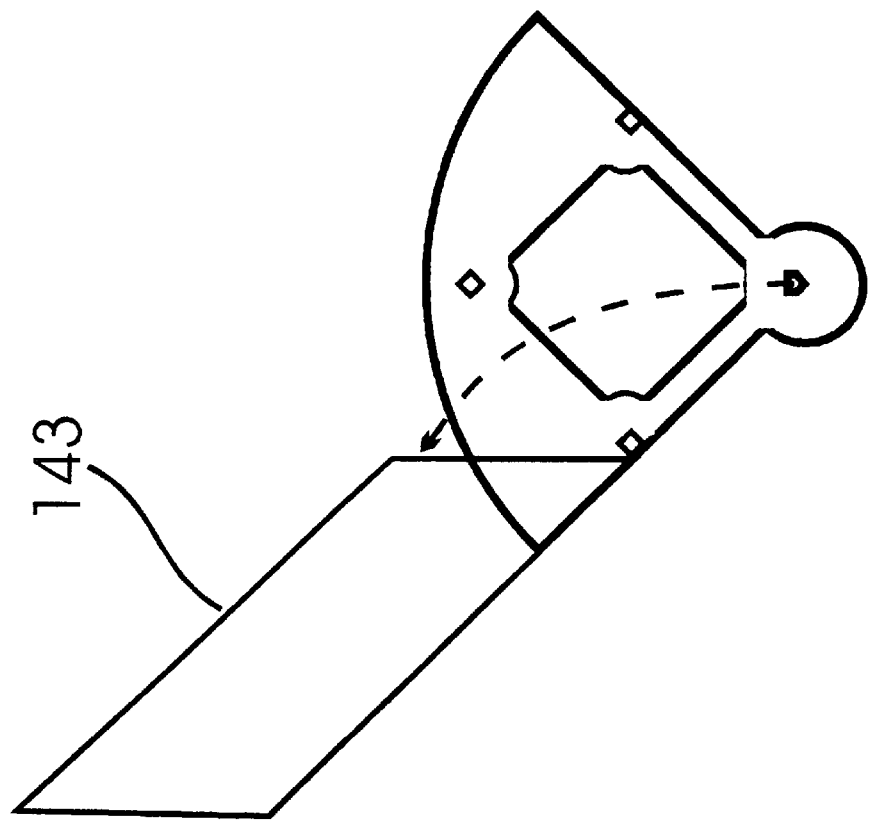

Foul ball planes are abstract in the sense they exist as an invisible plane but do not represent any physical object. An umpire and other observers can judge with some degree of uncertainty when a ball passes through a foul ball plane. However, since it is a trivial task to plot a plane onto an image in systems of the invention, the uncertainty of foul ball calls can be completely removed. Of course, each user of the vision system would see the plane in the correct perspective according to the location of the user. It is possible with ball tracking algorithms to determine the exact moment when the ball passes through the plane and to provide a signal of that condition. FIGS. 14A and 14B show the path of a foul ball. While watching a ball hit toward the foul ball area of the field, a tracking system could detect that the ball will likely be a foul ball and indicate an early alarm. The foul ball plane 143, left invisible during normal play, could automatically be plotted onto an image of the field in a "warning" color like yellow. As the ball passes through the plane FIG. 14B, the color of the plane could change to red 144 to indicate a foul ball. Conditions of play could therefore drive the features being displayed on a Brighteyes unit. Symbols to indicate abstract objects like foul ball planes could be plotted onto real images to enhance the information presented to a user.

Ball Tracks

A curveball pitch can be brilliantly executed by some pitchers, sometimes breaking more that twelve inches. Since a baseball is only in one point at one time, it is quite difficult to envision the exact path of a pitched baseball. If the position of a ball is recorded as the ball approaches the batter, a plot could be presented to the display which shows the path of a pitched ball. The maximum lateral displacement could easily be computed to determine the breaking quality of the pitch.

Histogram

Figure 15:
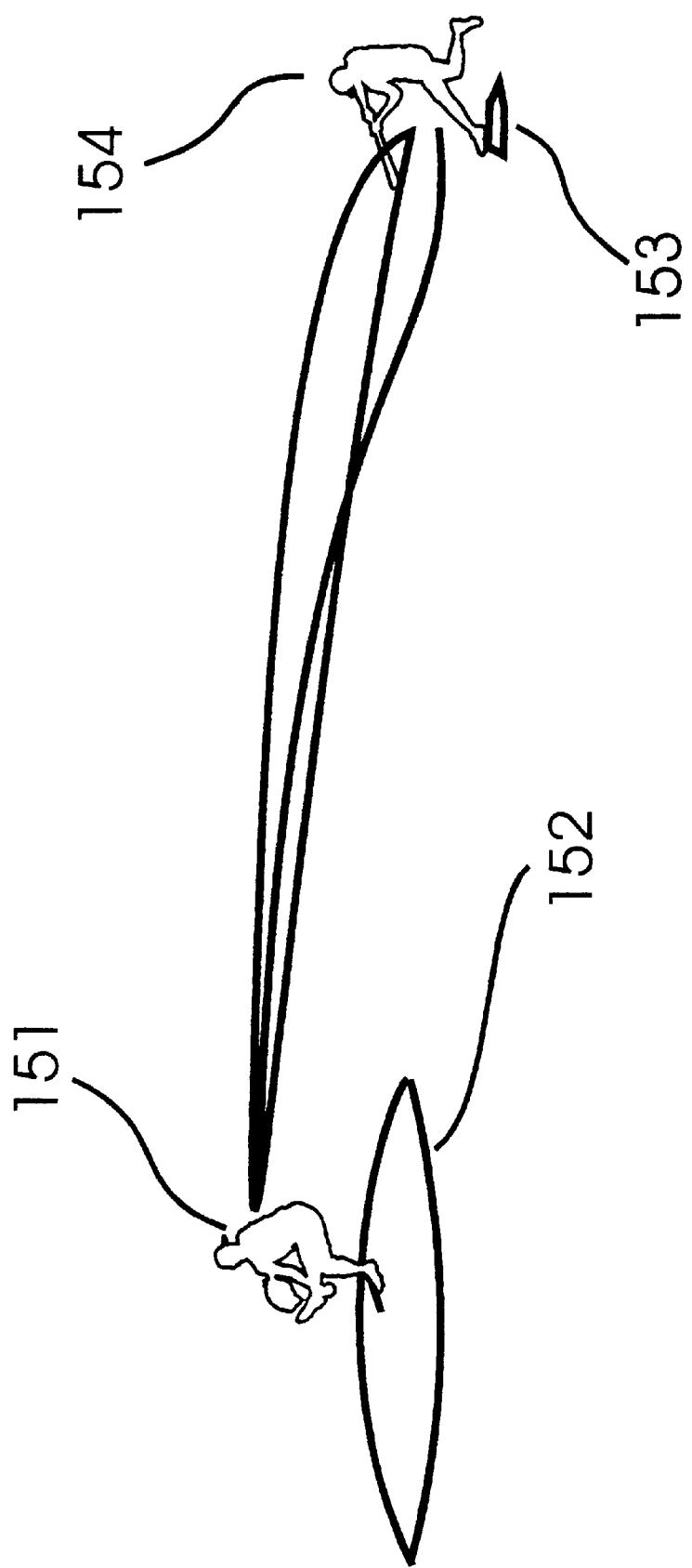
FIG. 15 shows ball tracks.

As each pitch is different, a history of several or many pitches by one pitcher could be displayed simultaneously yielding a histogram of pitches. Because the interesting property of a fast ball is speed compared to position, the histogram could be arranged to exclude those type of pitches. Displaying the paths of the last three curveballs pitched would yield a useful histogram. FIG. 15 shows a pitcher 151, on the mound 152, the home plate 153 and the batter 154. The last three curveball 155 pitches can simultaneously displayed as a histogram. It may also be instructive to compare the average curveballs of one pitcher verses another. One pitcher may have curve balls that break differently that others. These features could be readily illustrated in devices of the invention.

Improper Perspective

It may be difficult for some viewers of a curveball pitch to appreciate the difficulty of hitting the ball. From nearly every view in the stadium, the ball appears to have a trajectory leading into the strike zone. However, the catcher knows differently. He (and the batter) can very distinctly notice a one foot breaking action.

Since a balls location can be known and mapped with precision during the course of a pitch, the path can be plotted onto the coordinate system from any perspective selectable by the user. Of course, a preferred perspective for viewing a curveball pitch is likely the catcher's, any of an infinite other perspectives can be selected to view the pitch.

If a curveball breaks strongly left-to-right but not at all up-and-down, then the path of the ball could appear to an observer in the stands to be a straight line (actually parabolic concave down). If one chooses to view the pitch from directly above the field, a position relatively difficult to realize in an actual game, (although the Goodyear blimp may argue with this) by selecting that position one can see how much the pitch breaks left-to-right. These are two illustrations where the users perspective is not preferred, a better perspective is known, and the user specifies a "virtual position" for displayed images to be translated.

Panels

Special "windows"-type computer graphical interface objects herein called "Panels" are used in images for various purposes including information selection, system command and control. A Panel can consist of a list of related information, selections and/or options. Panels are image objects that can be related or contain information to some spatial feature of the game of baseball. A 'fixed' Panel is a Panel that is static relative to the background or a designated action element. Some Panels may be automatically fixed where the boresight of the unit was pointing when the Panel was accessed, and other Panel may be placed and fixed by the user. If a Panel is to be fixed by the user the Panel would appear as a semi-opaque, flashing image on the boresight and would remain on the boresight until the user had positioned the Panel at the desired location and pushed the designate key on the unit. The user may fix a panel on a specific heading, on a specific heading at a specific range or at the location of physical object that is moving, if the unit receives location data for that object from the Action Data System 46, or stationary. The Panel would stop flashing and remain in this fixed position until moved or closed. To designate a selection in a fixed Panel the user would move the unit as a whole until the desired selection was located under the crosshair and then push the designate key on the unit.

Panels may be displayed in the form of a two sided "sign" with "handles" to rotate it about its central horizontal axis. The left "handle" would rotate the "sign" 180 degrees to display the other side, the right one 90 degrees to present the edge of the "sign" to the user so as to temporarily clear the area for "live" images.

When the Panel was edge-on to the user it would look akin to a barbell with the "handles" connected by a line and two title bars, one above and one below, floating next to it. The left handle would contain an up arrow, the right a down arrow. By designating either handle and pressing the designate key the user may rotate the Panel to display either side. To move a Panel, in either case, the user would designate either title bar and press the designate key thus tying the Panel to the crosshair, move the Panel to the new location and press the designate key again thus fixing the Panel in the new location. To close the Panel, i.e. to remove the Panel from view, the user would place the crosshair over the "Remove" button in the Panel and push the designate key. The unit would fix the Remove Panel in front of the user consisting of the questions, "Are you sure?", and the answer options: "Yes", and "No". If "Yes" is selected the Panel in question would be removed from view and the "Remove Panel" would be deleted. If "No" is selected the unit would delete the Remove Panel. The unit treats the entire surroundings as a "screen" and the user looks at different parts of the "screen" to locate the information they desire. Information could be fixed in the sky, on the back of someone's head, on billboards, any position the user could see with their Brighteyes. Panel may be "stacked" over one another. To move a Panel to the "top" of a "stack" the user would designate either title bar, as if to move the Panel, and press the designate key again.

Figure 13:
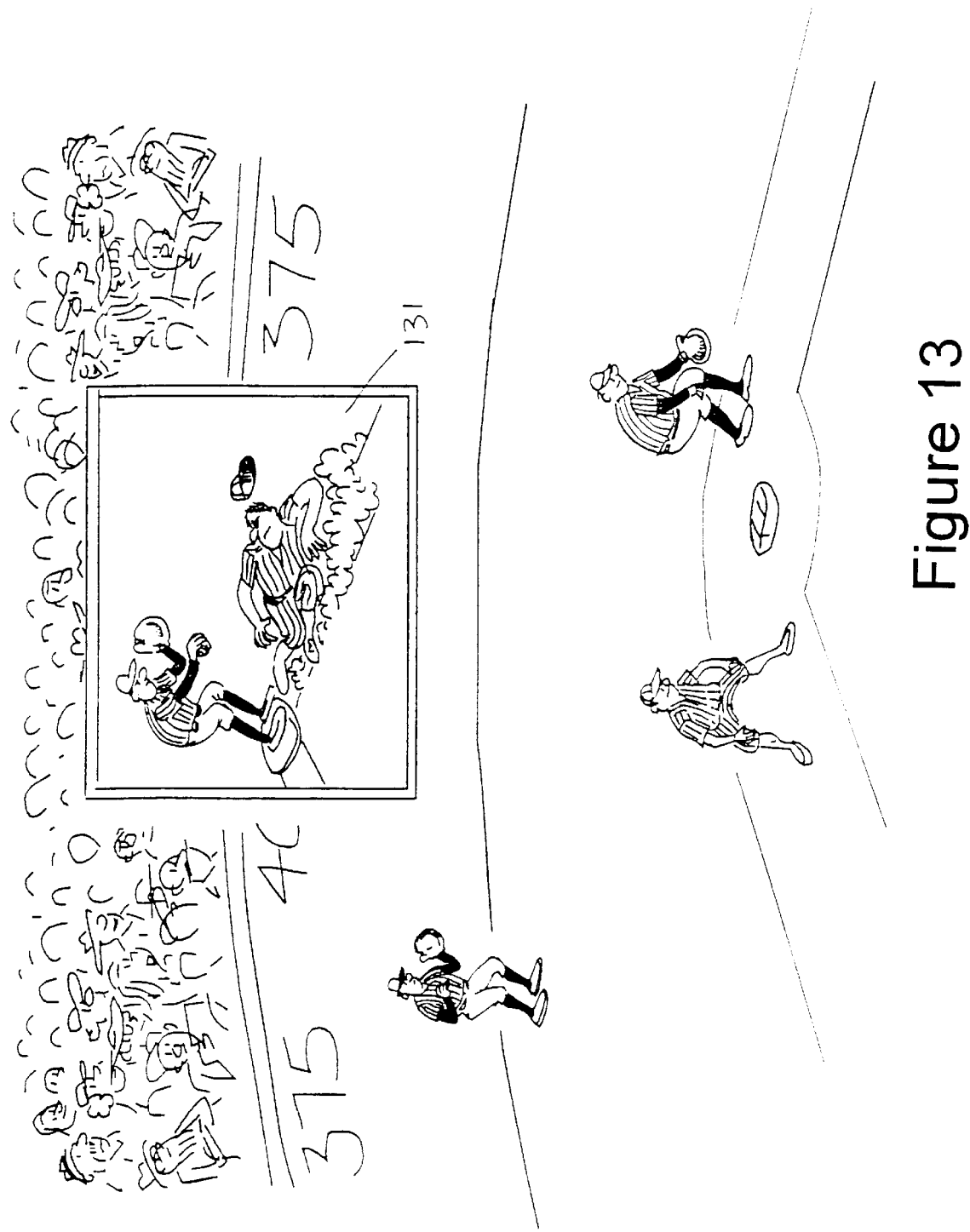
FIG. 13 shows a "Panel" placed in the field of play by the computer.

Panels may be "attached" and follow the dynamic Action Data Elements. They may be used to display images as well as menu data. FIG. 13 shows a "replay" Panel 131 fixed in the outfield portion of an image of a real scene. The Panel is displaying the play which happened moments ago onto a "live" image.

Figure 17:
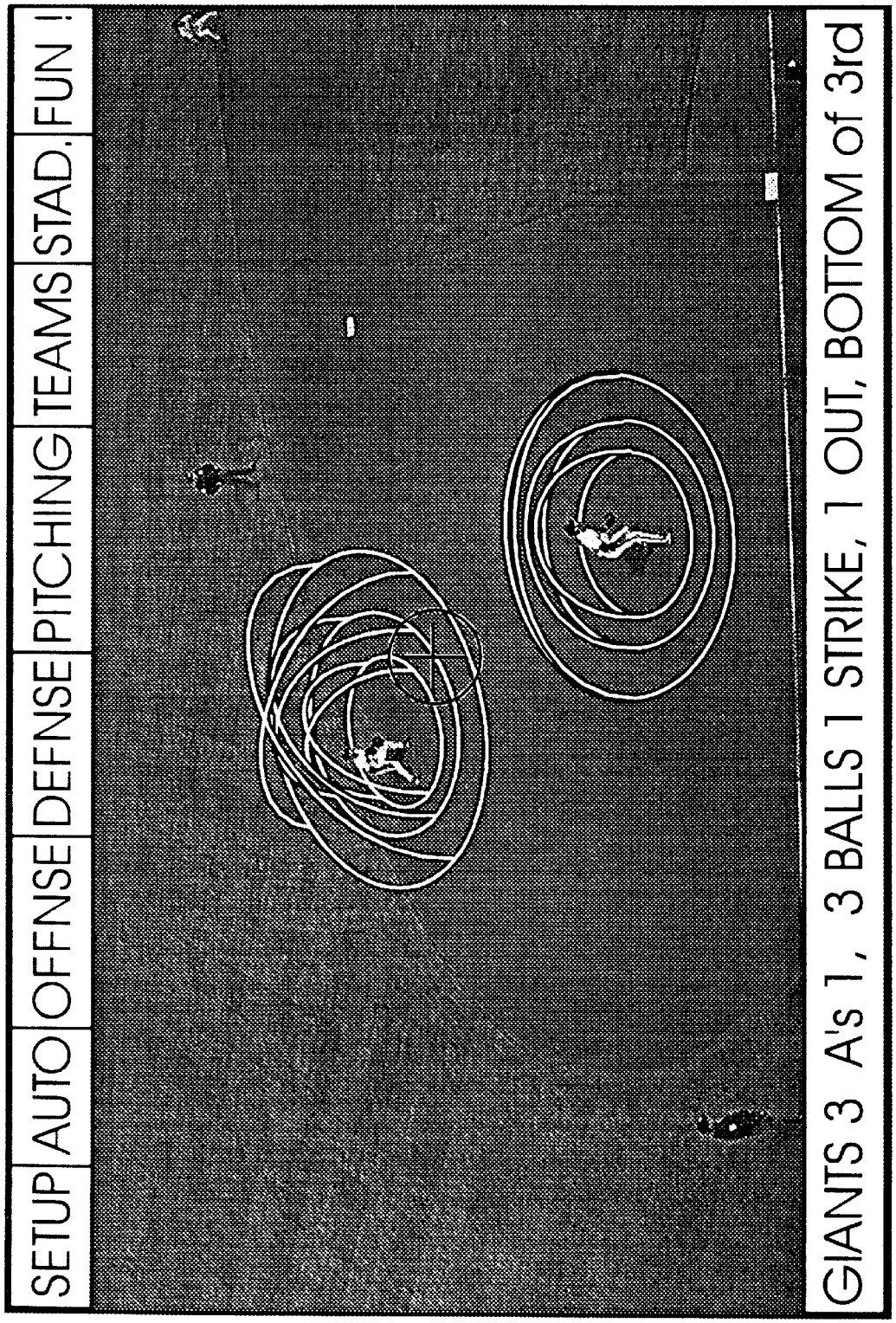
FIGS. 17–19 are composite images of the invention.
Figure 18:
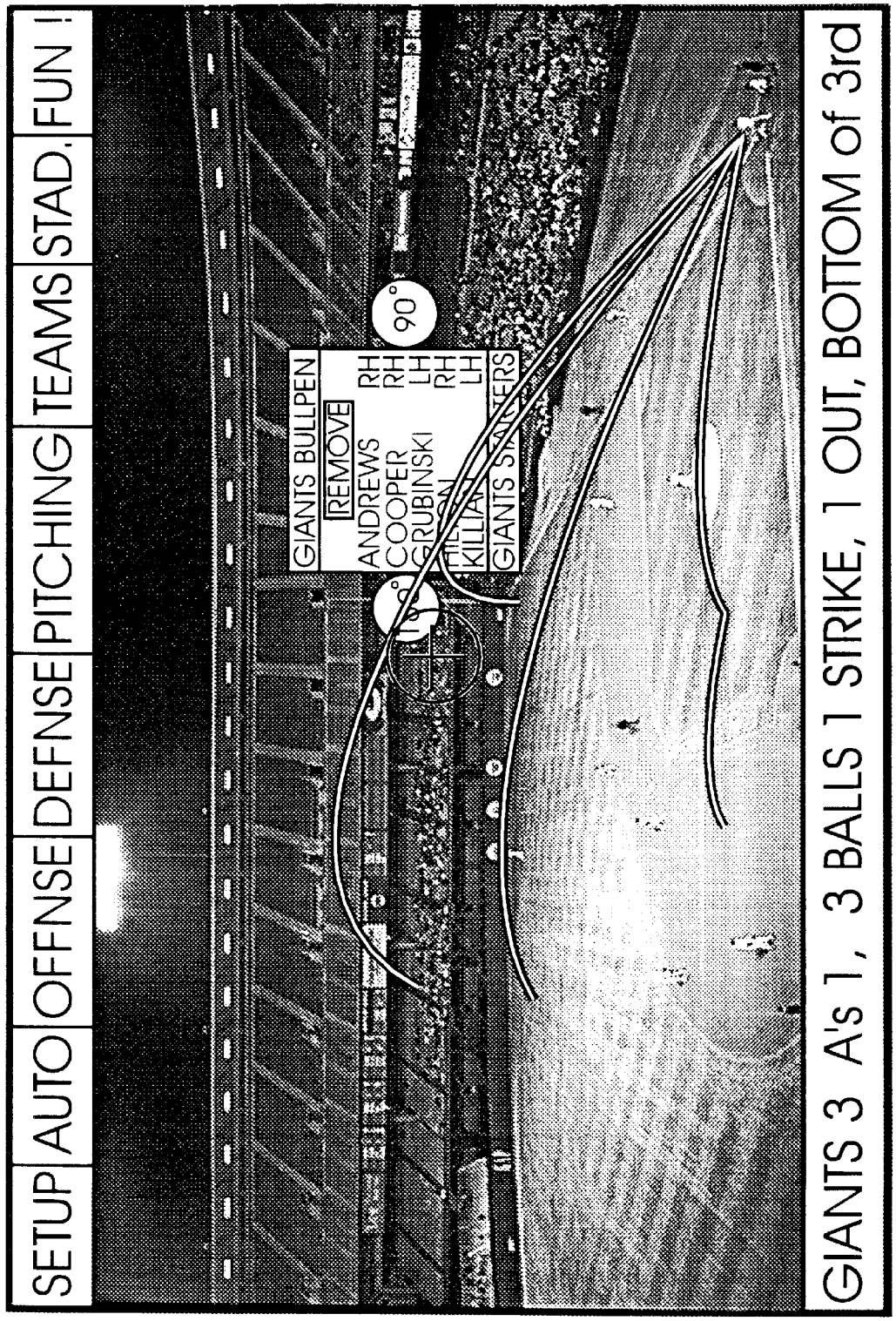
Figure 19:
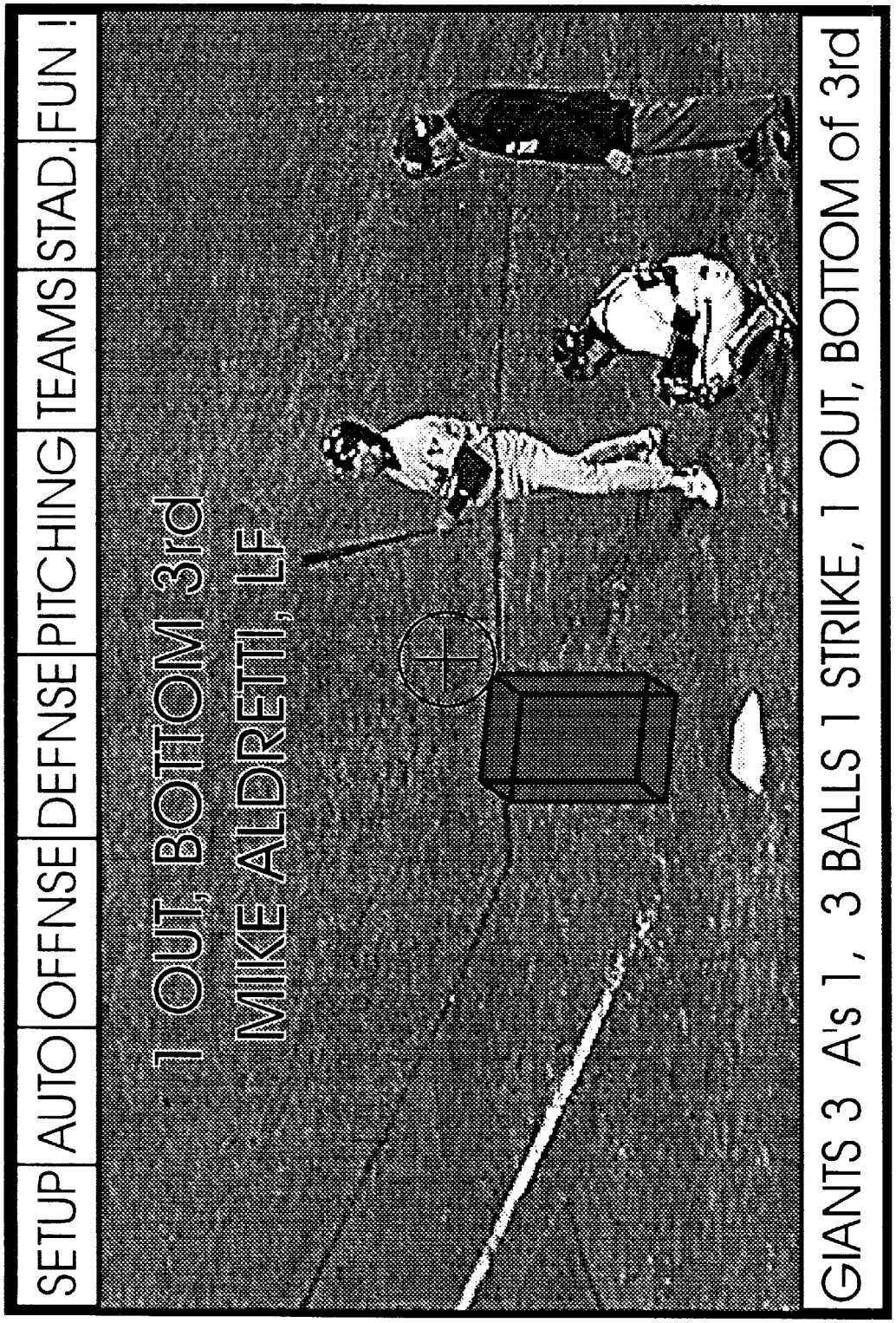
Figure 20:
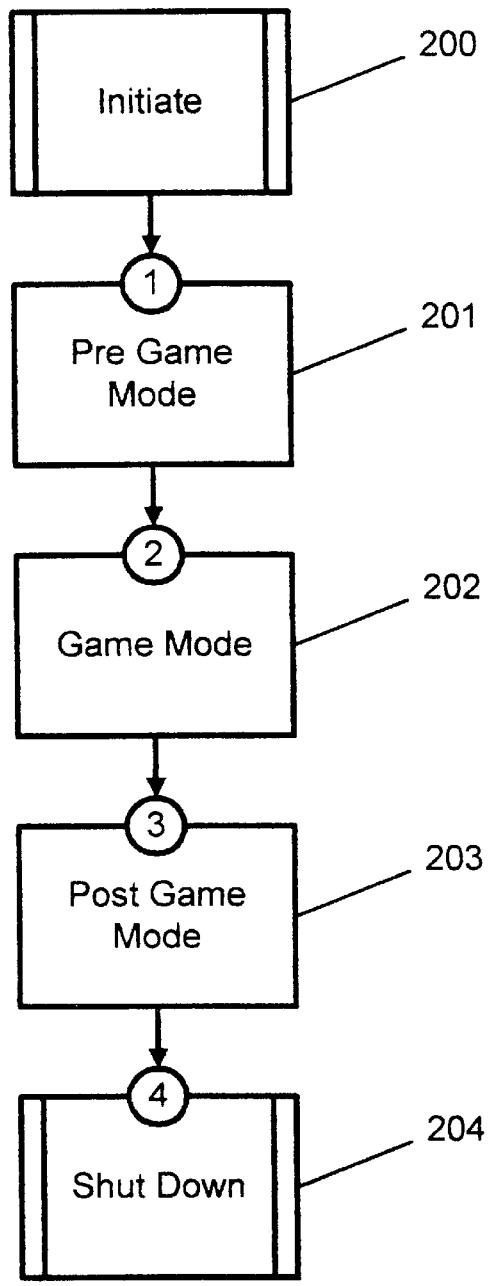
FIGS. 20–97 are flow diagrams of a preferred embodiment. Each figure after 20 is a subset thereof. The titles of each figure indicate a level within the flow diagram hierarchy.
Figure 21:
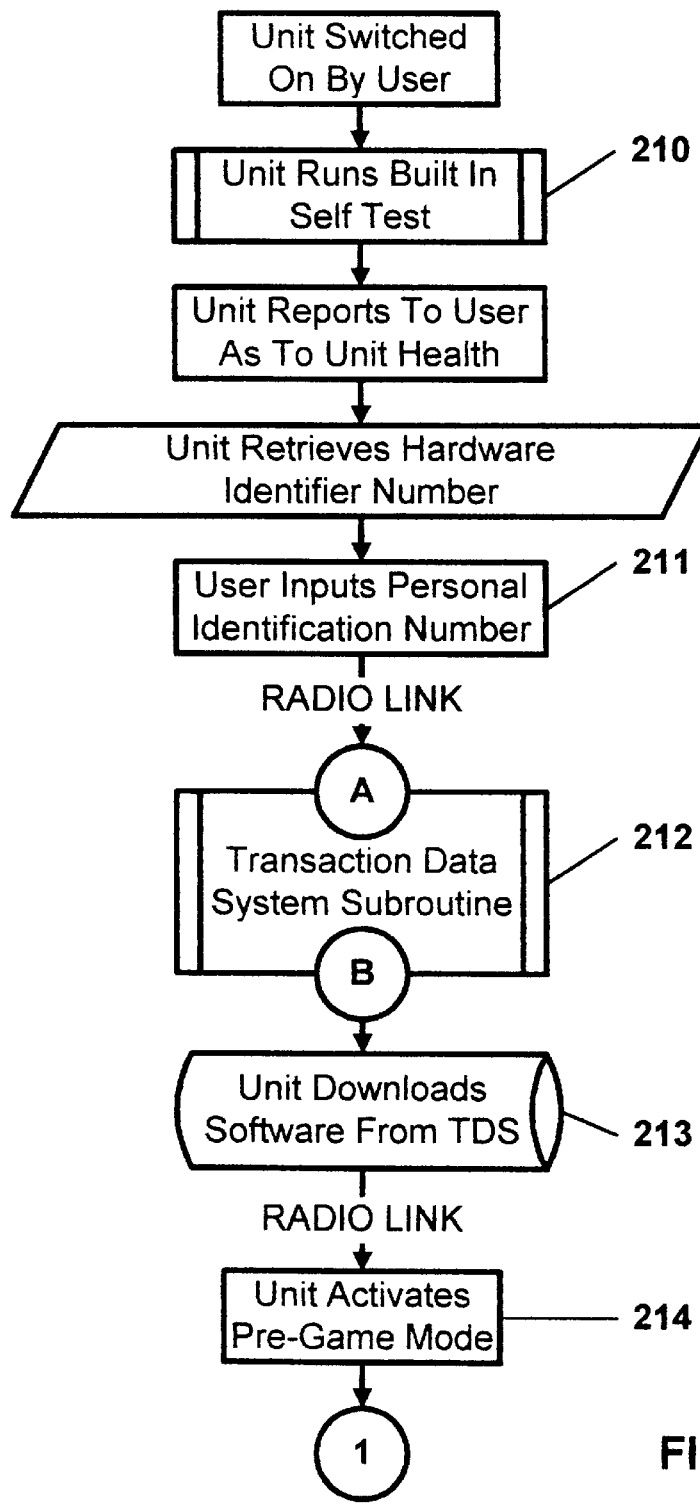
Figure 22:
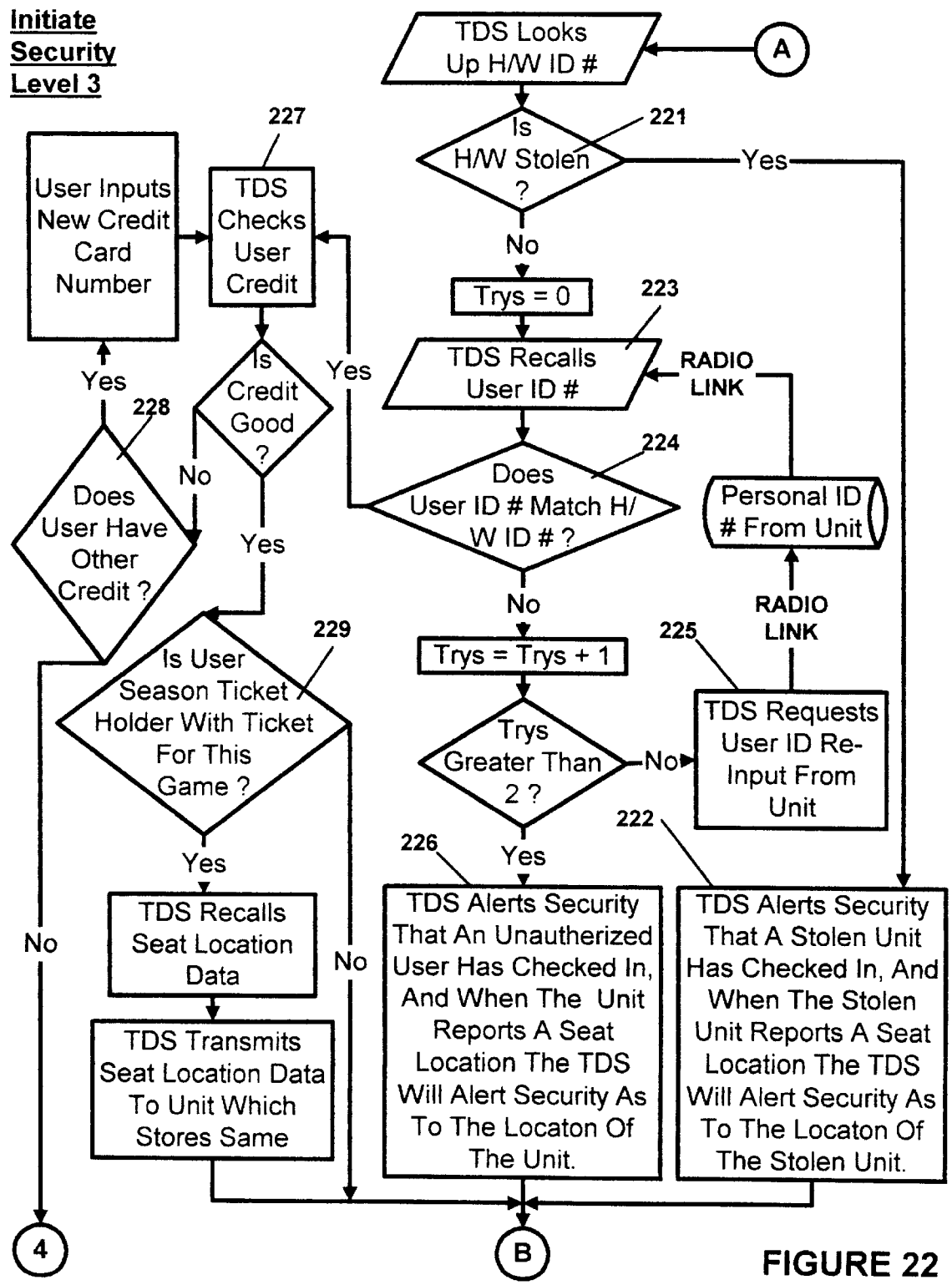
Figure 23:
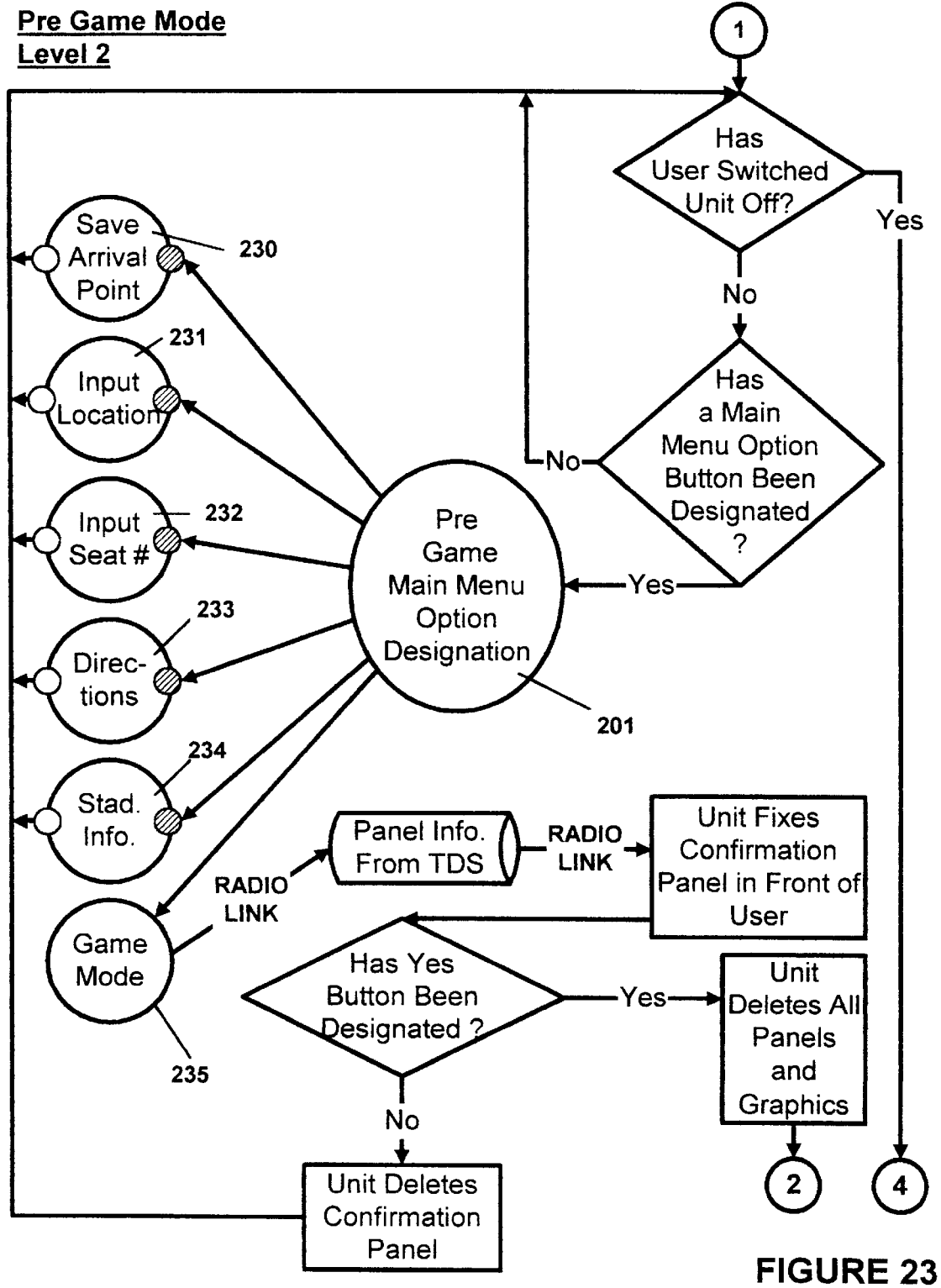
Figure 24:
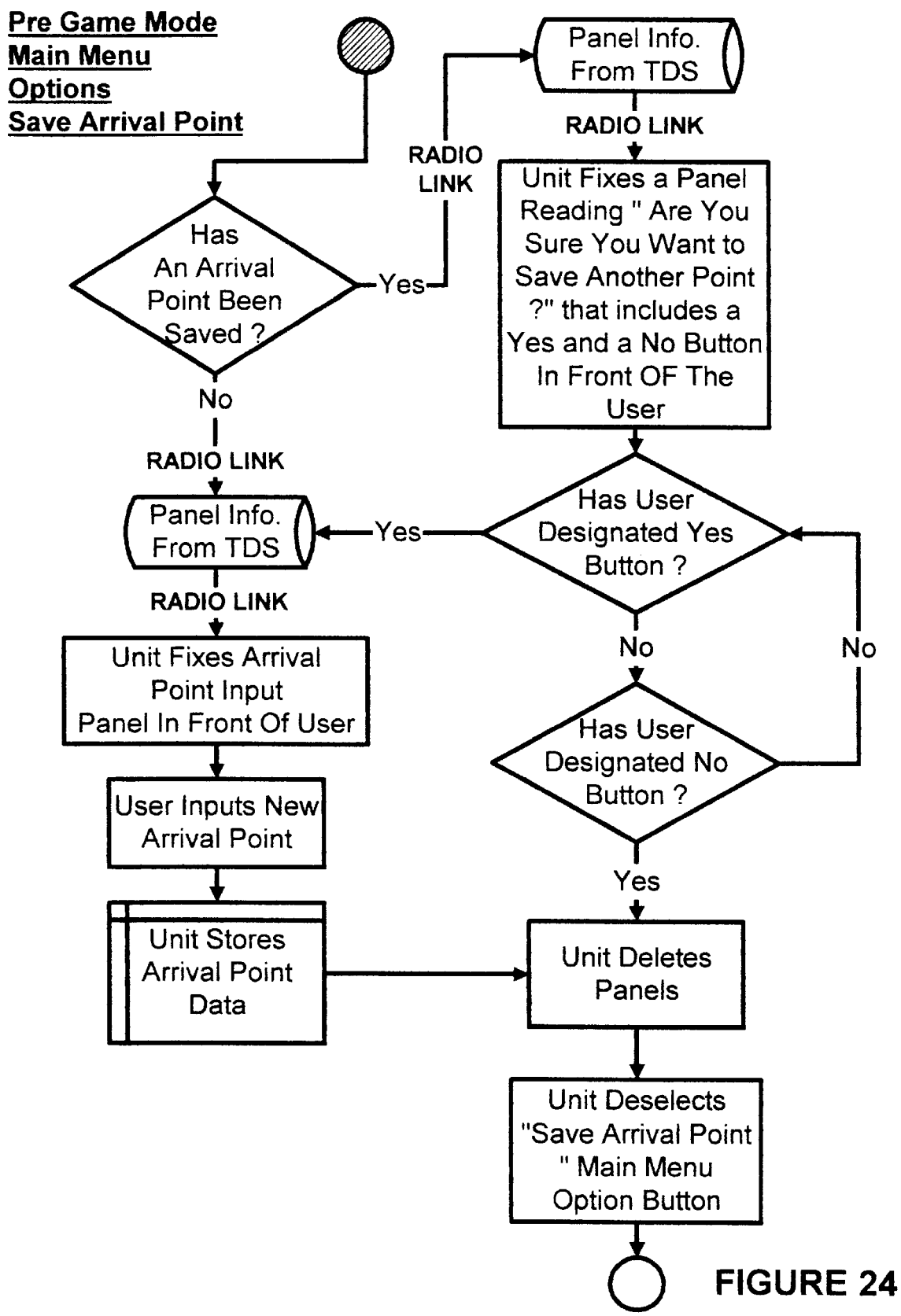
Figure 25:
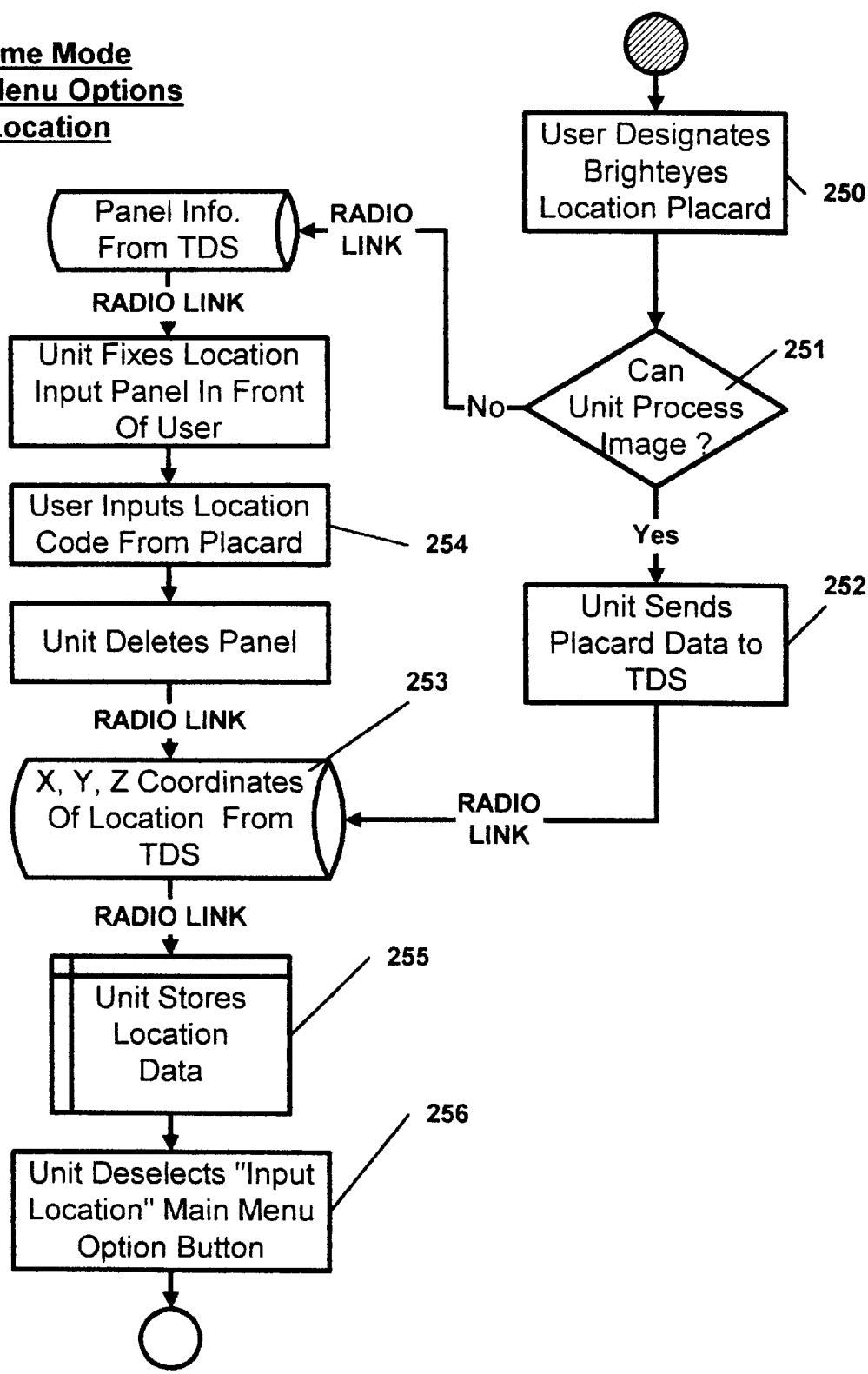
Figure 26:
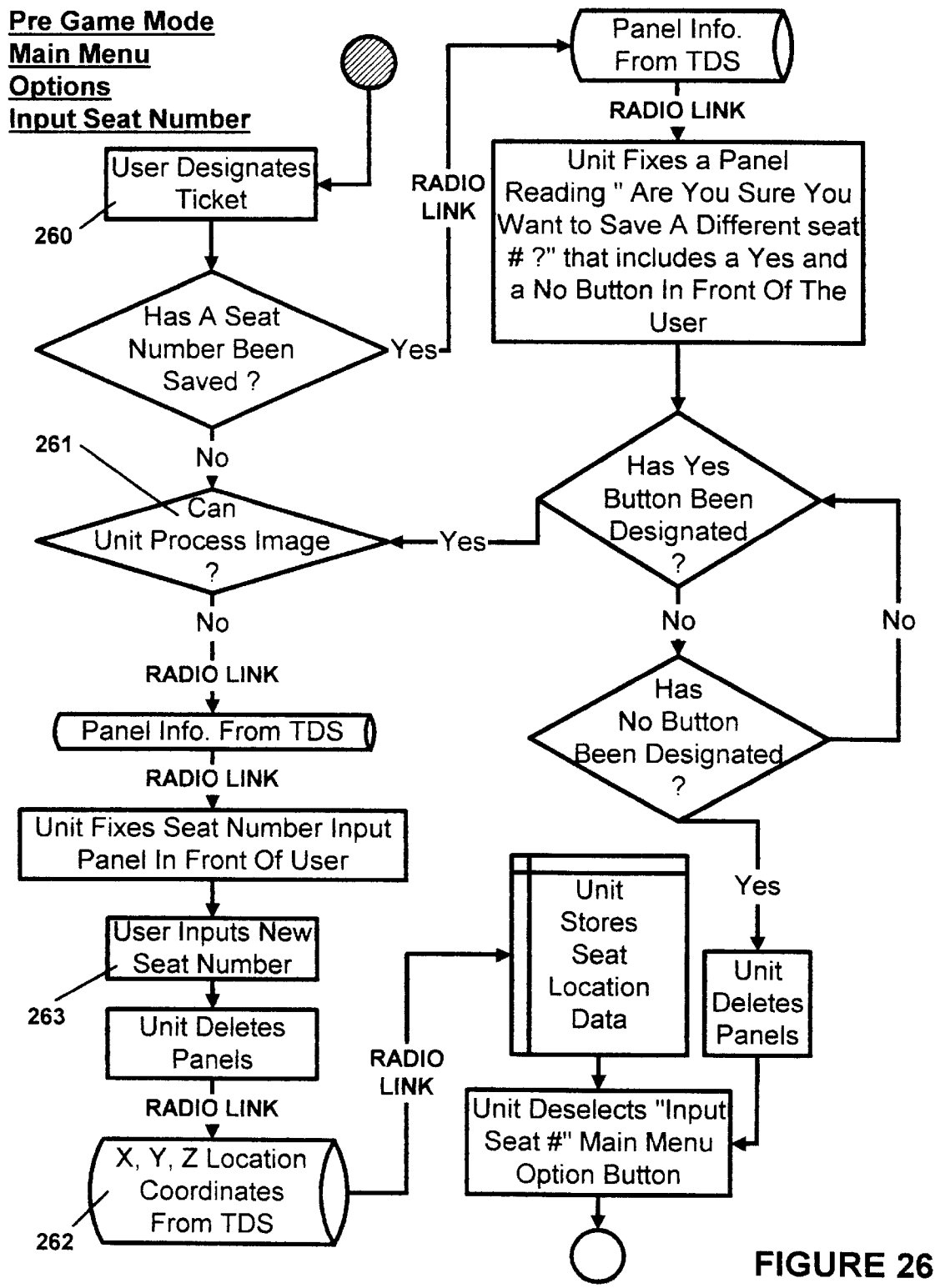
Figure 27:
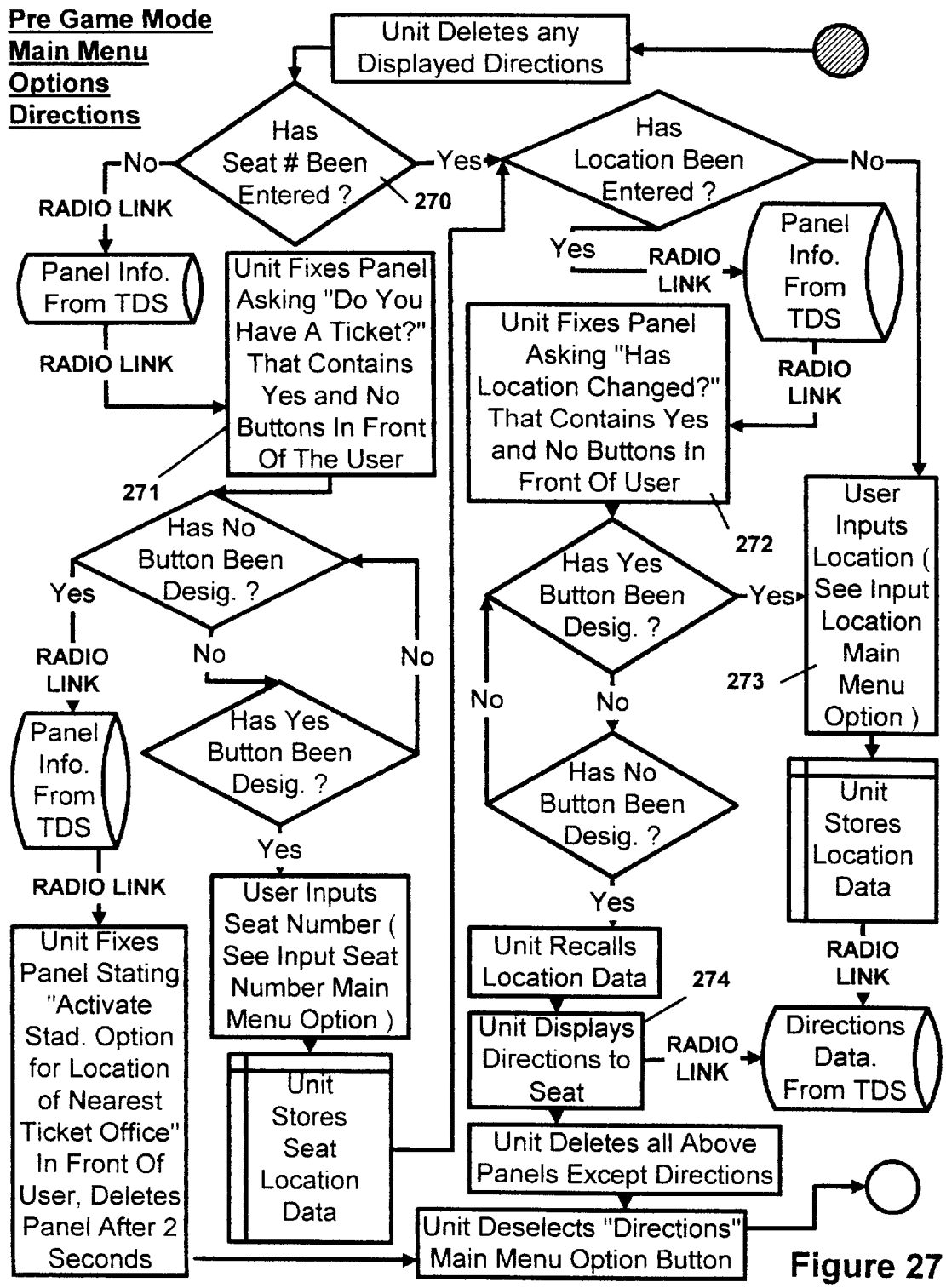
Figure 28:
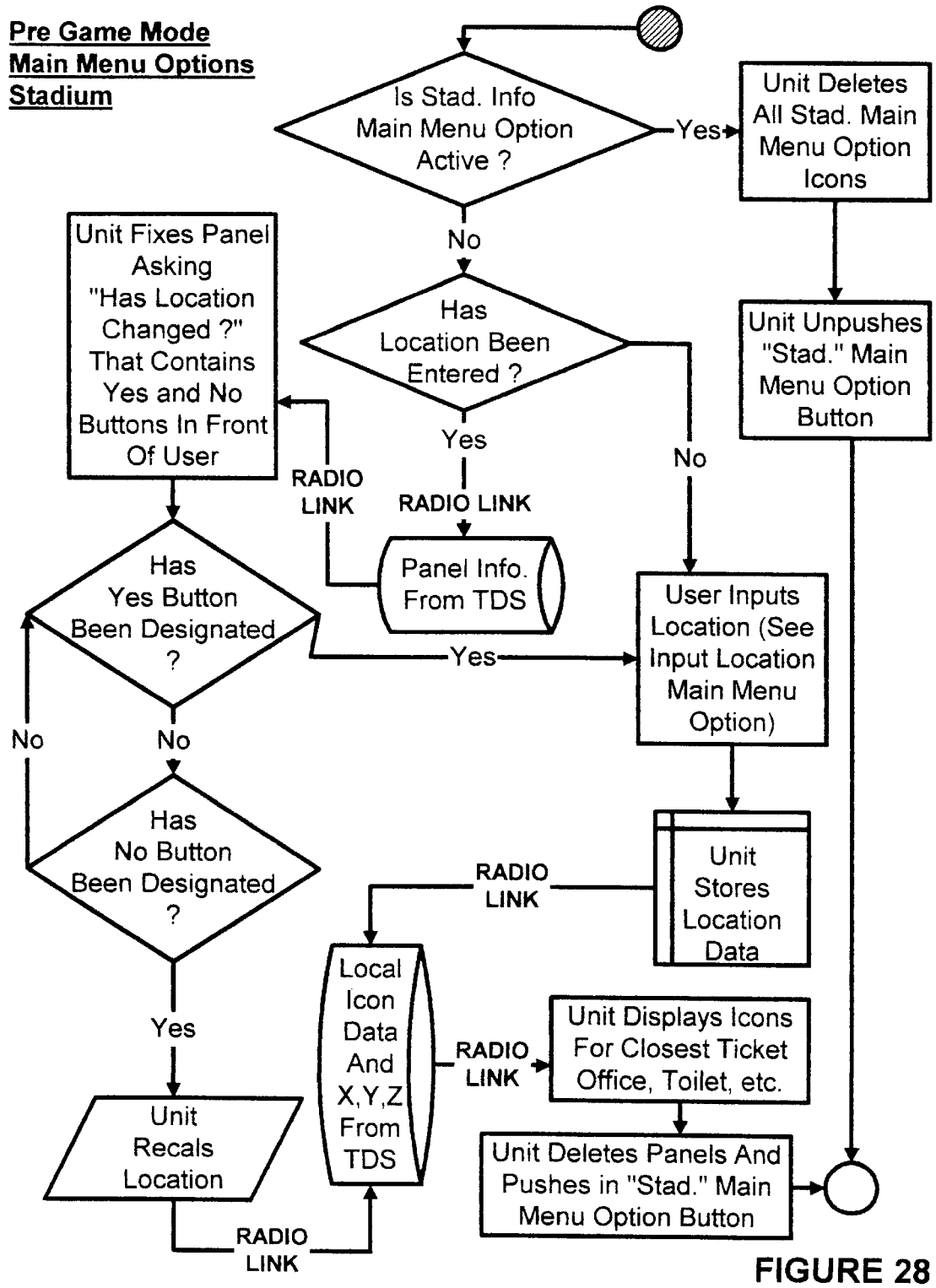
Figure 29:
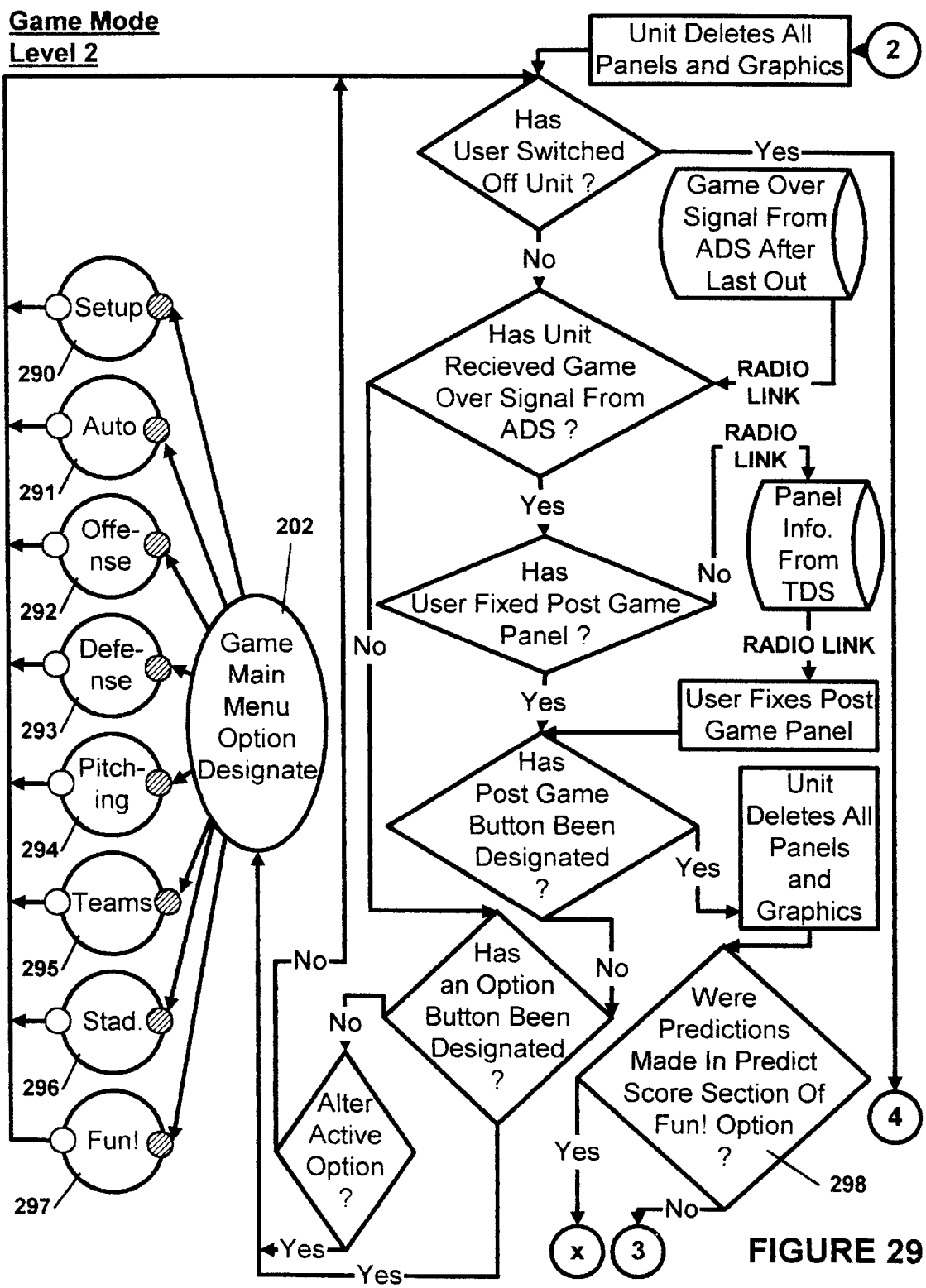
Figure 30:
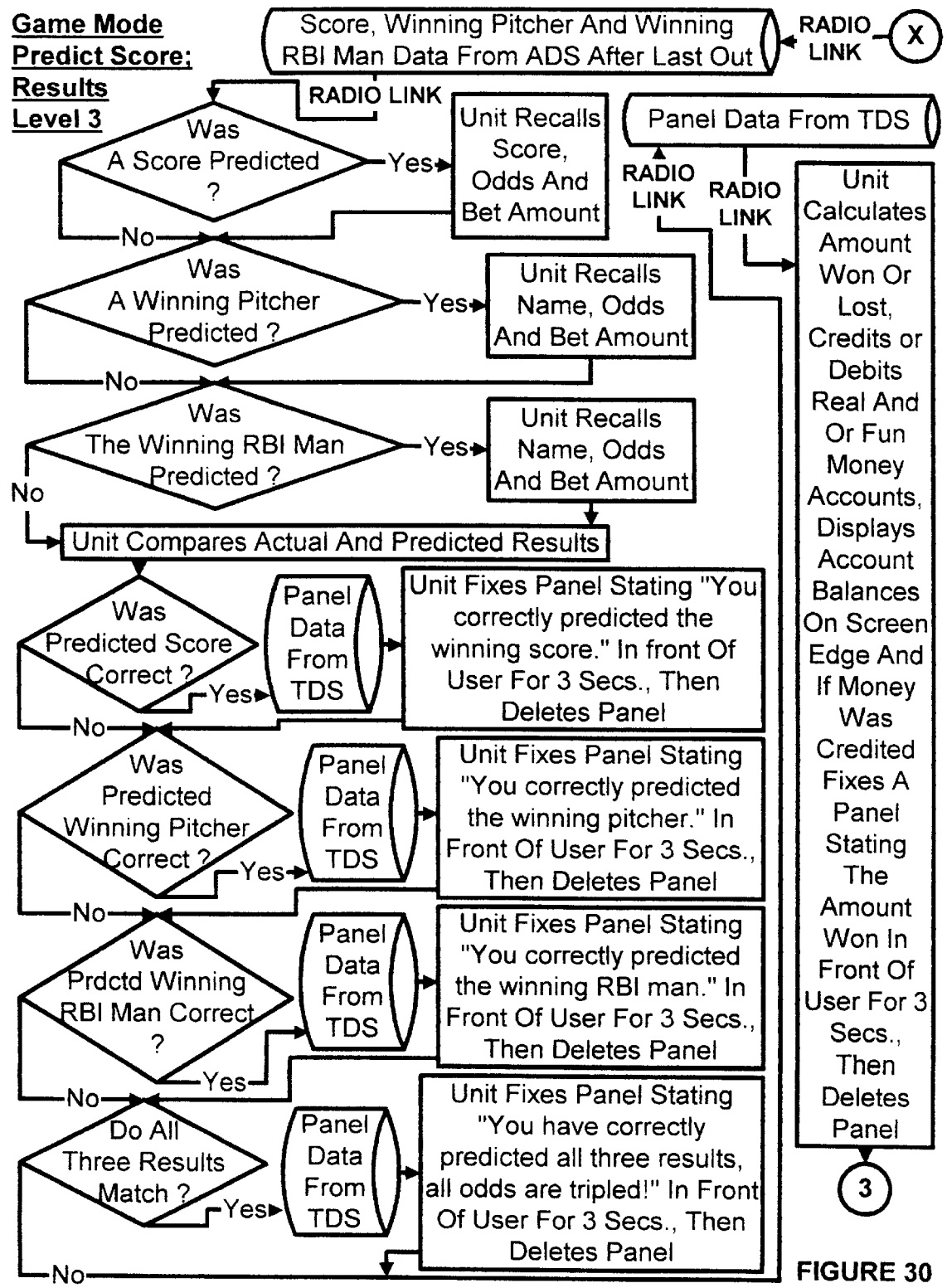
Figure 31:
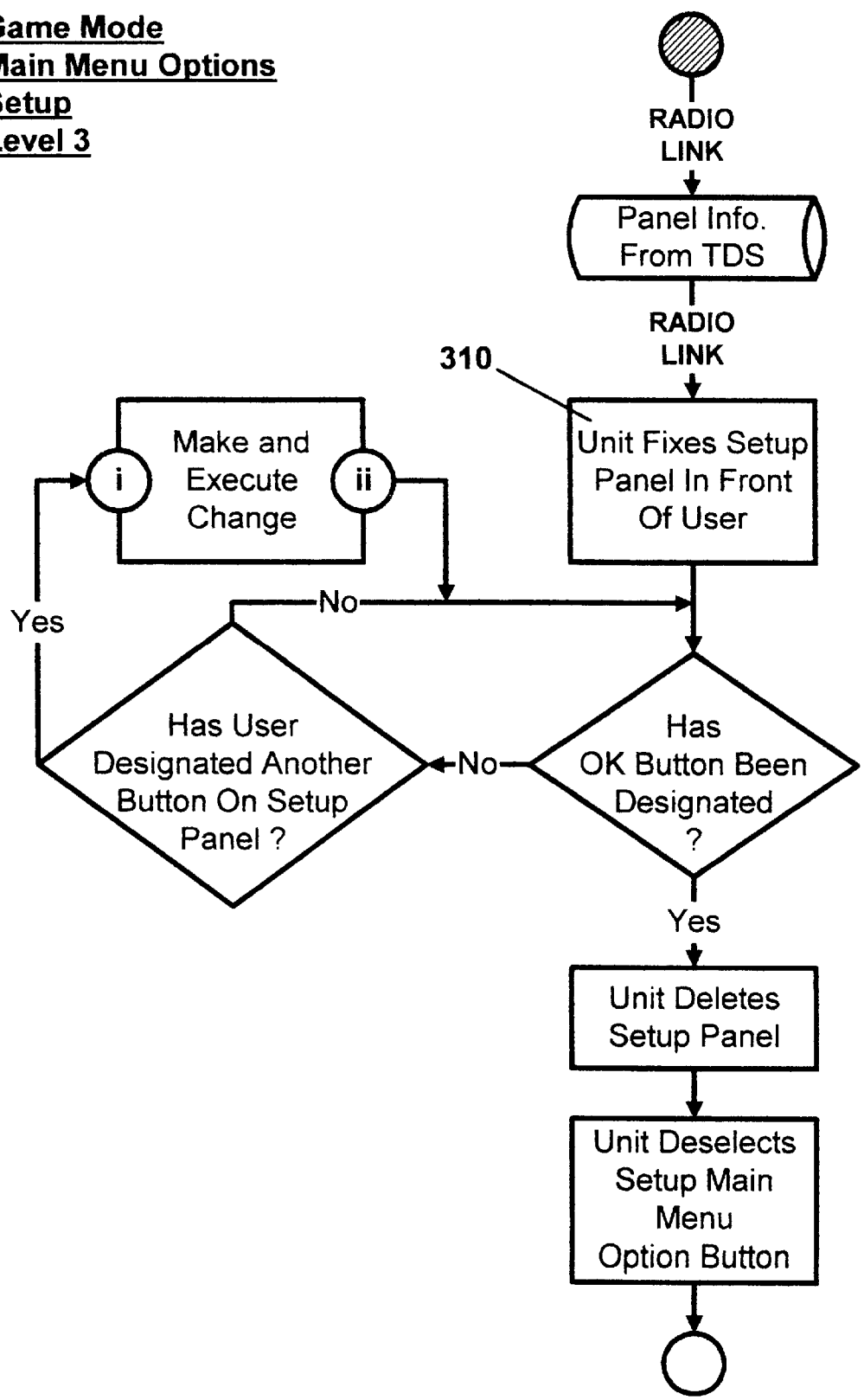
Figure 32:
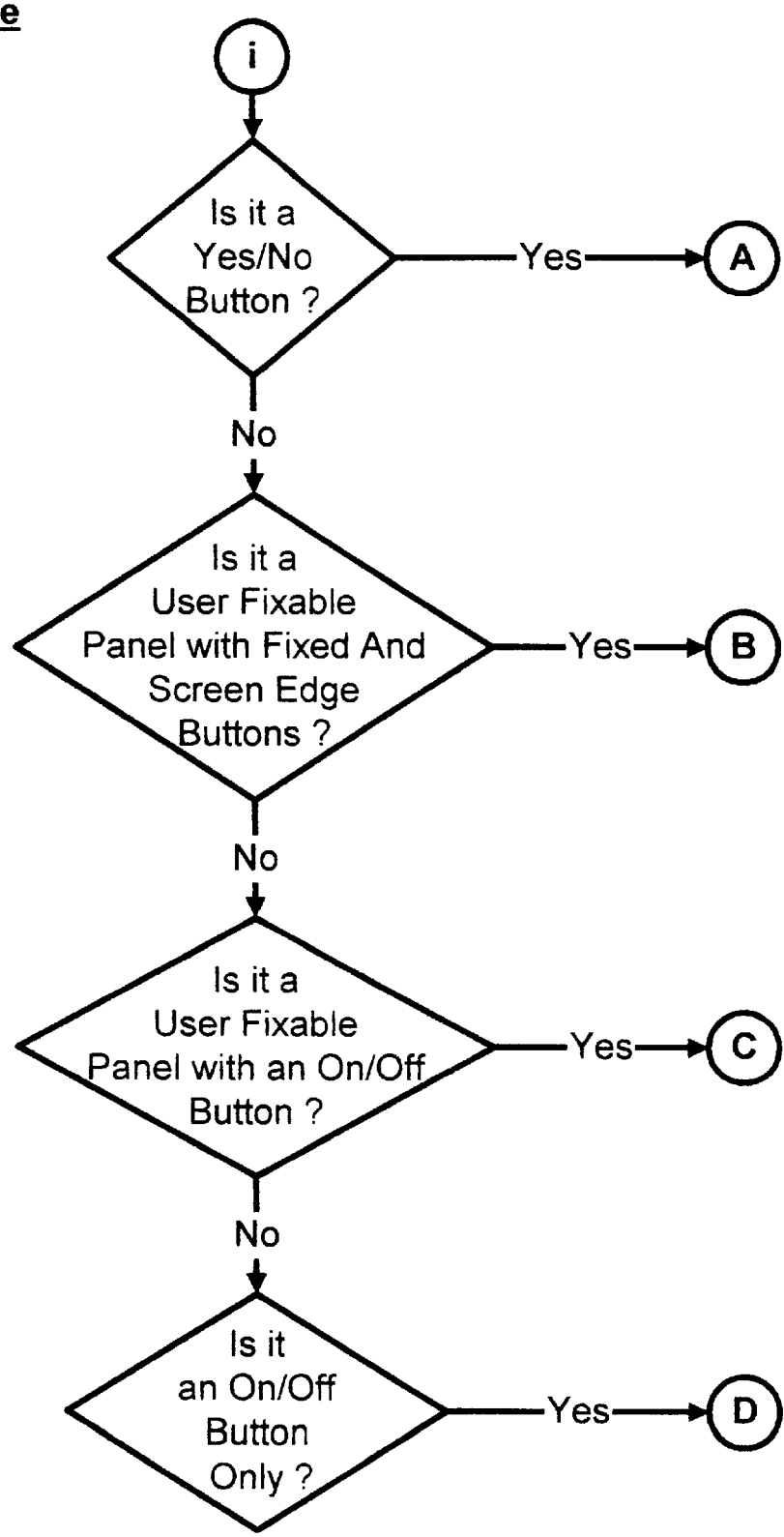
Figure 33:
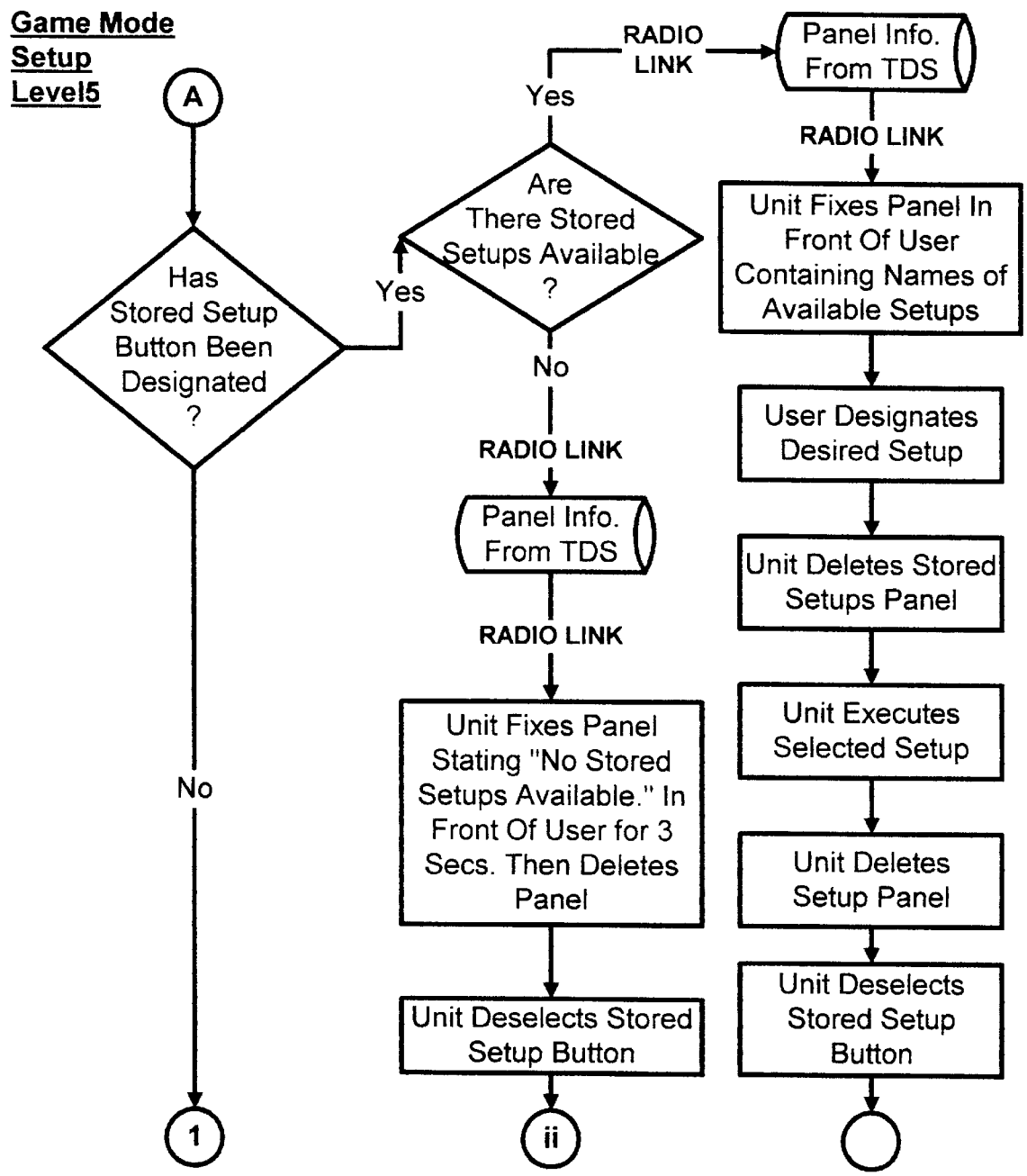
Figure 34:
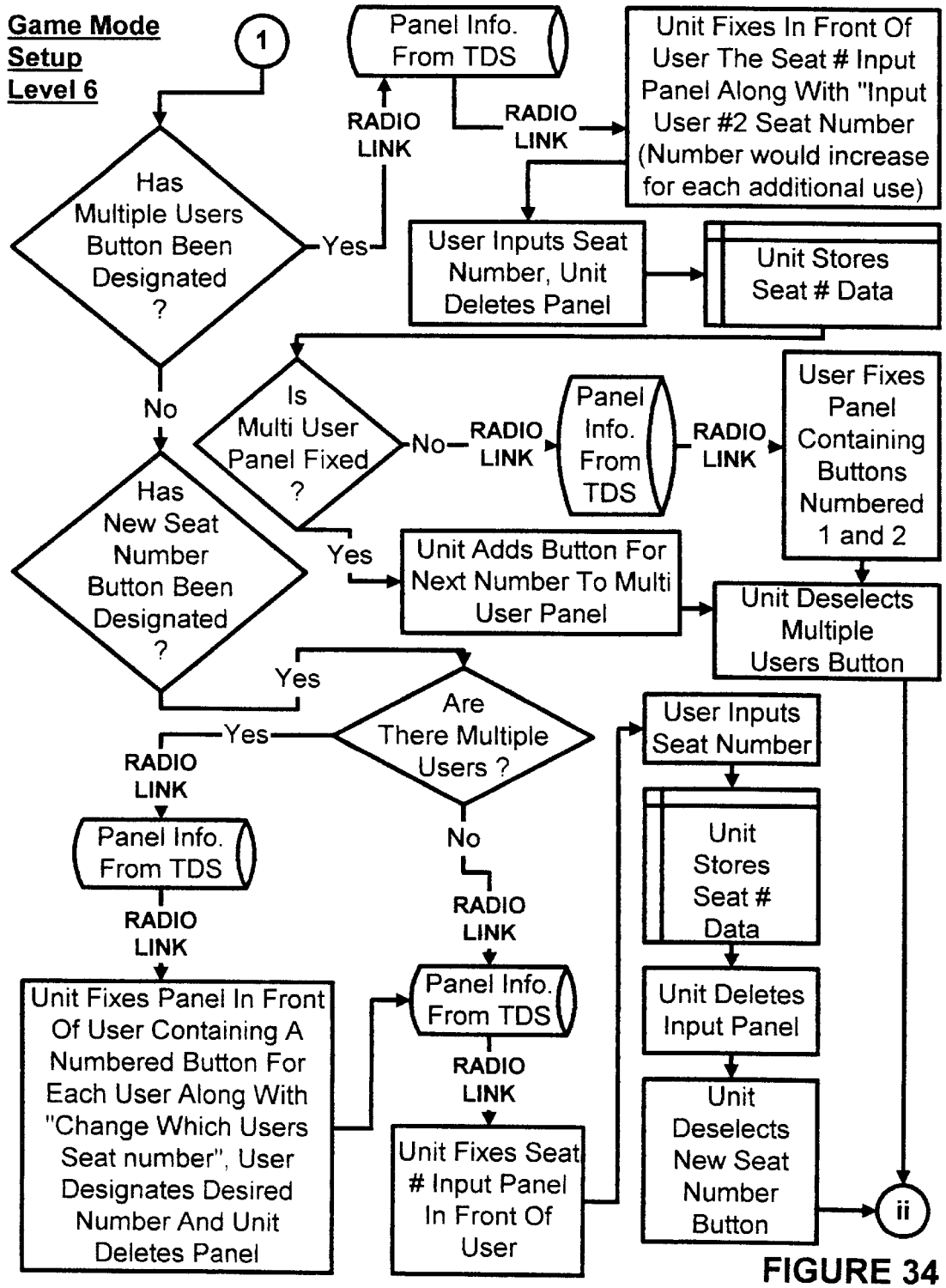
Figure 35:
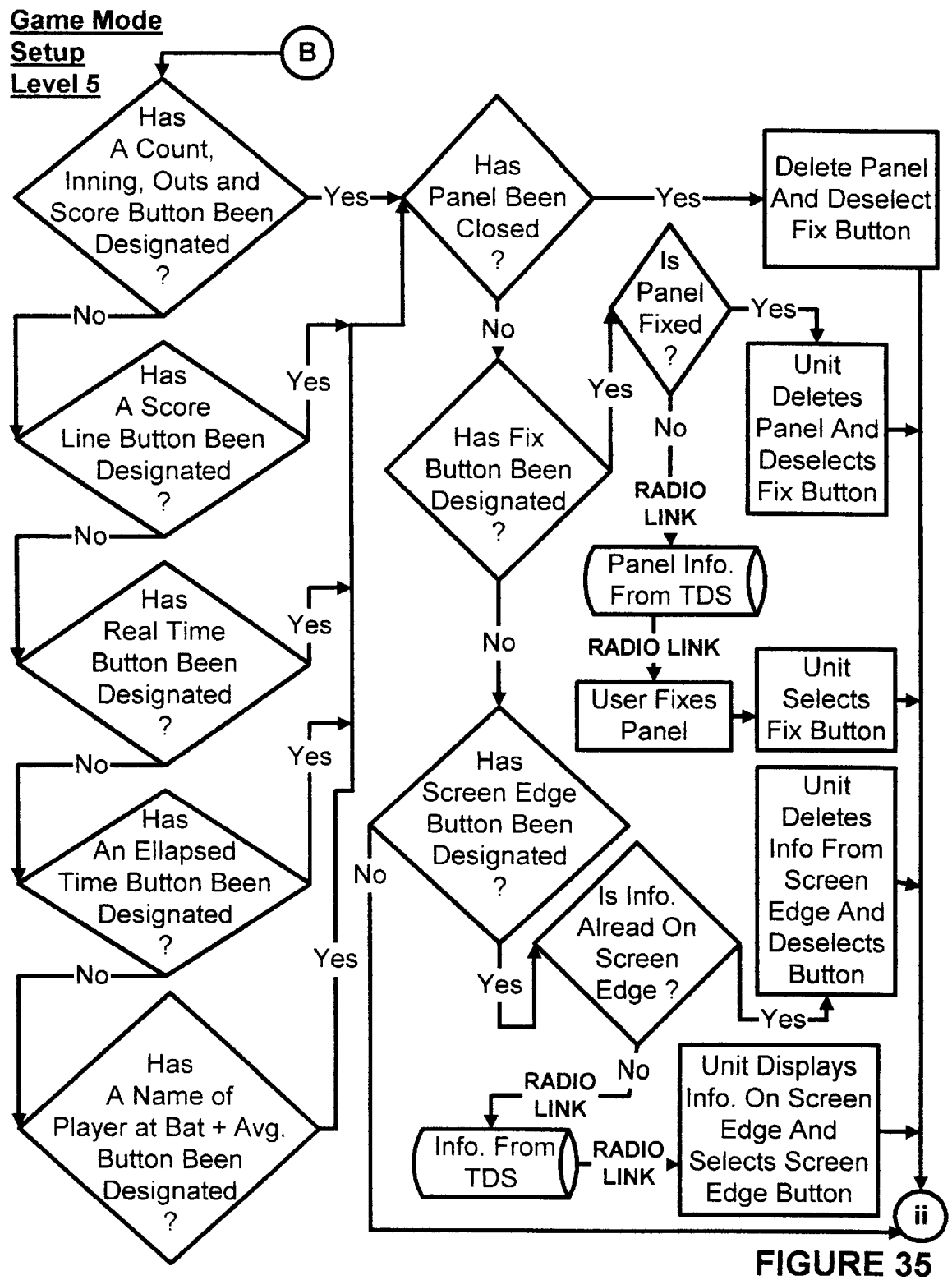
Figure 36:
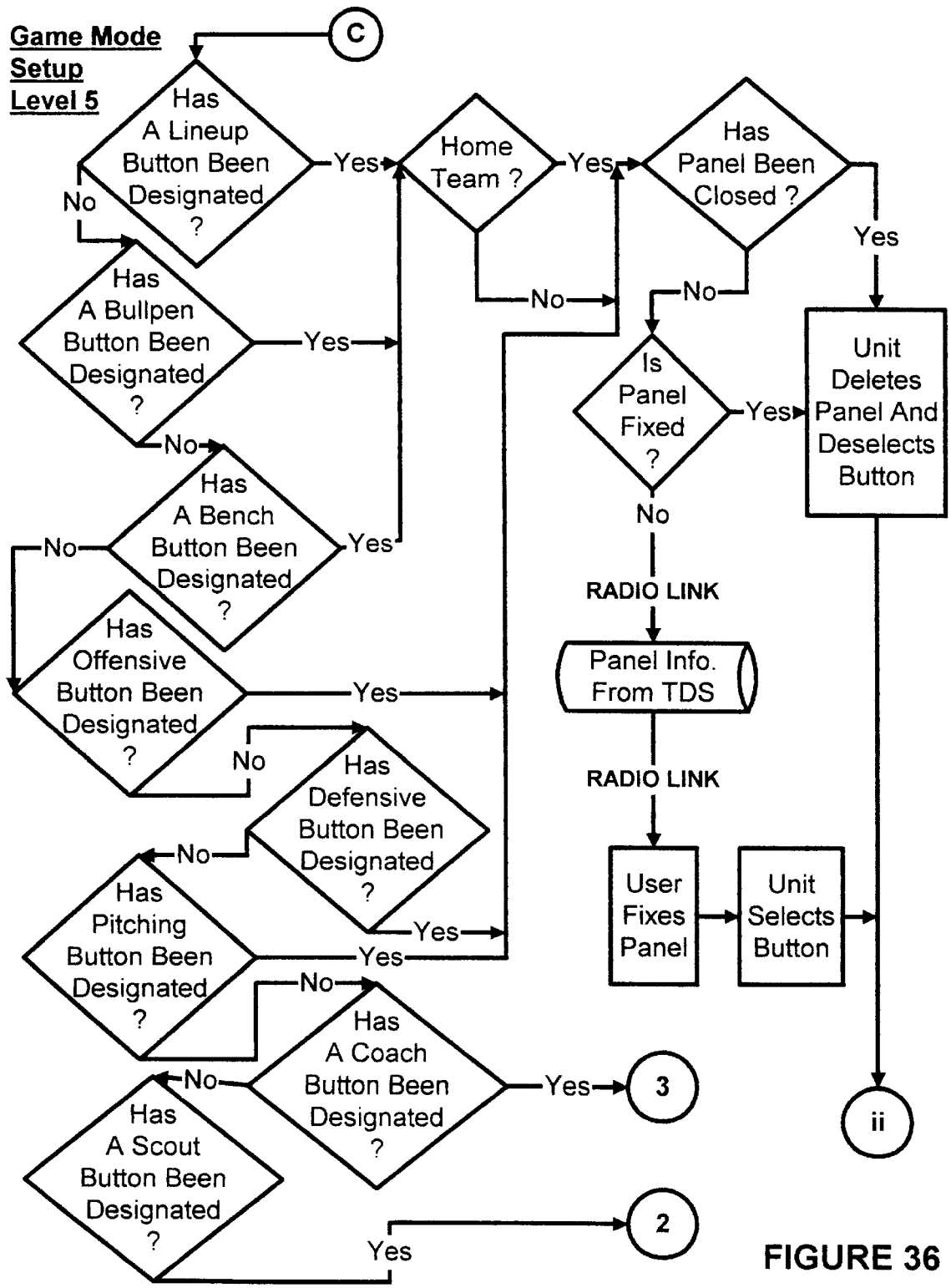
Figure 37:
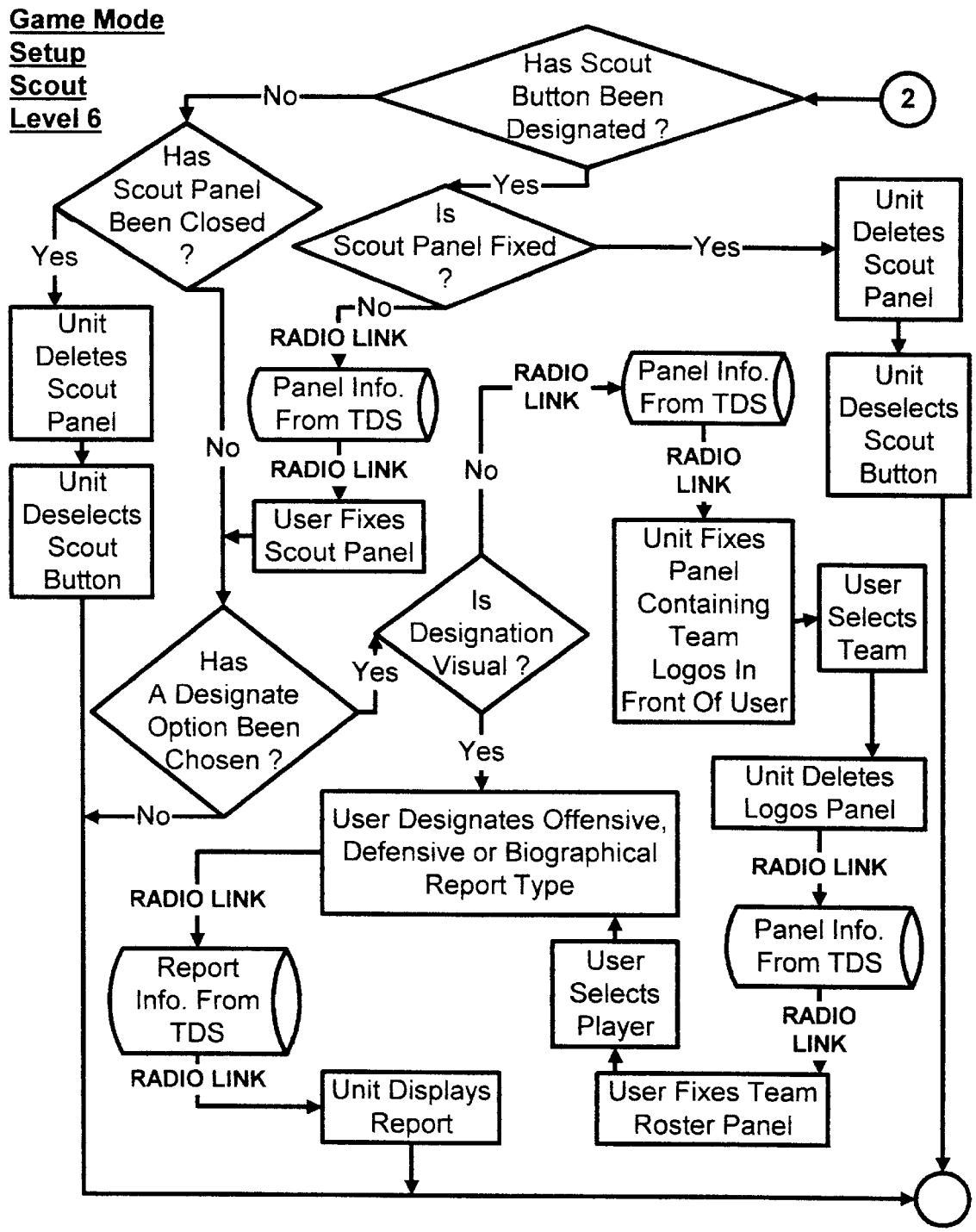
Figure 38:
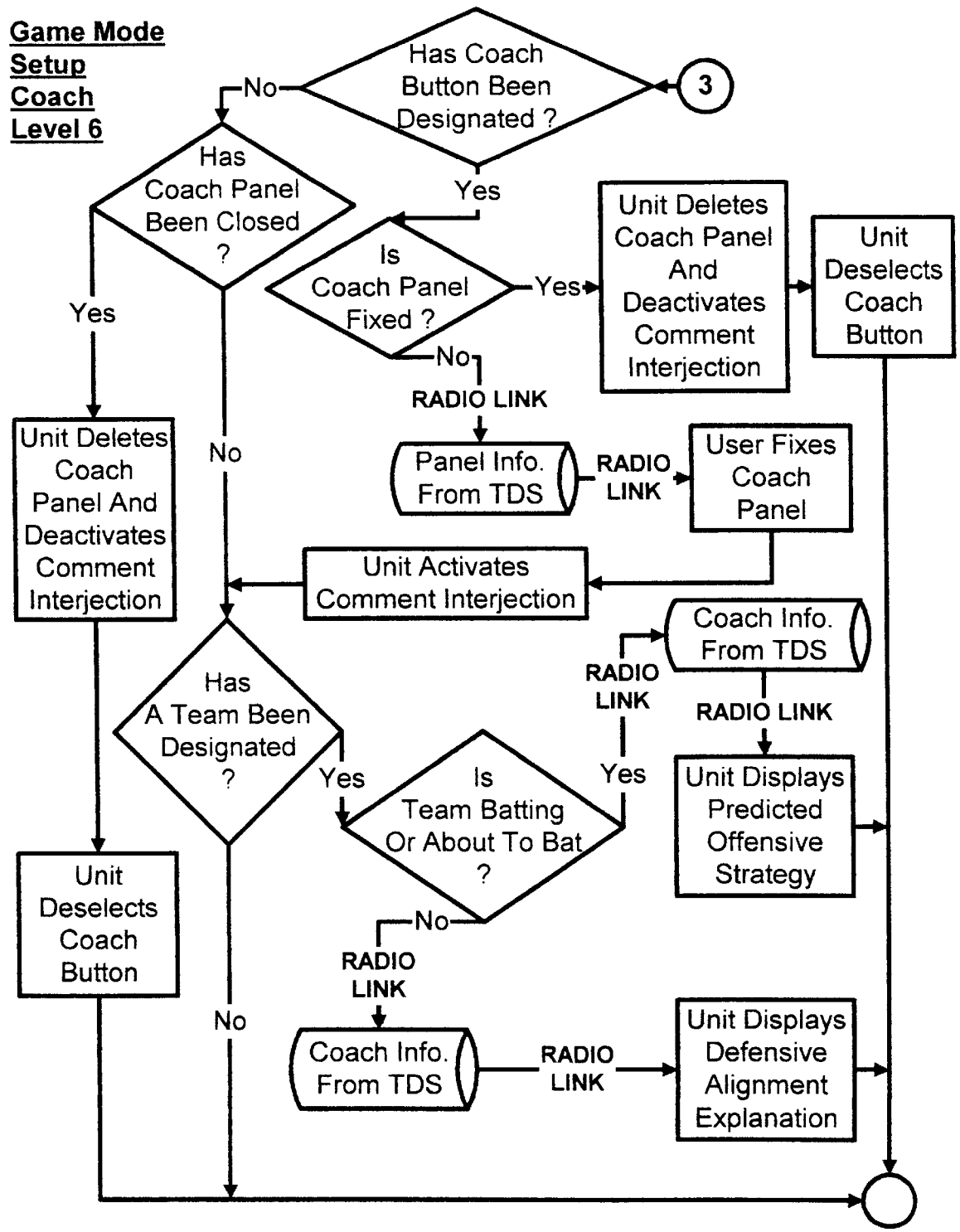
Figure 39:
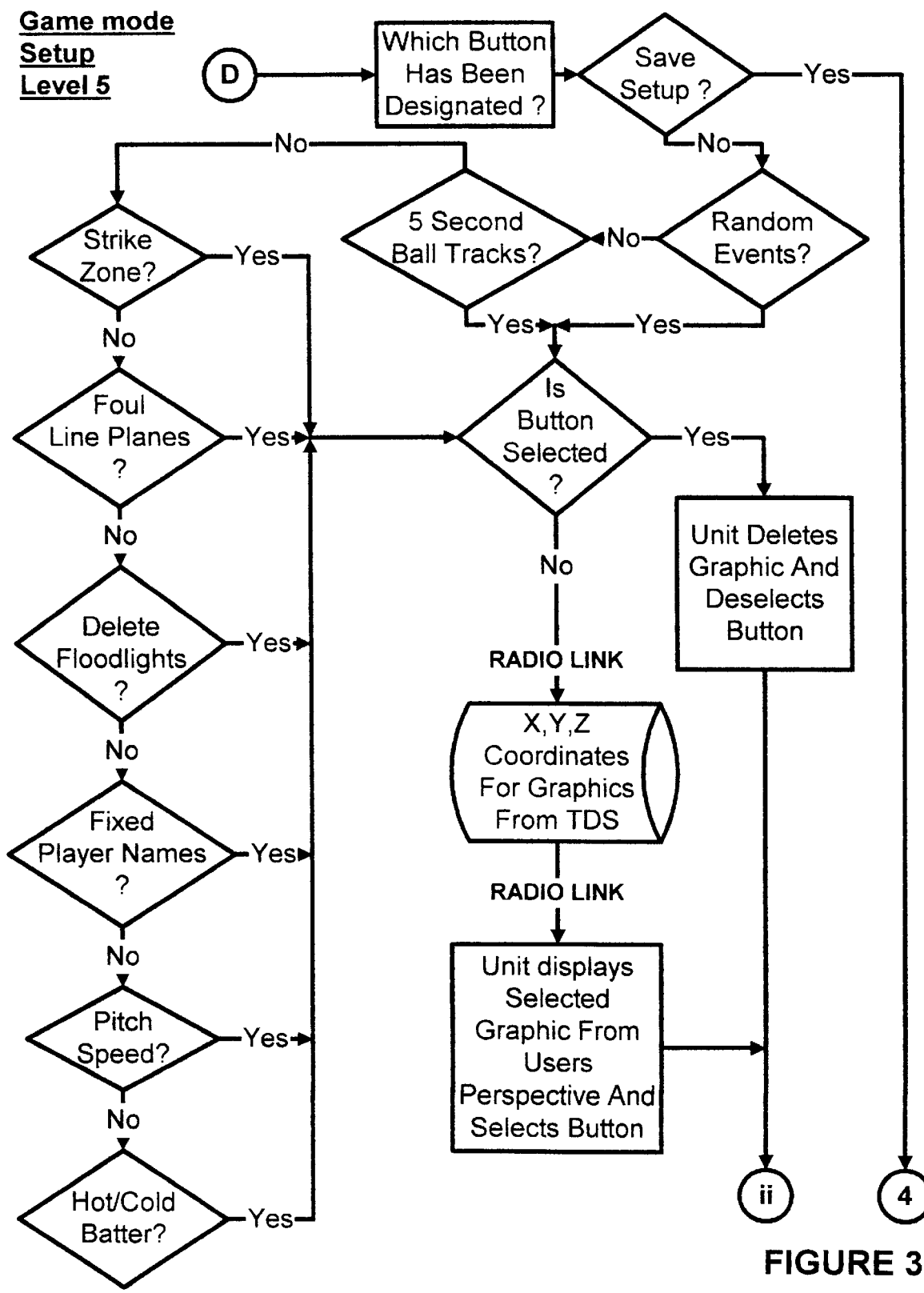
Figure 40:
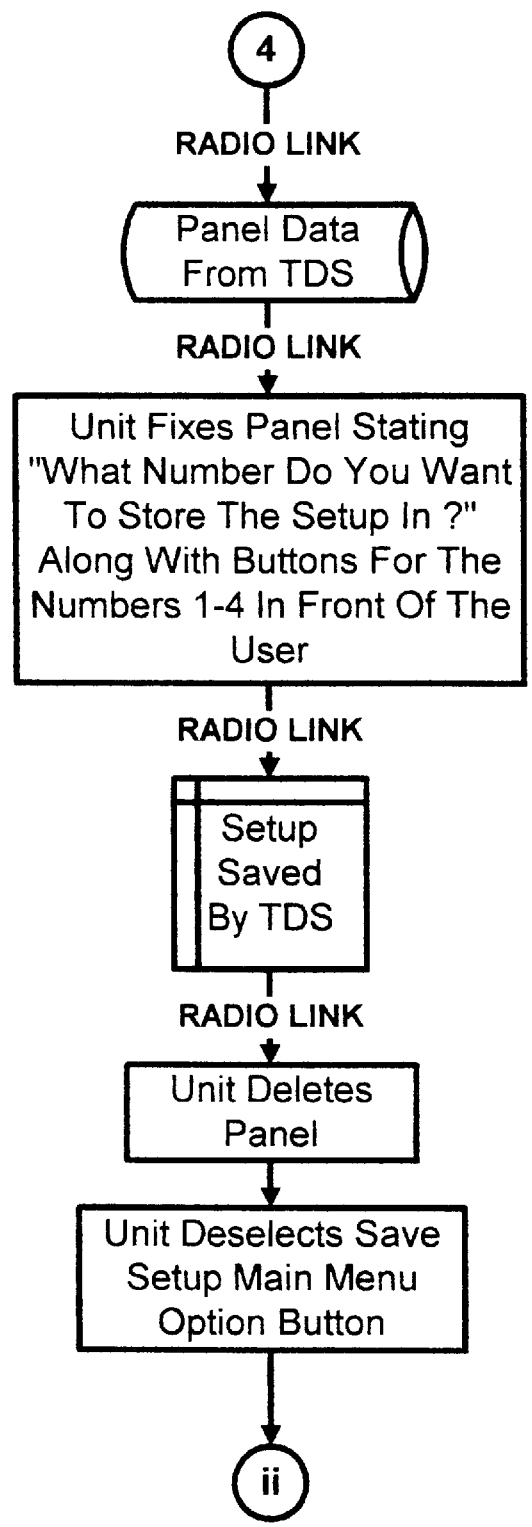
Figure 41:
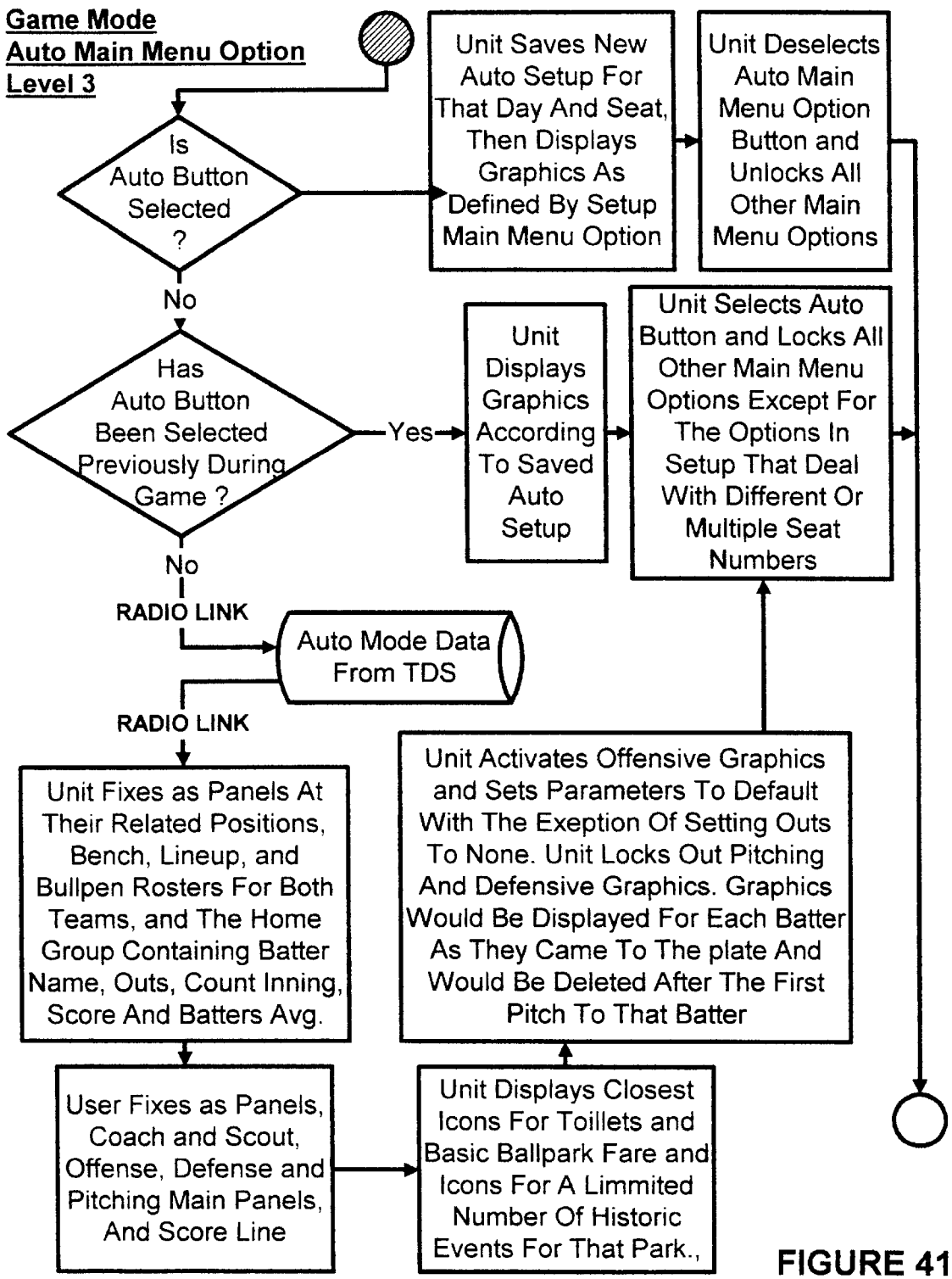
Figure 42:
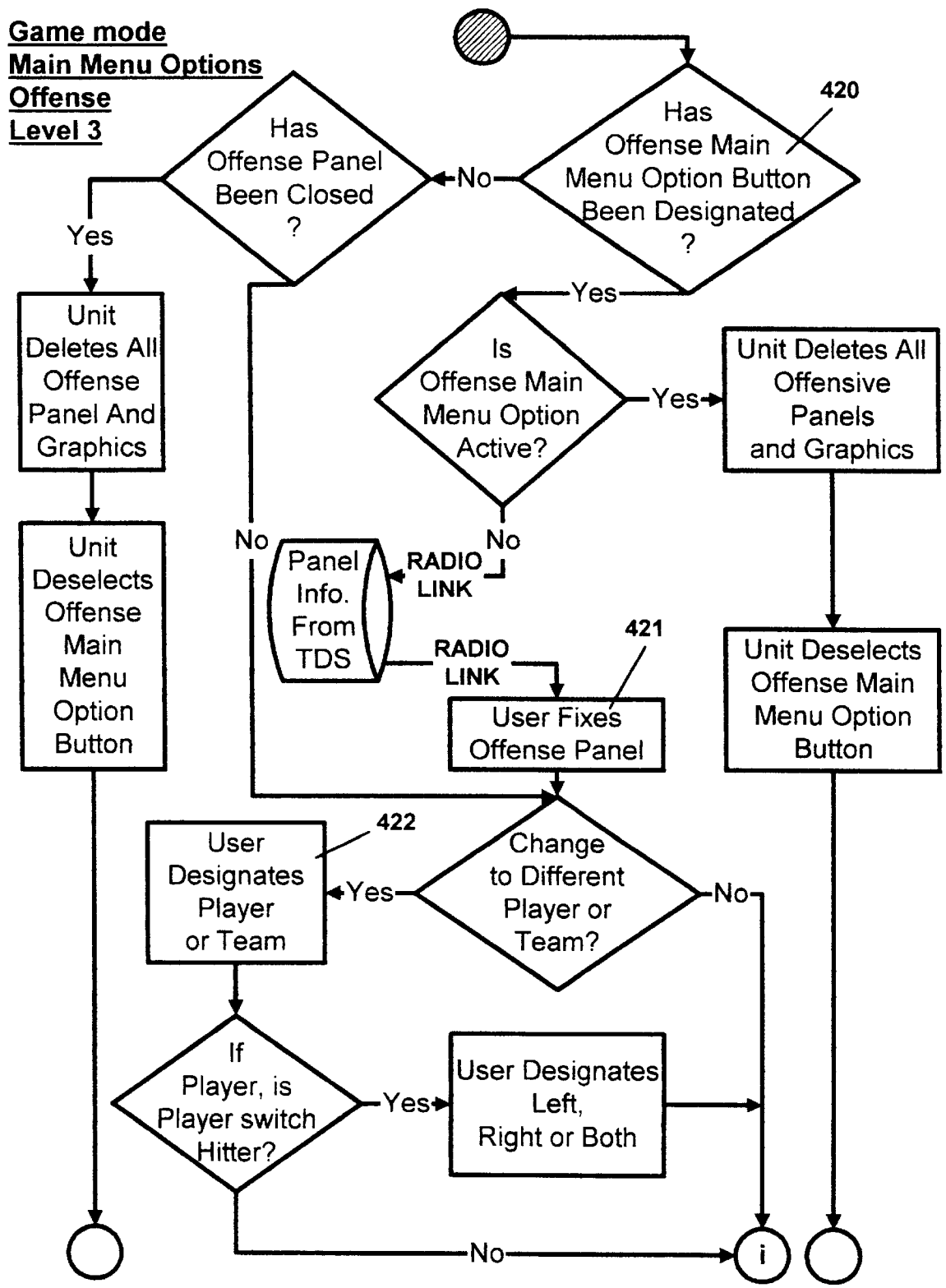
Figure 43:
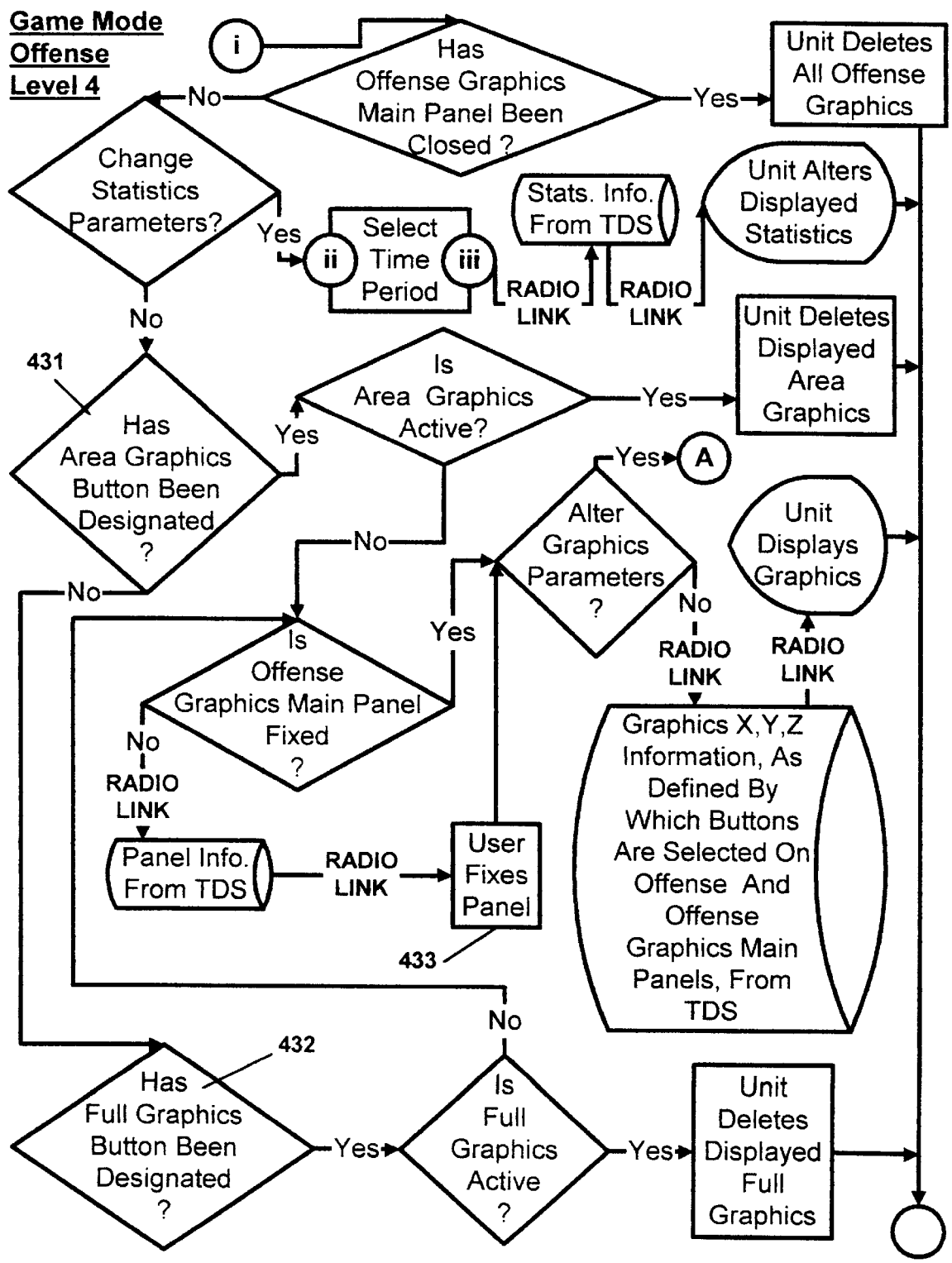
Figure 44:
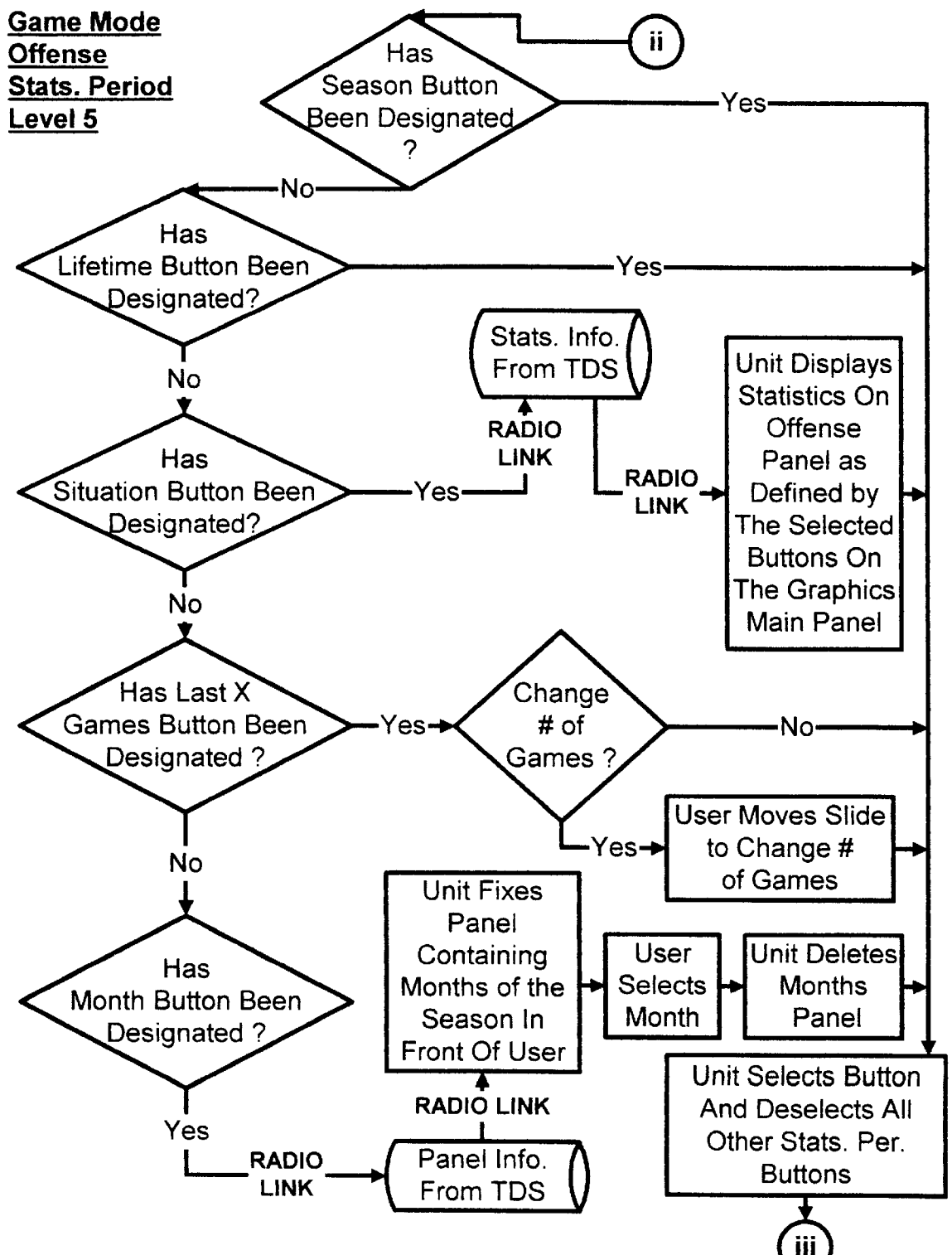
Figure 45:
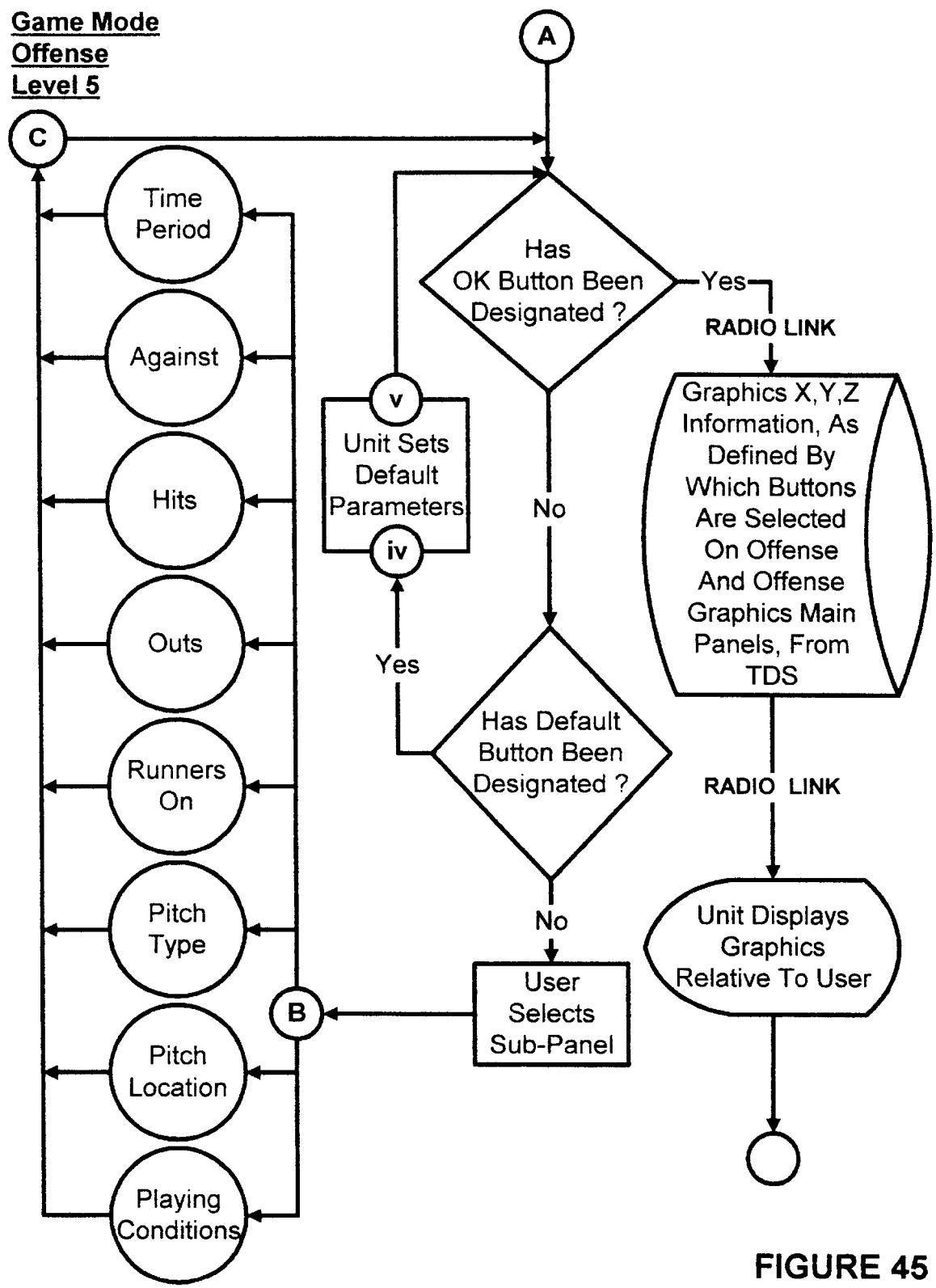
Figure 46:
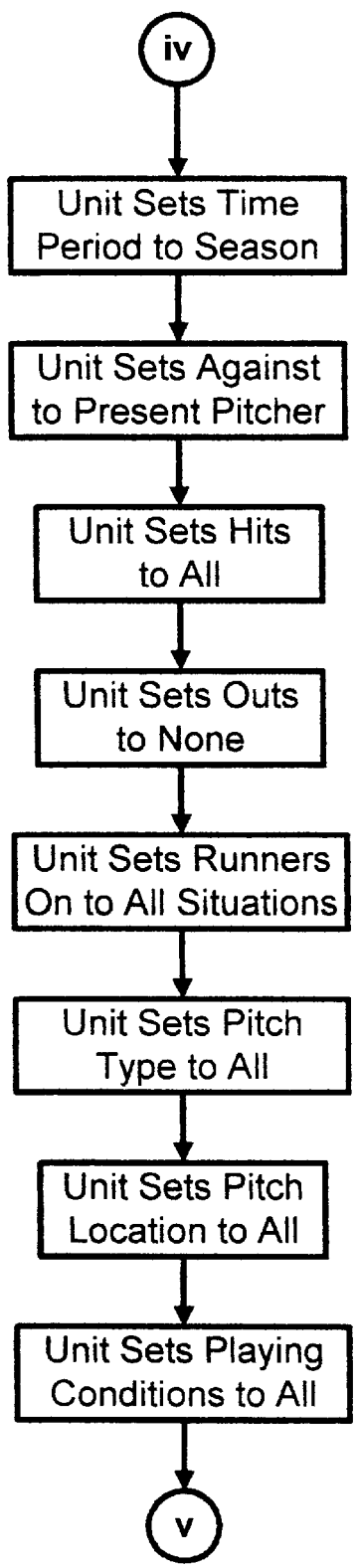
Figure 47:
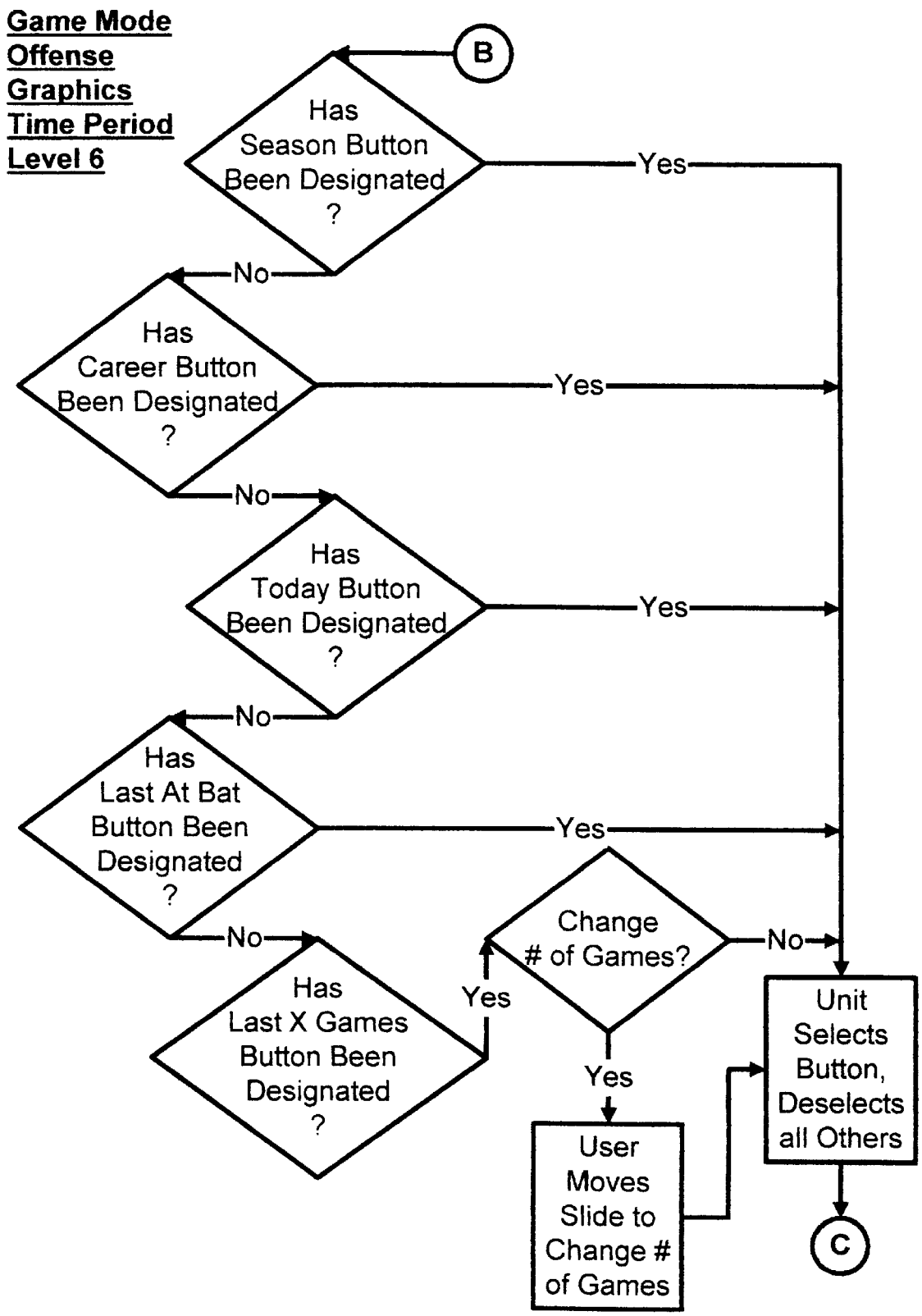
Figure 48:
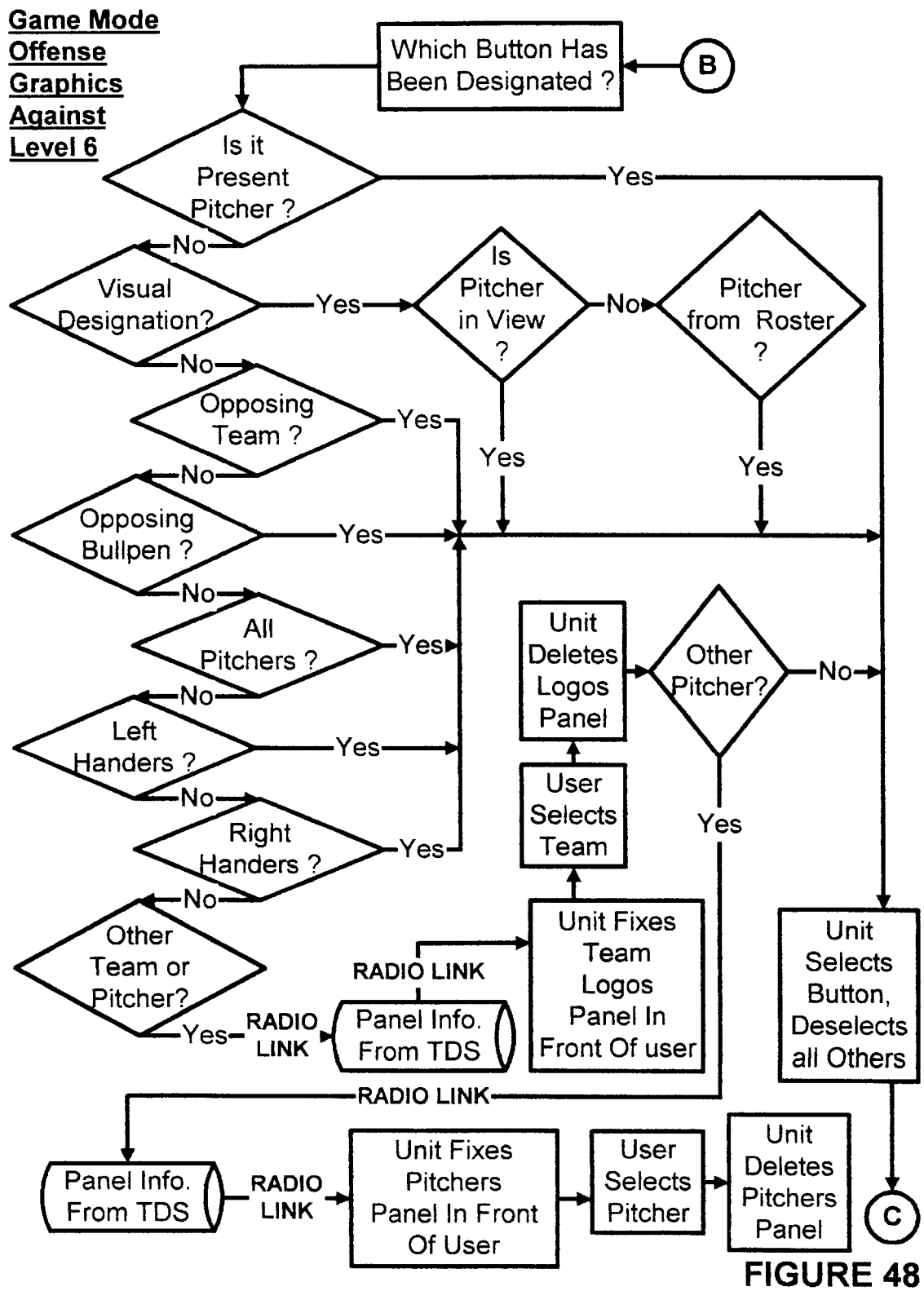
Figure 49:
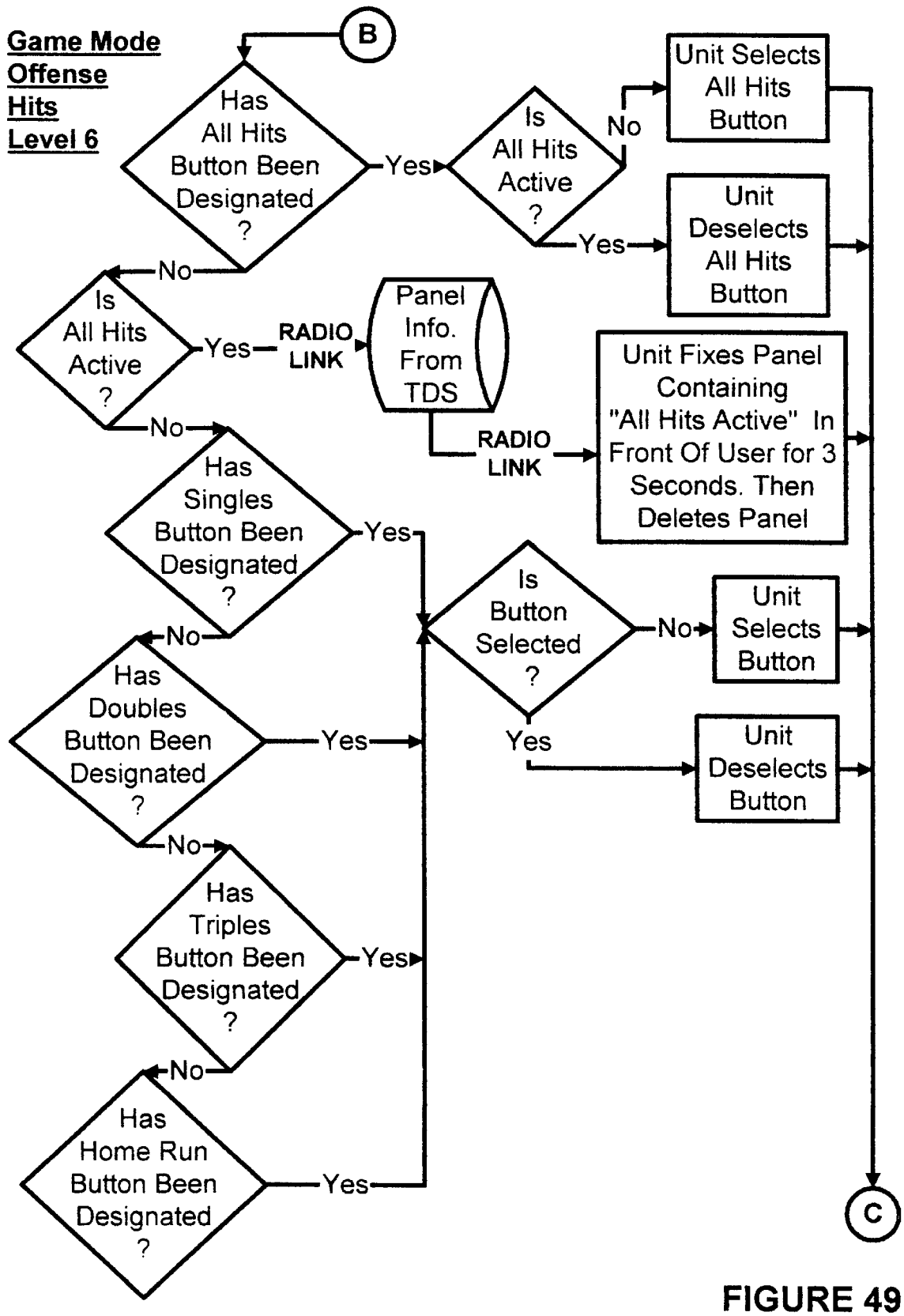
Figure 50:
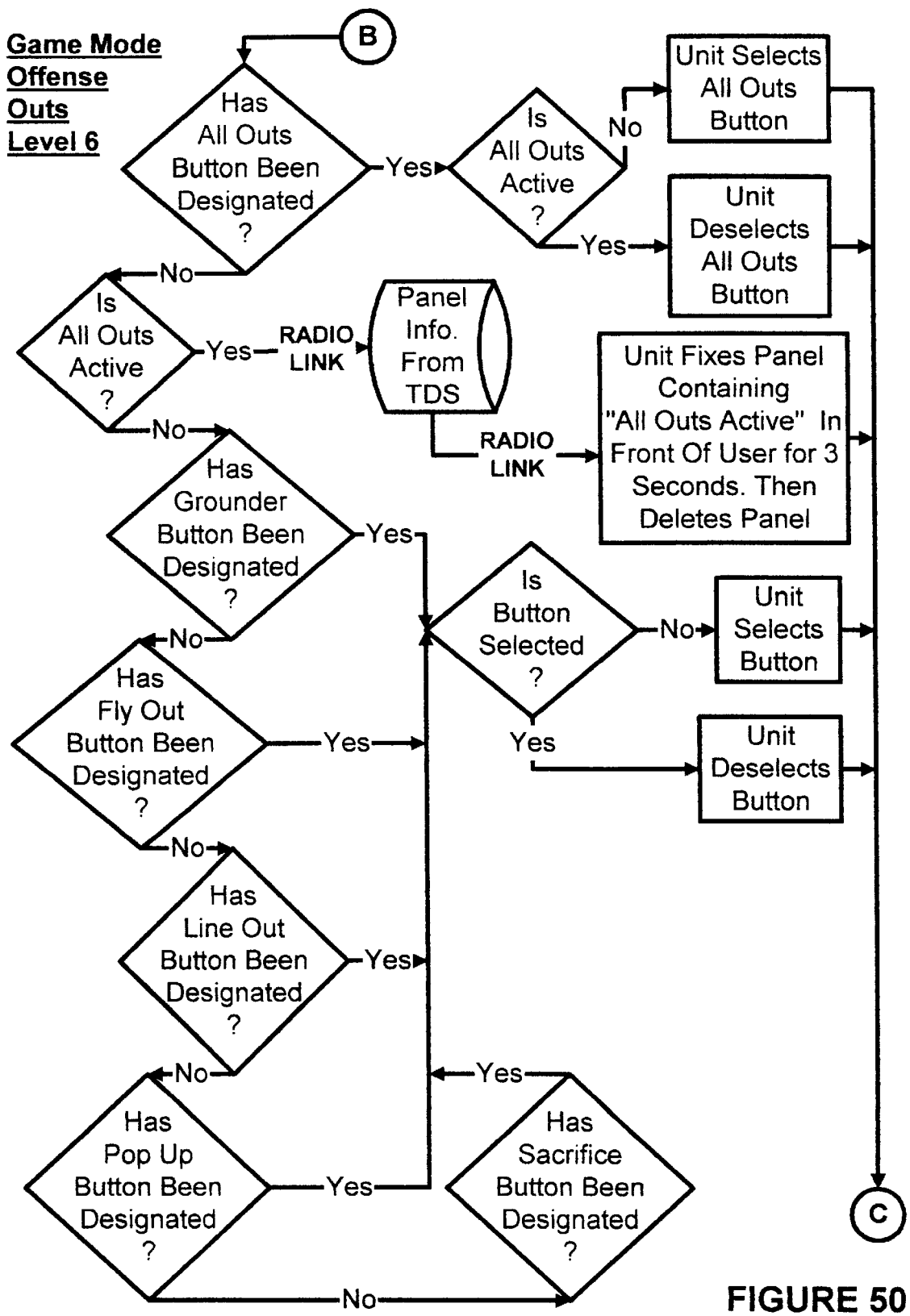
Figure 51:
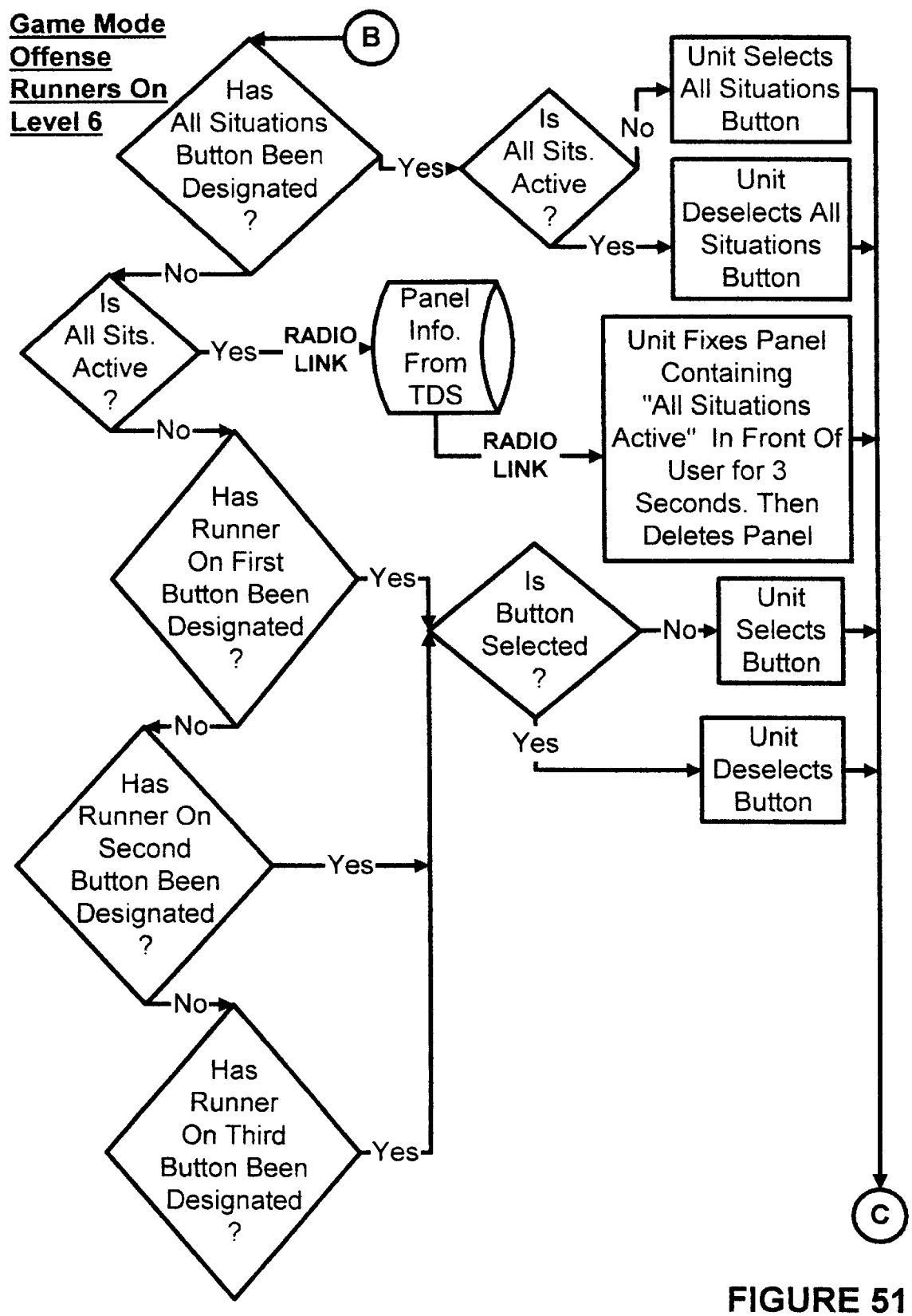
Figure 52:
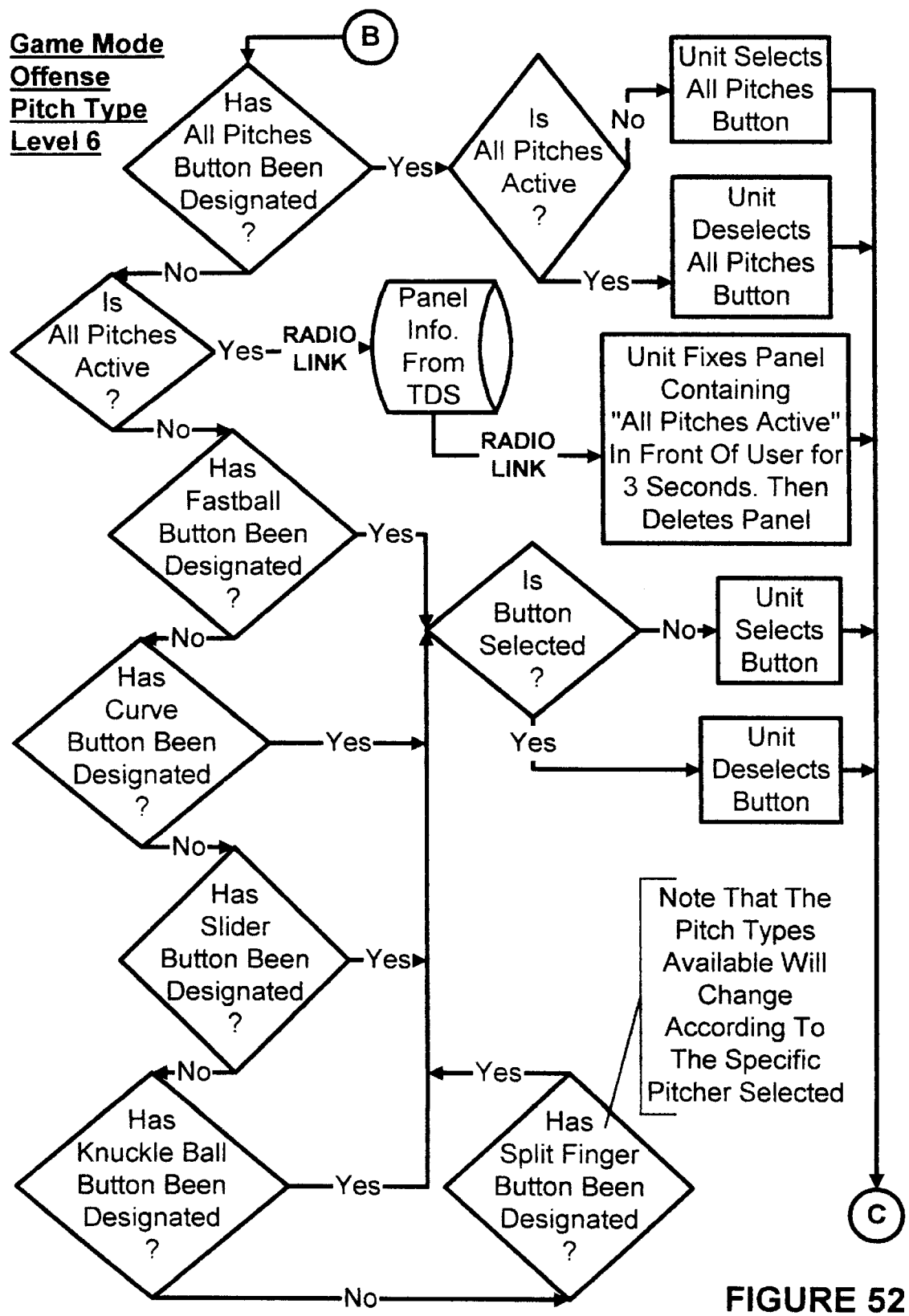
Figure 53:
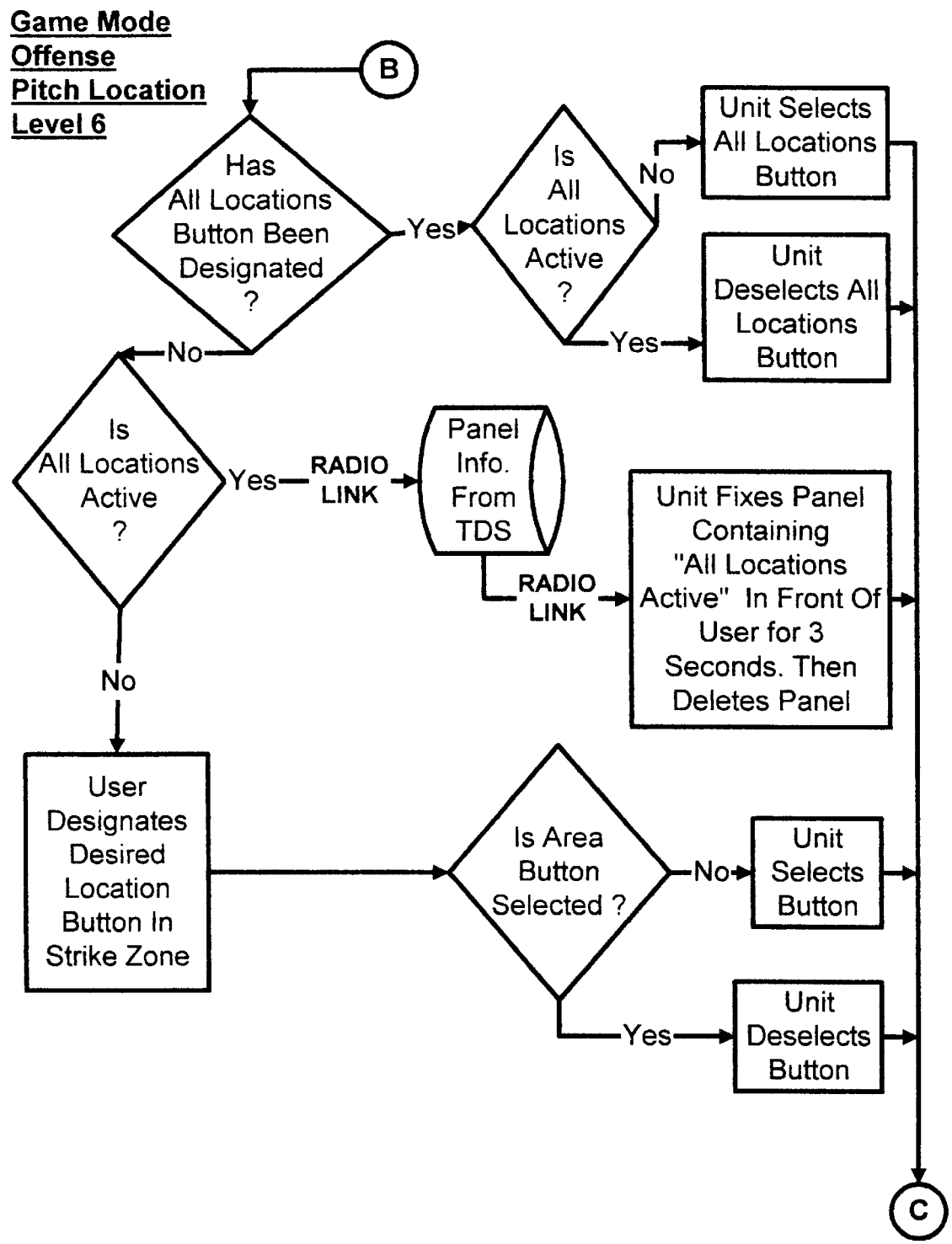
Figure 54:
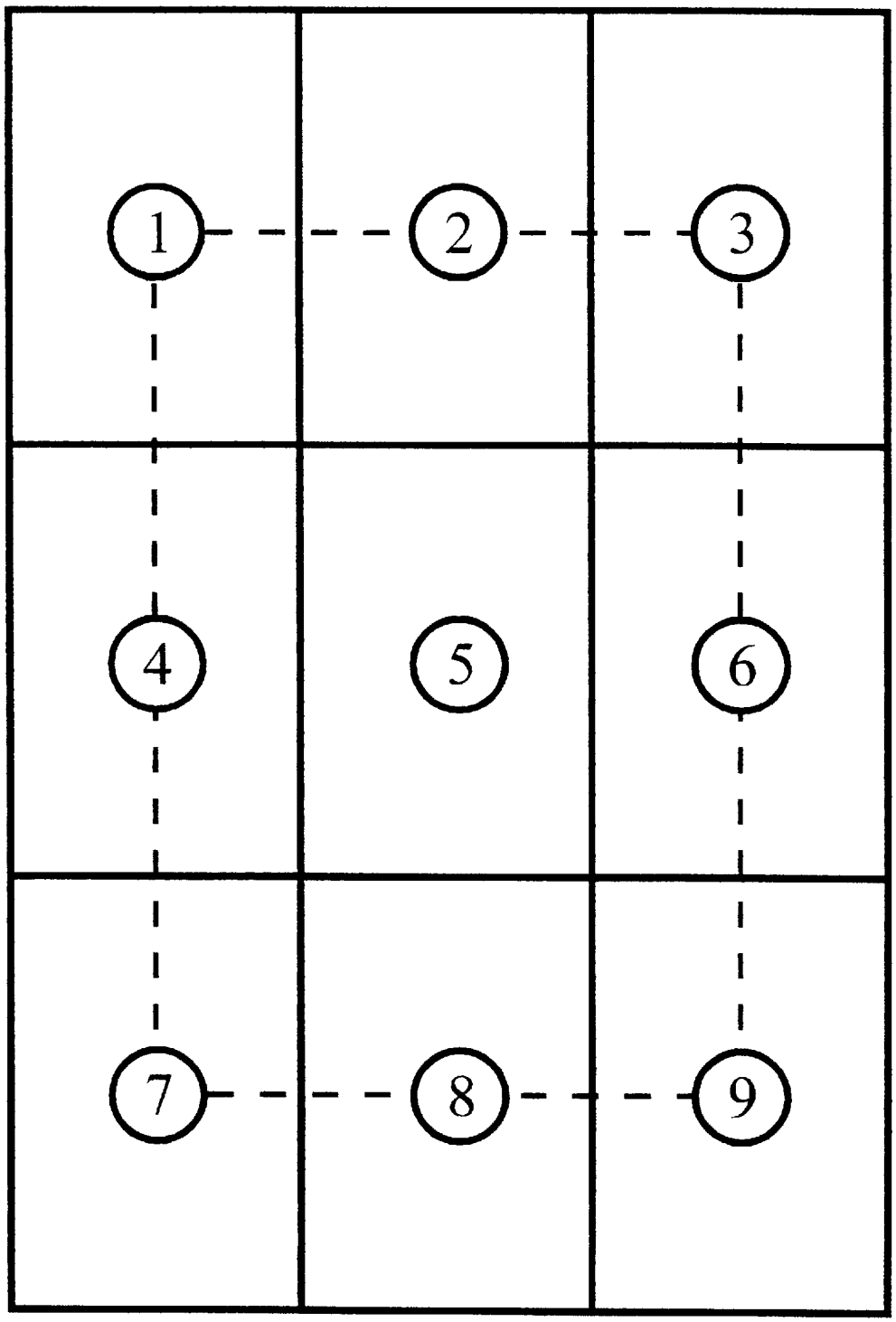
Figure 55:
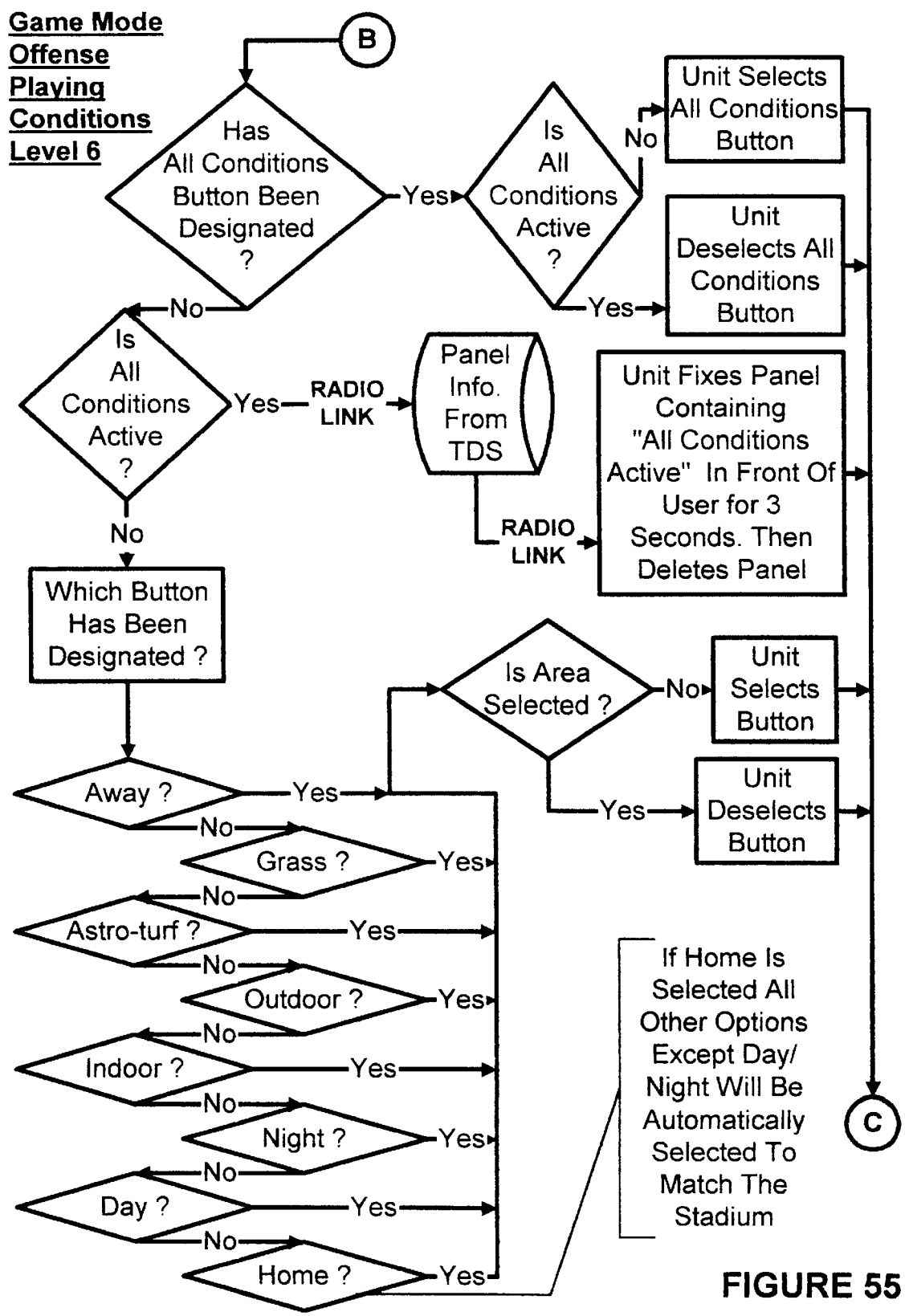
Figure 56:
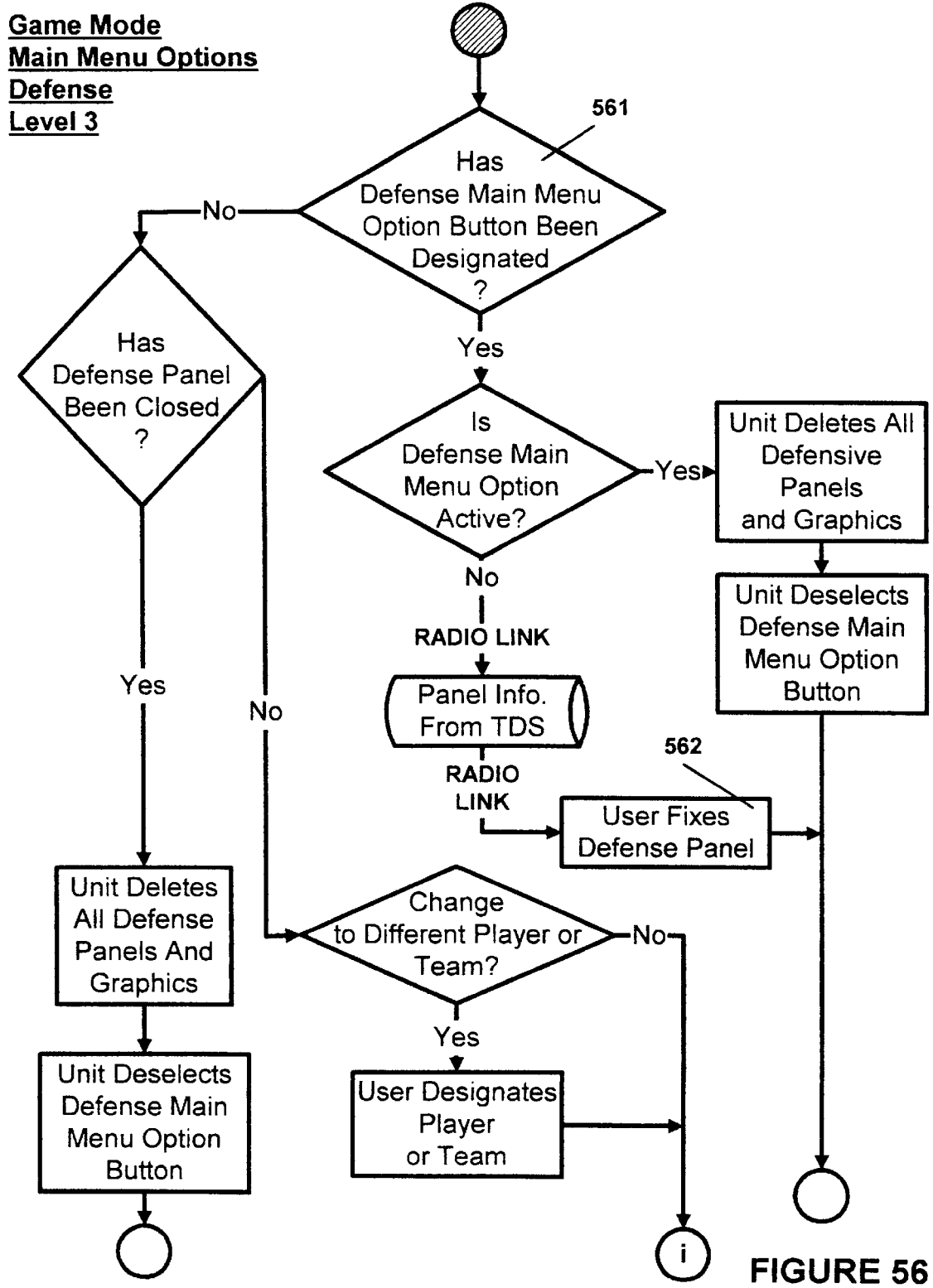
Figure 57:
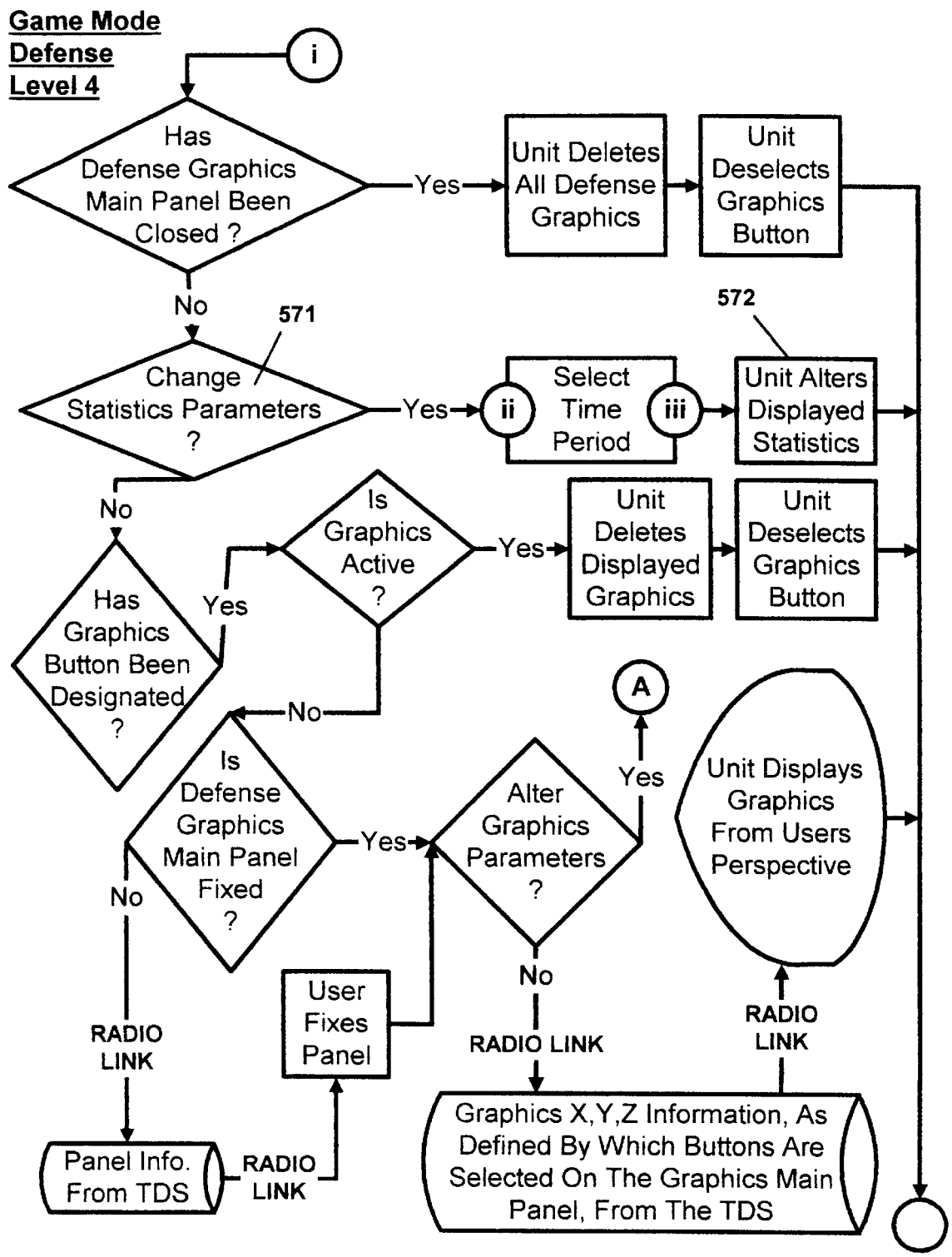
Figure 58:
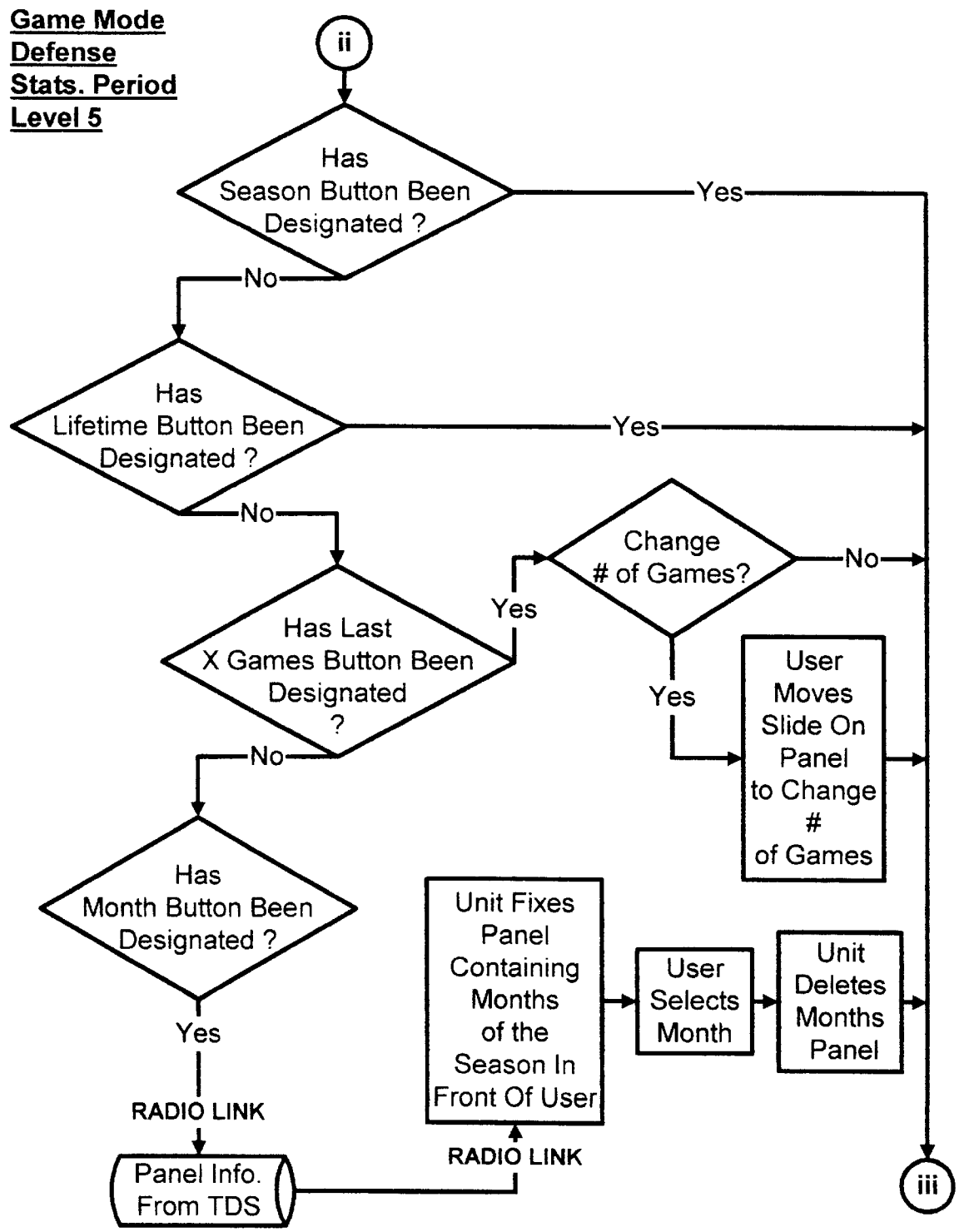
Figure 59:
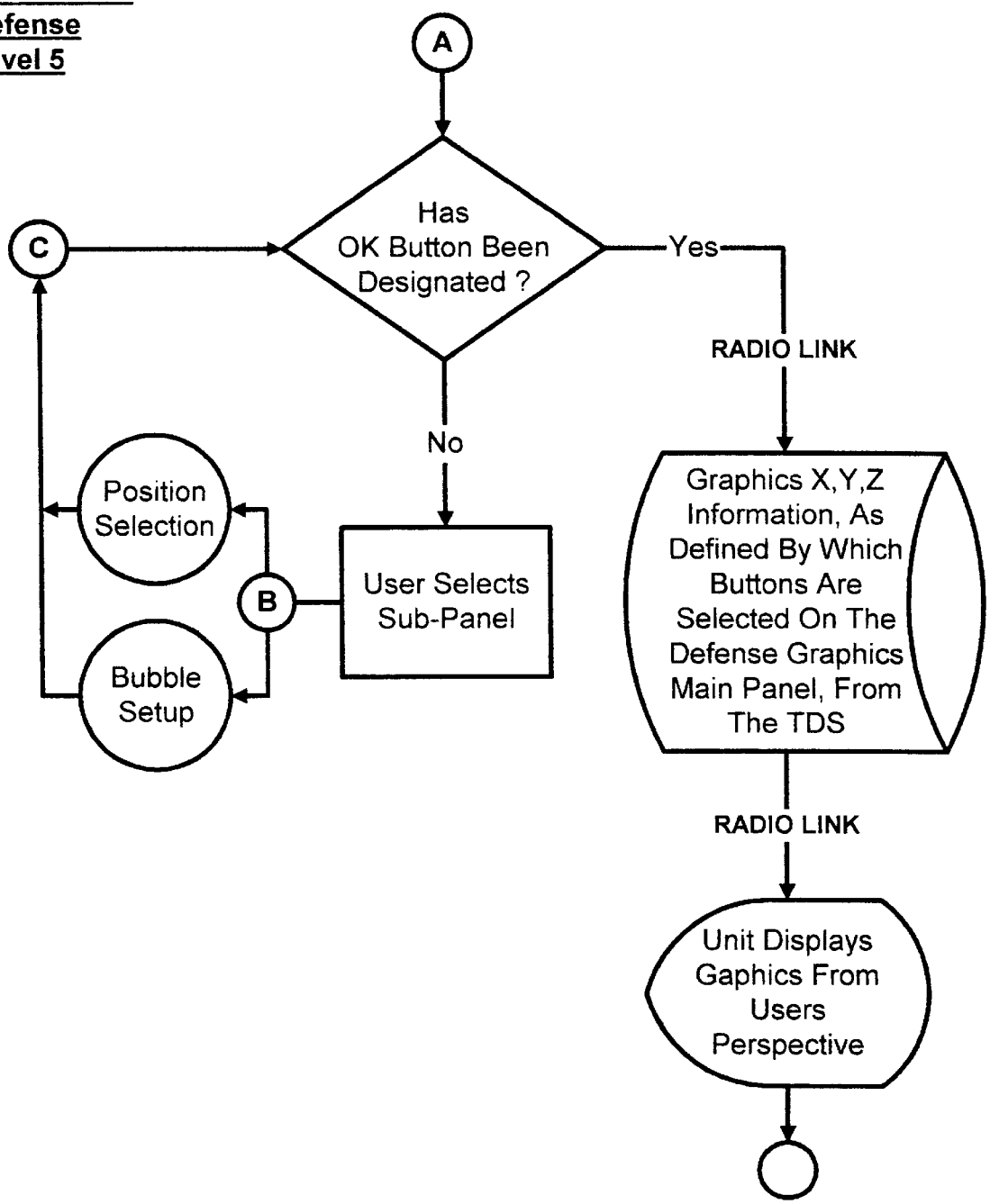
Figure 60:
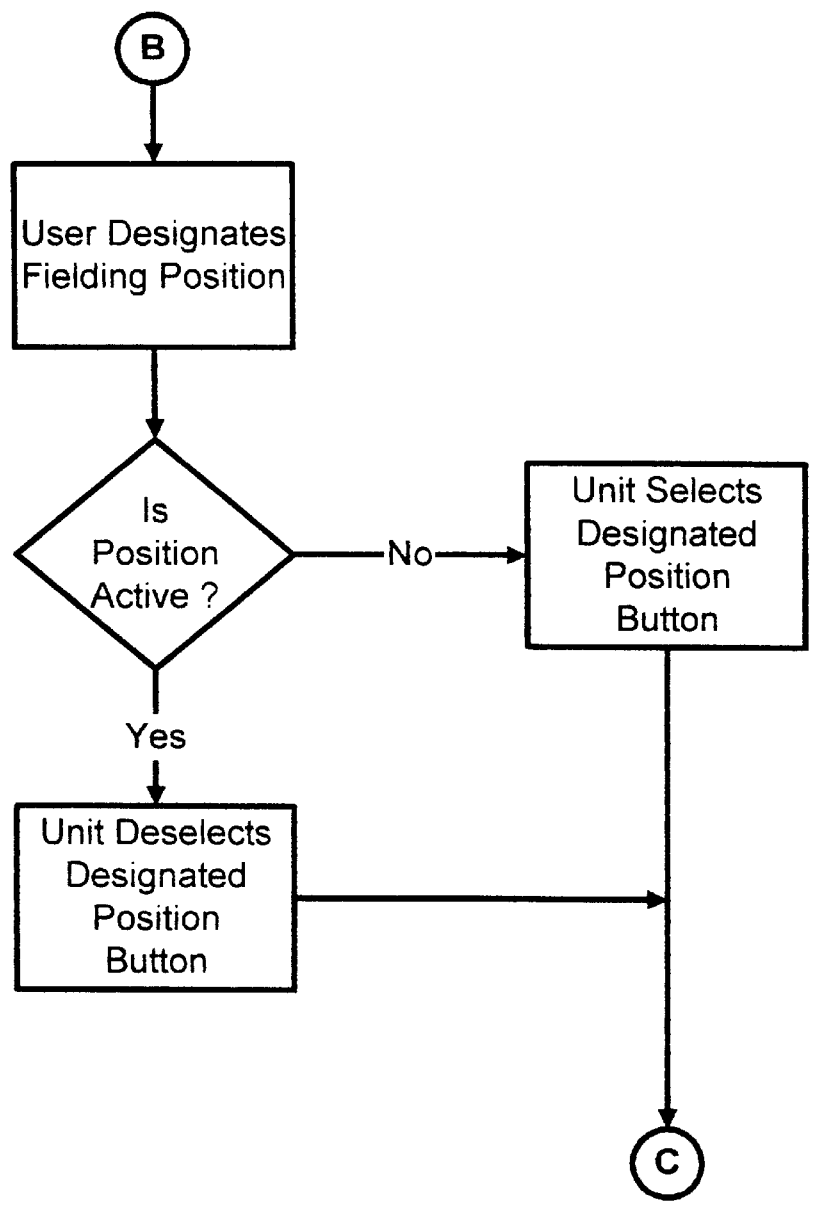
Figure 61:
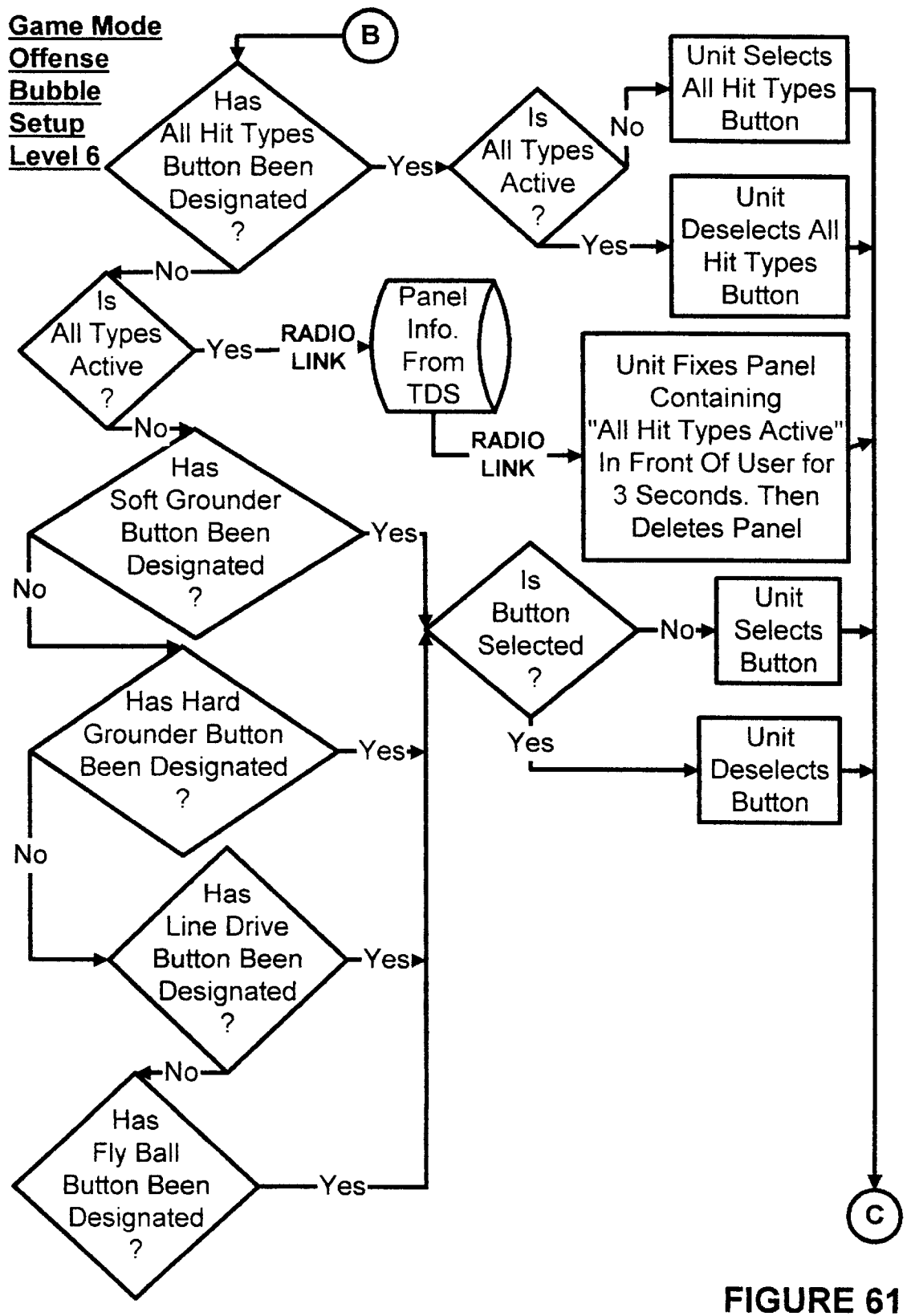
Figure 62:
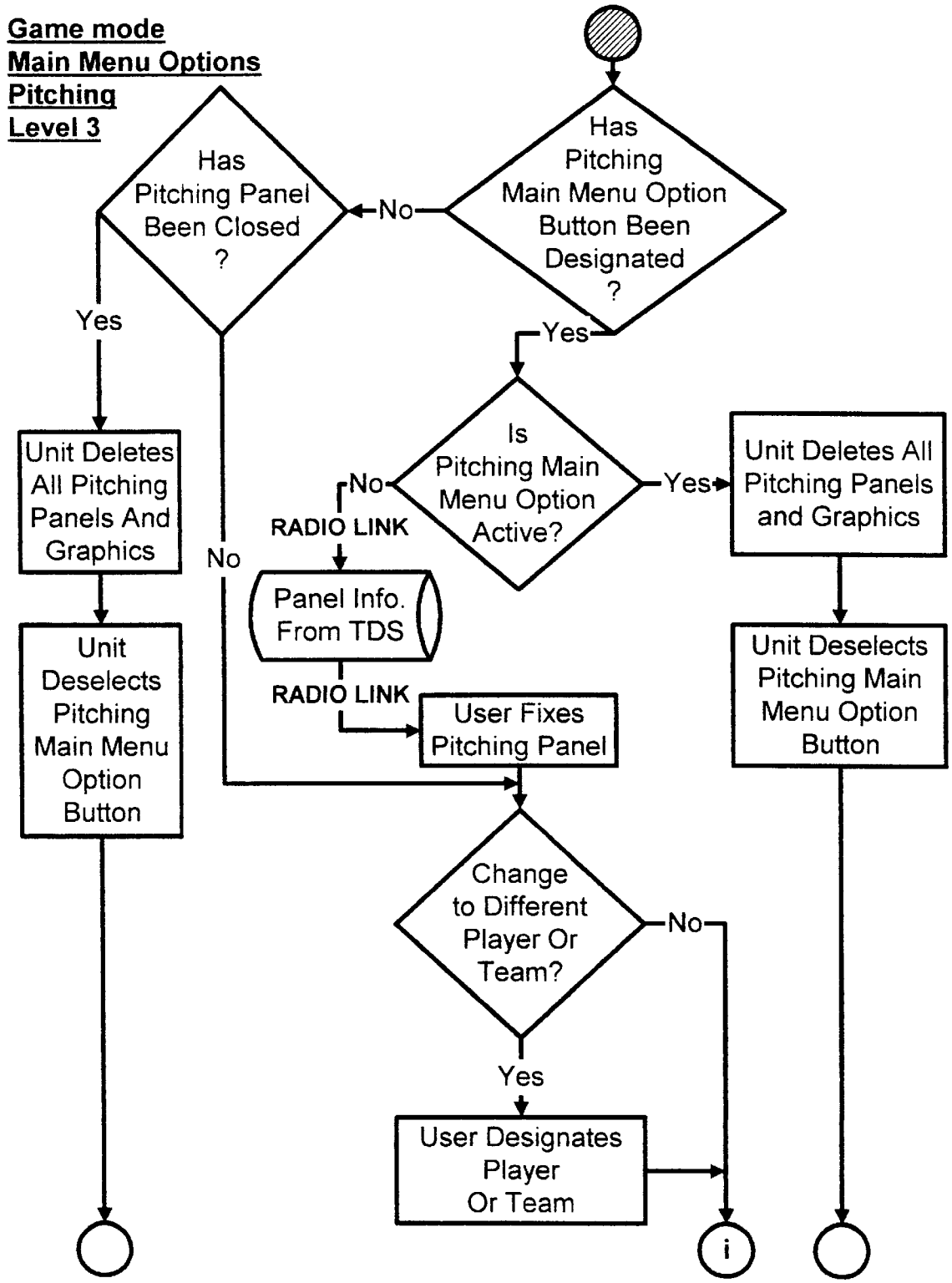
Figure 63:
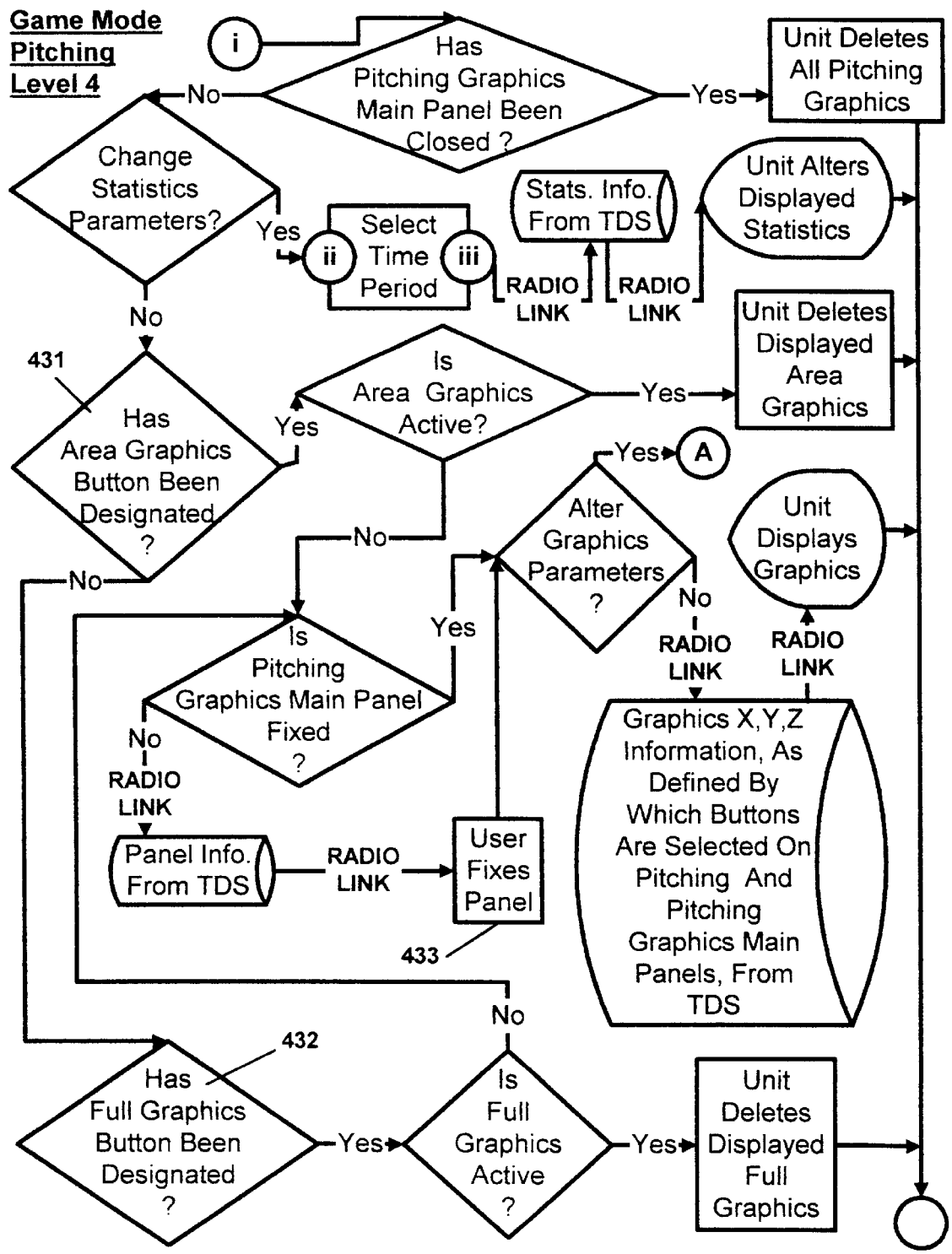
Figure 64:
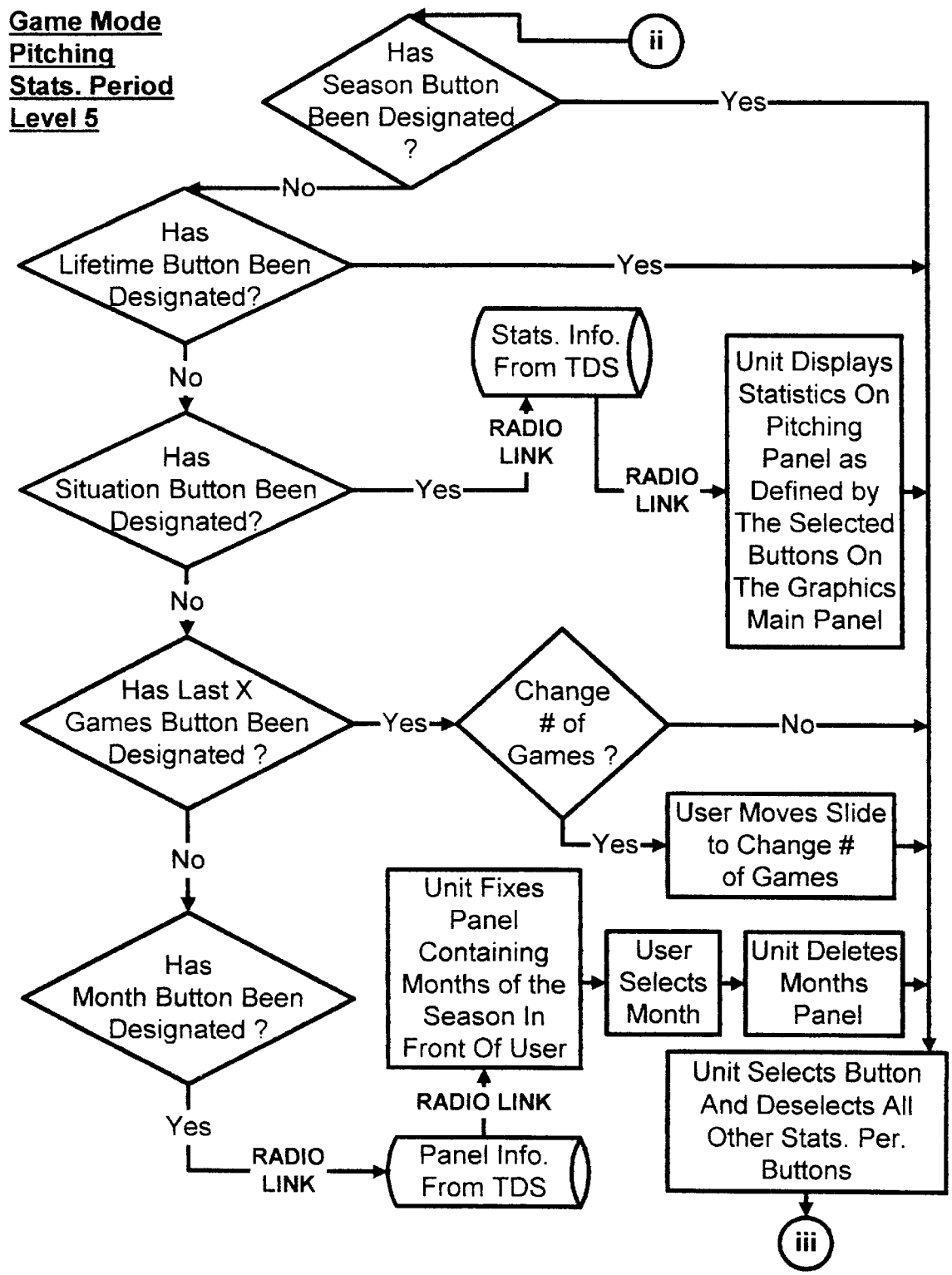
Figure 65:
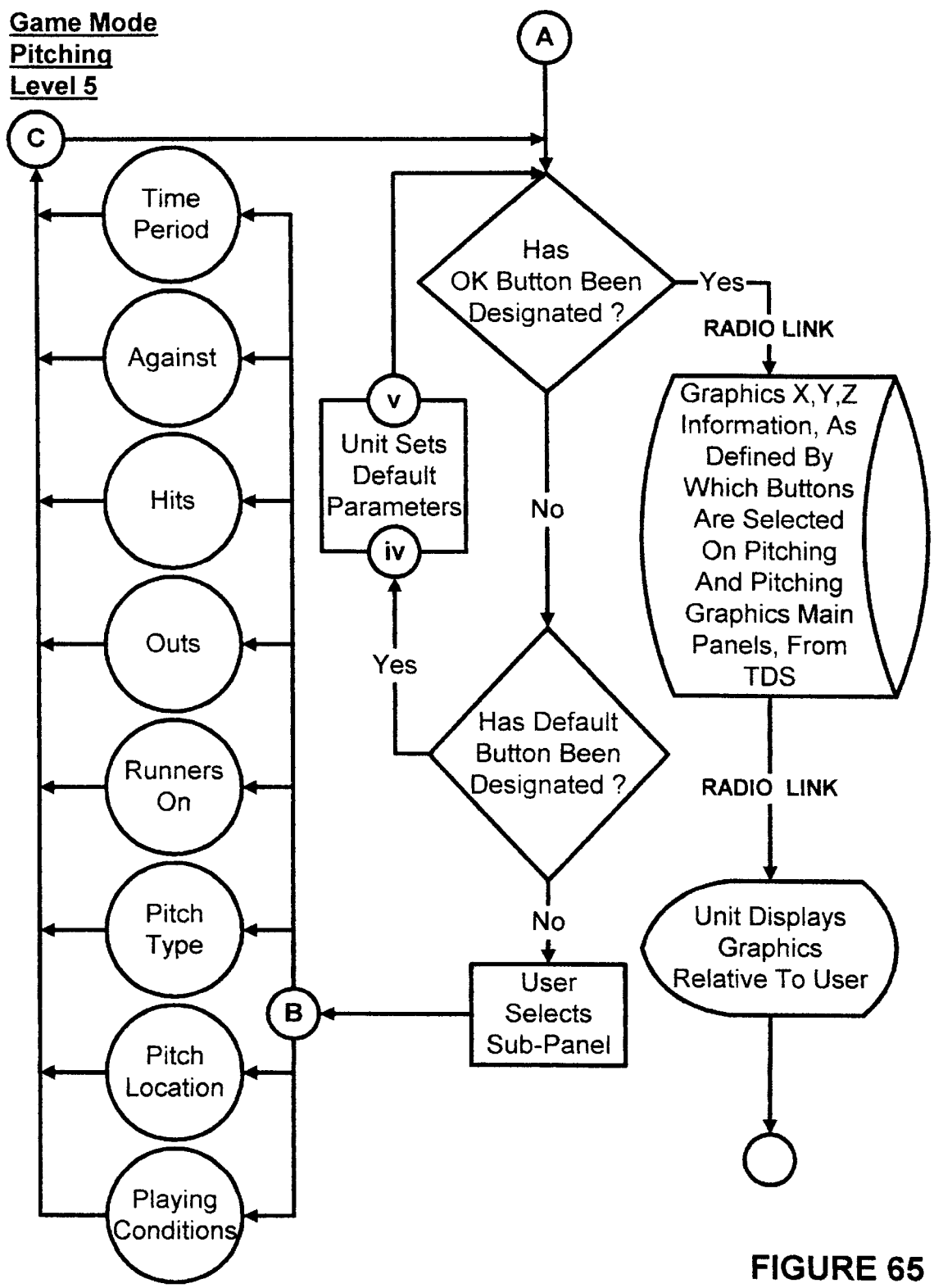
Figure 66:
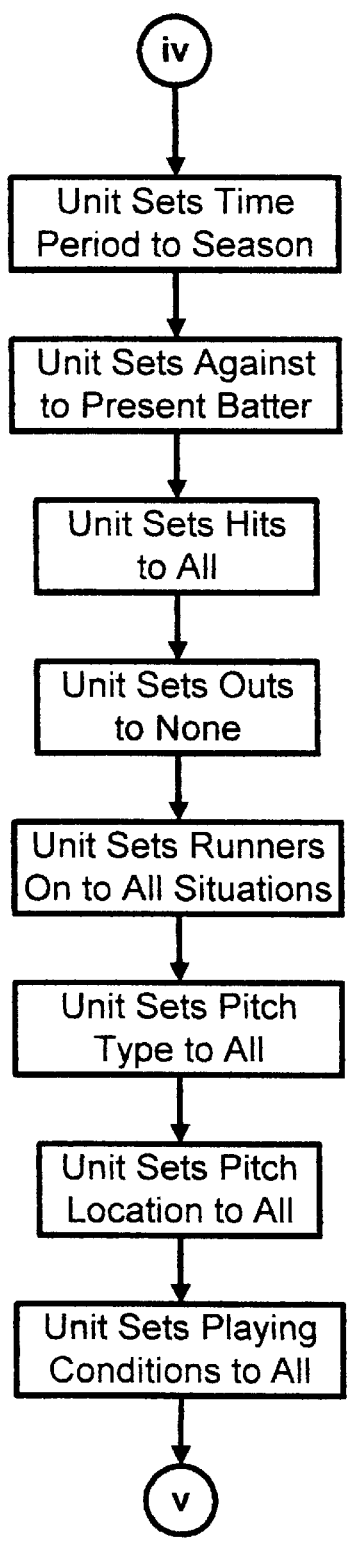
Figure 67:
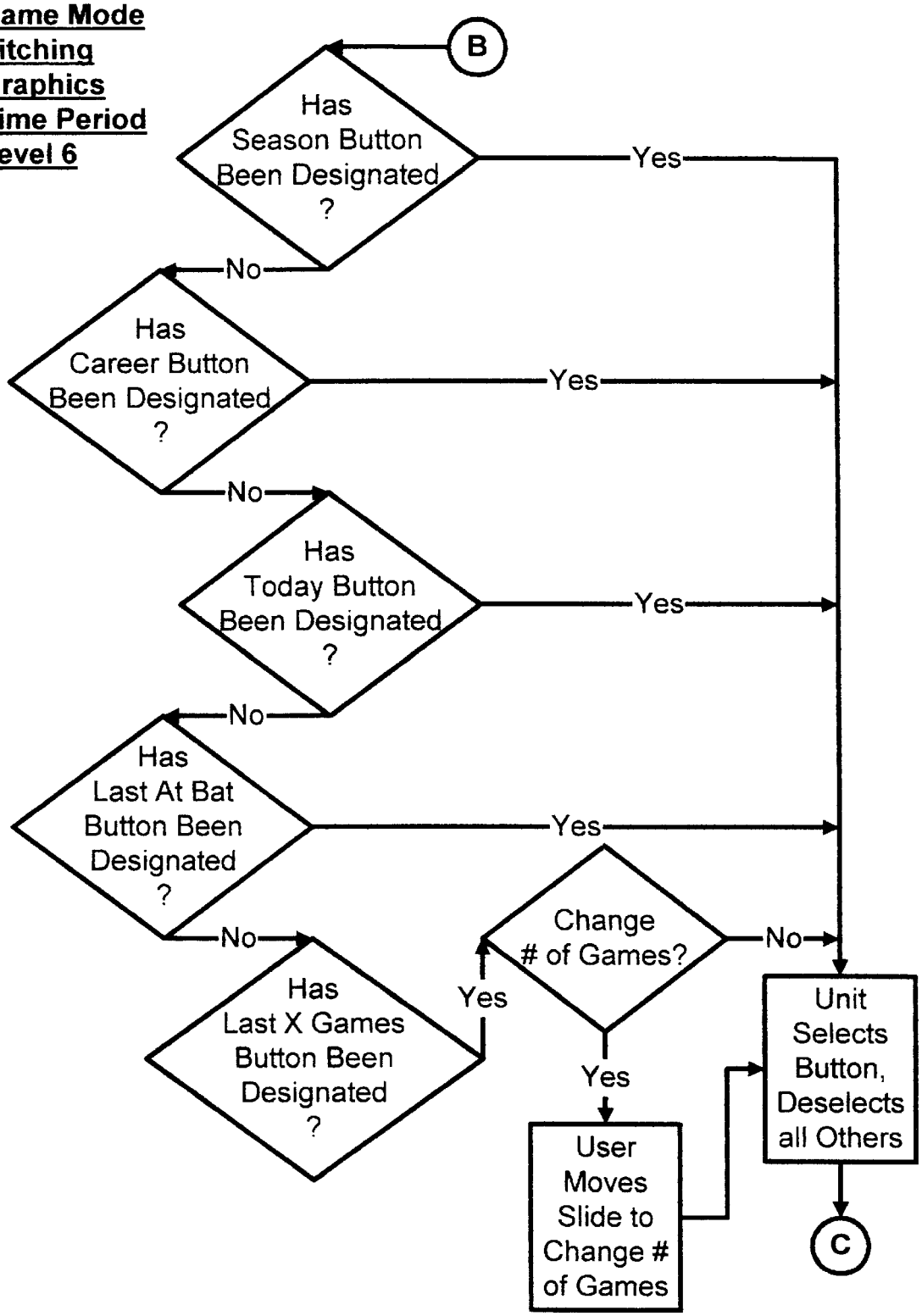
Figure 68:
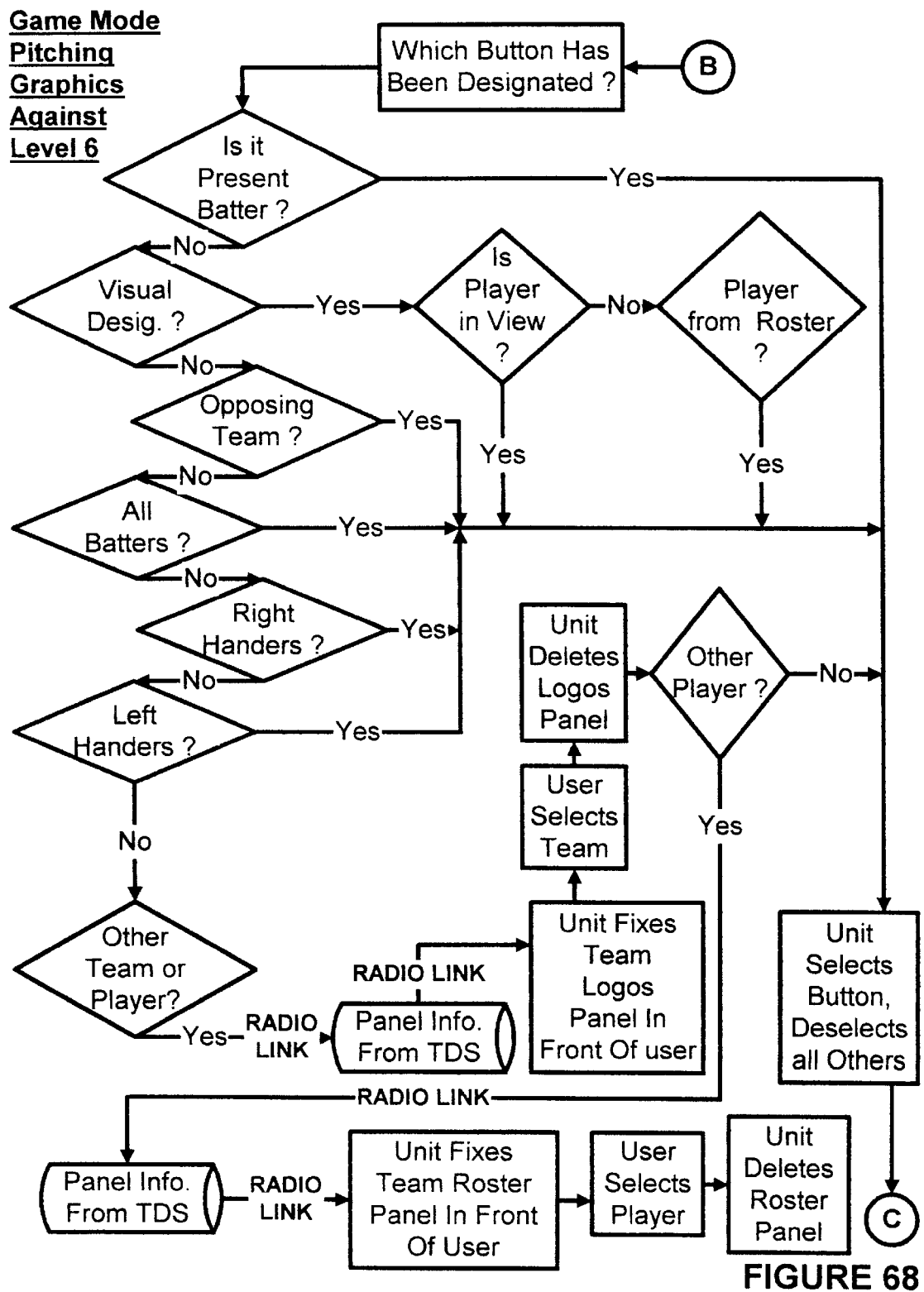
Figure 69:
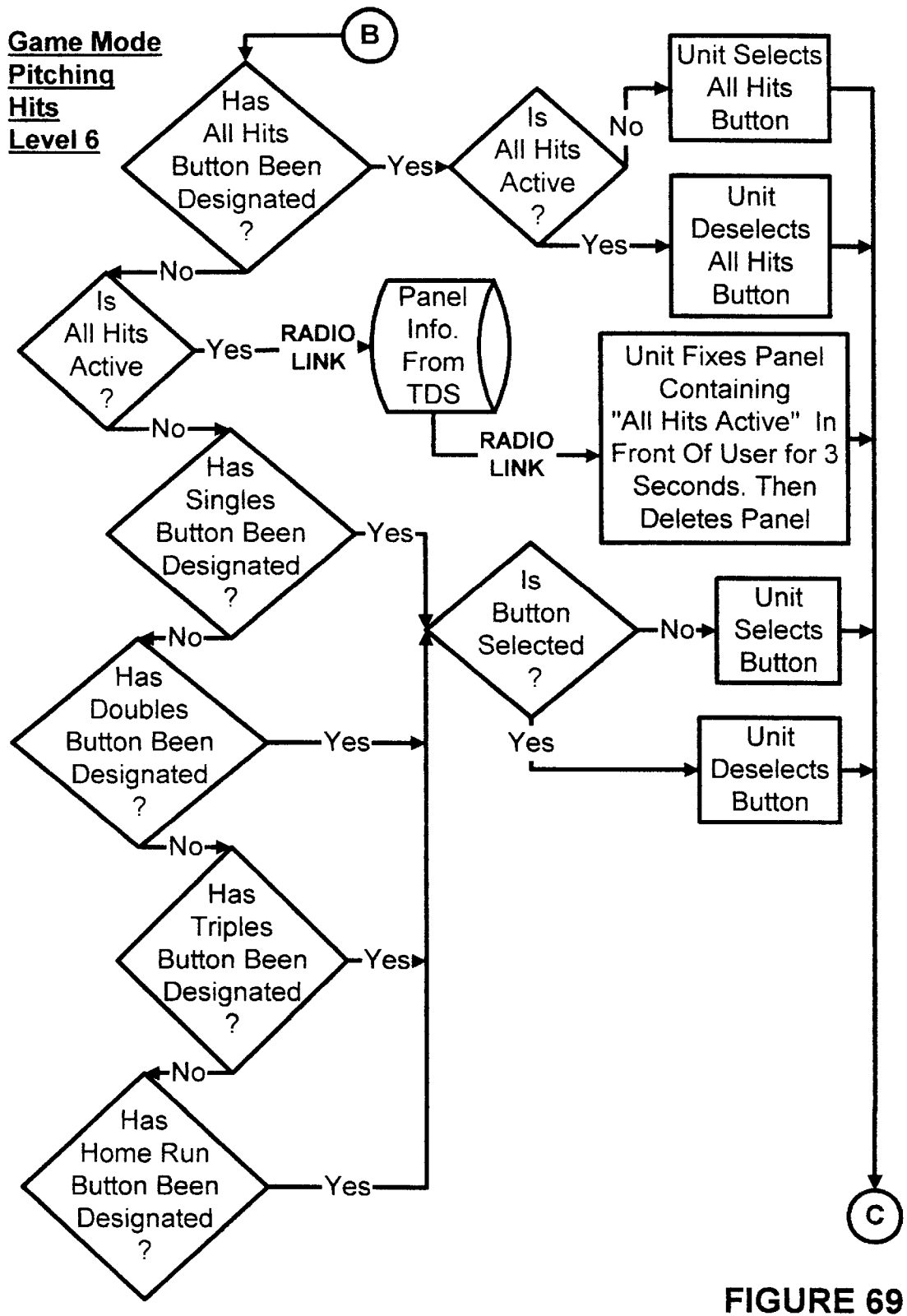
Figure 70:
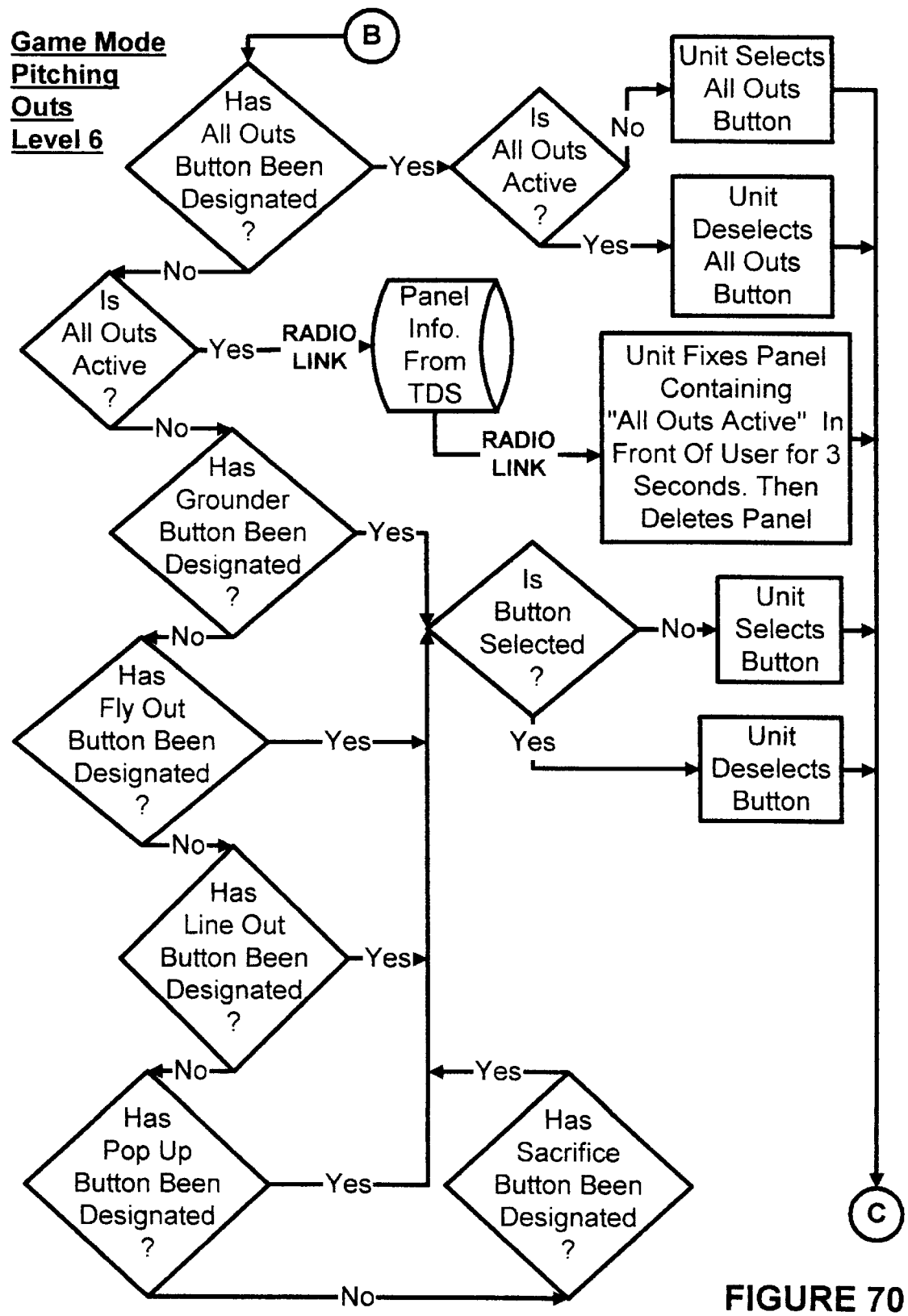
Figure 71:
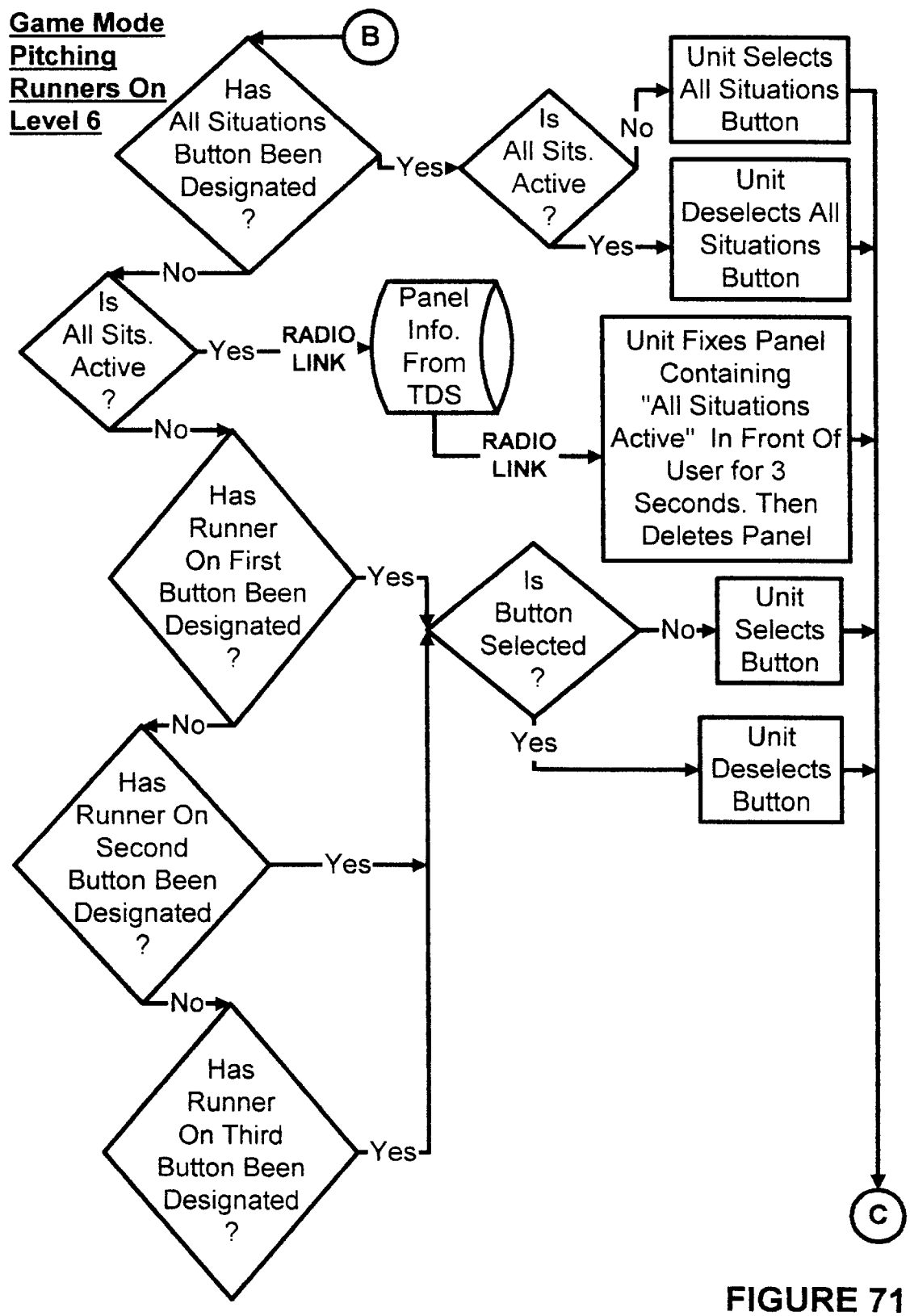
Figure 72:
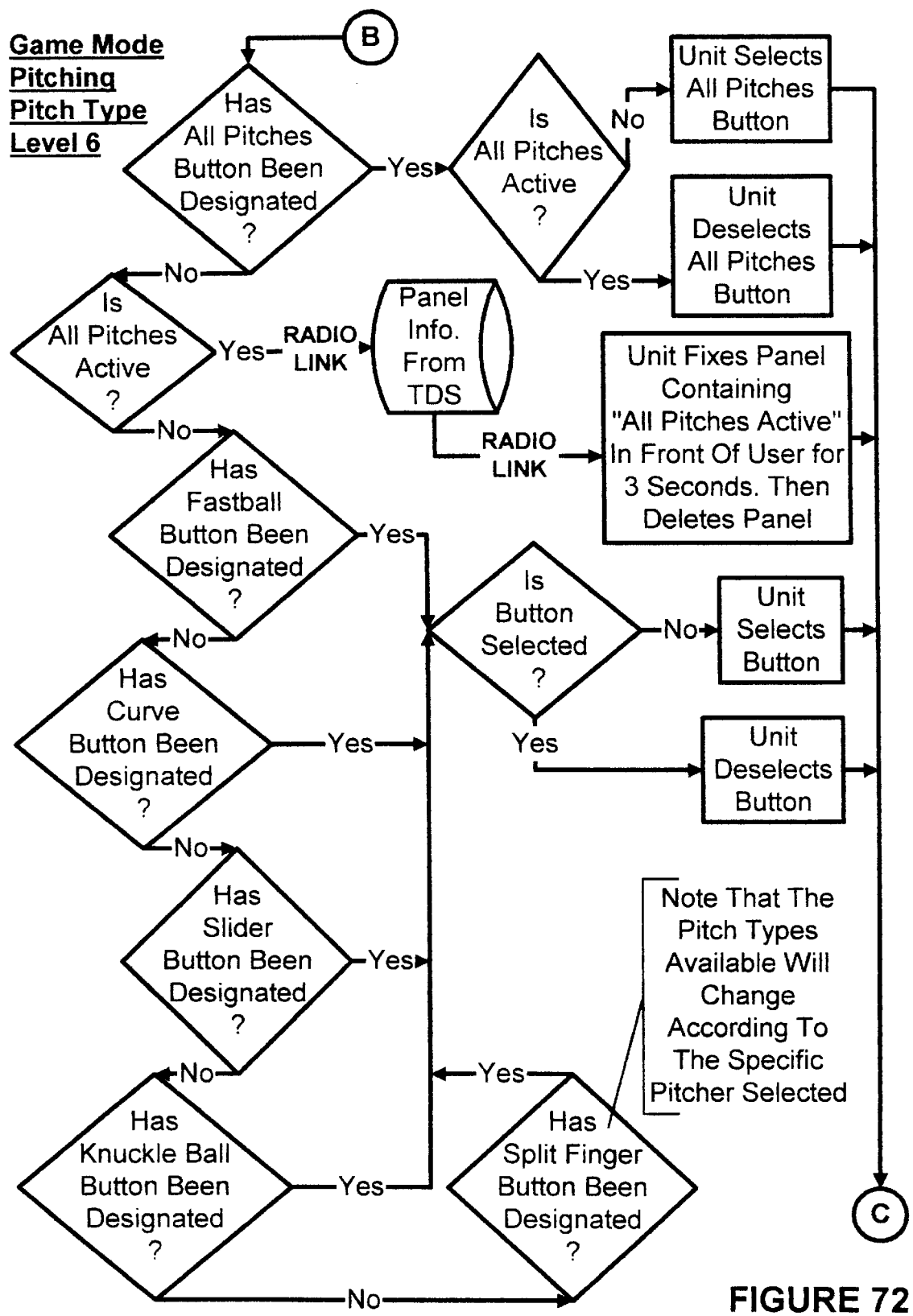
Figure 73:
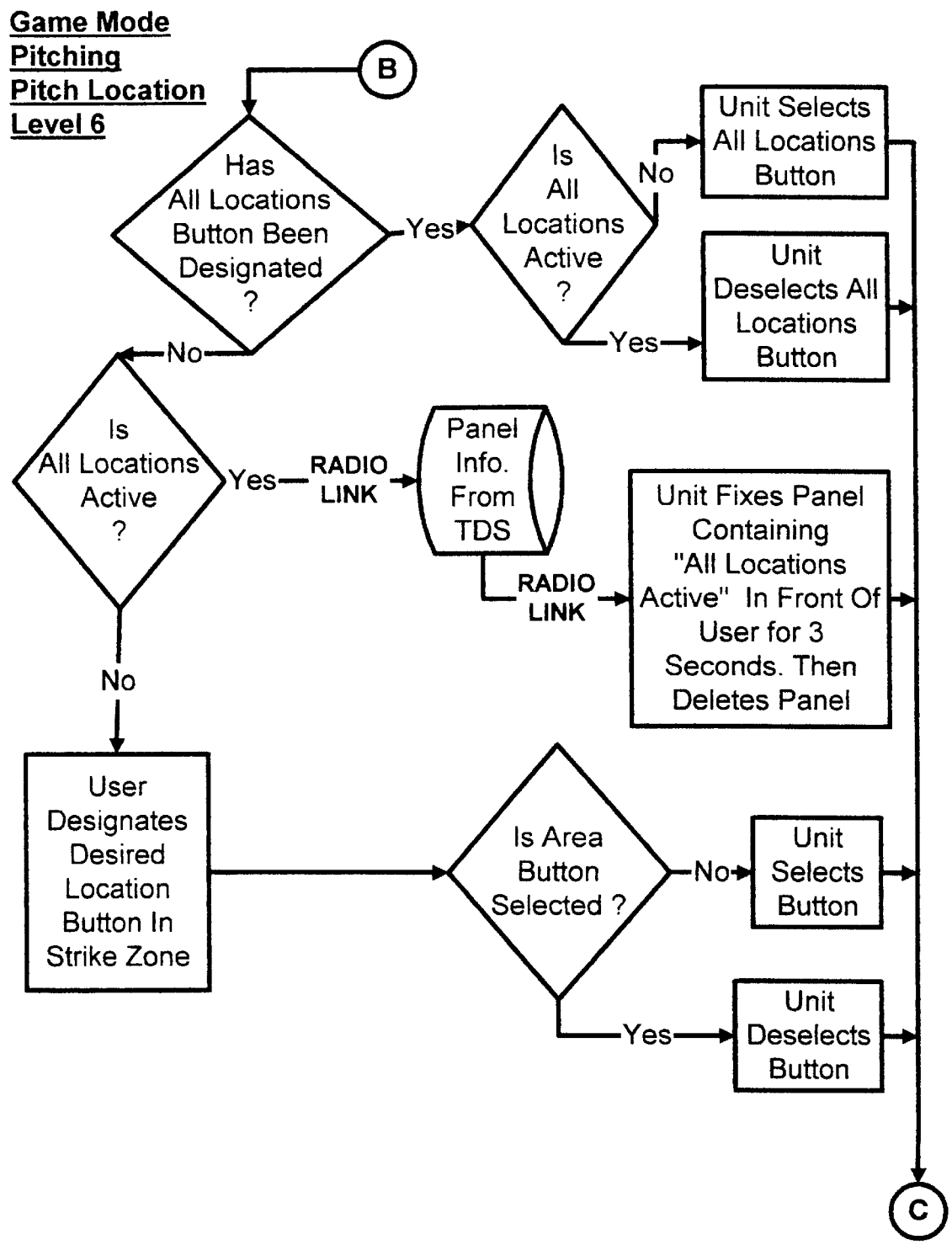
Figure 74:
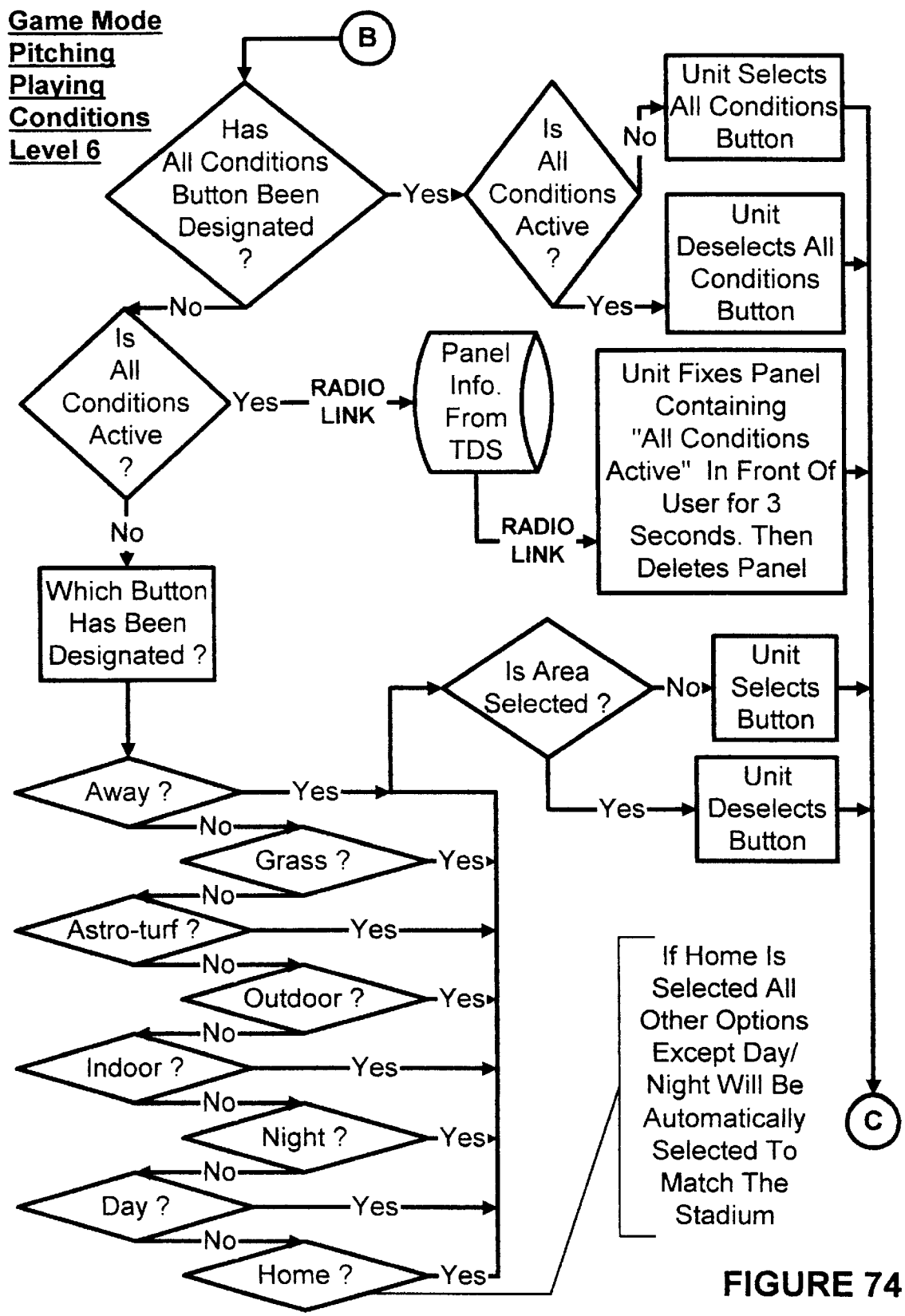
Figure 75:
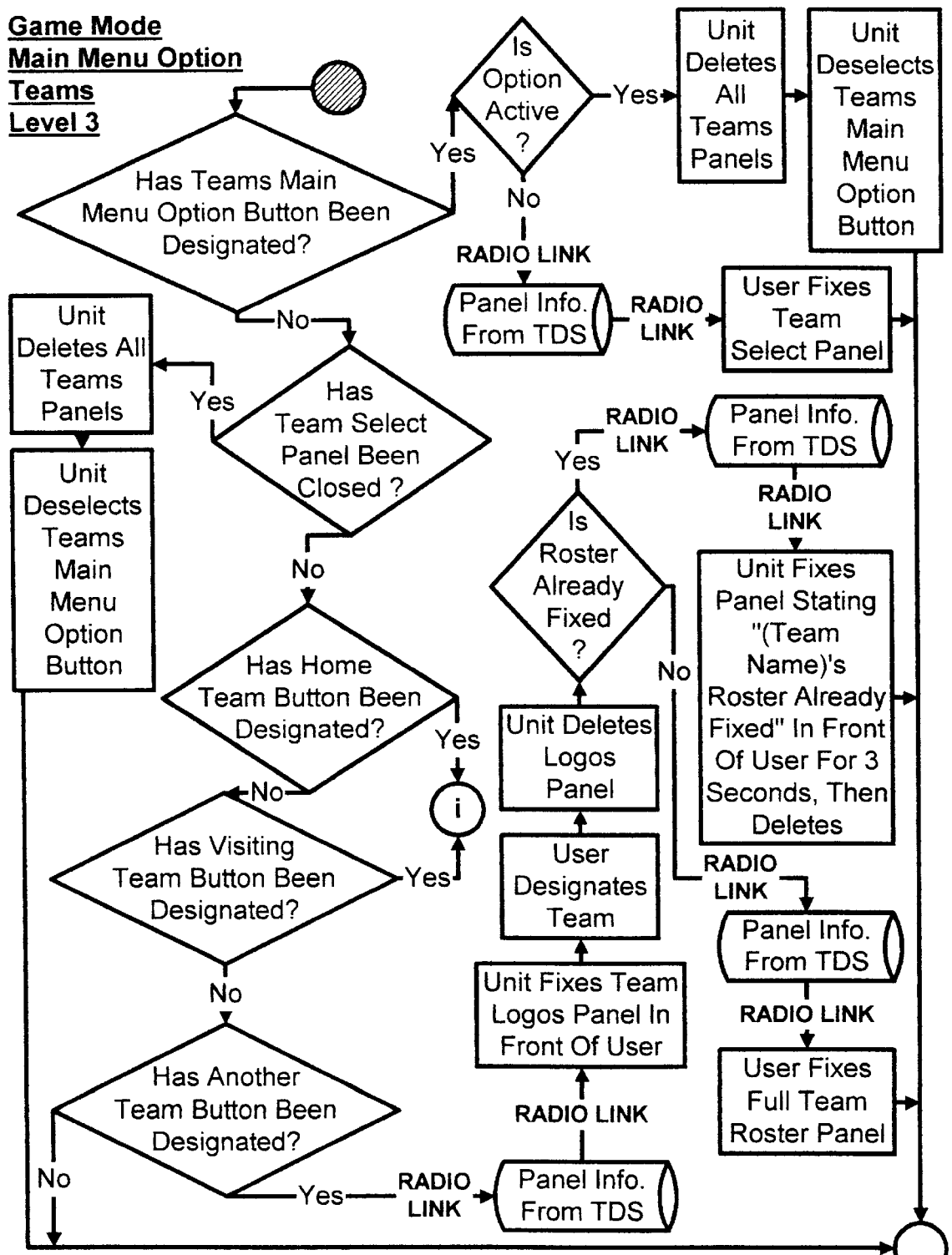
Figure 76:
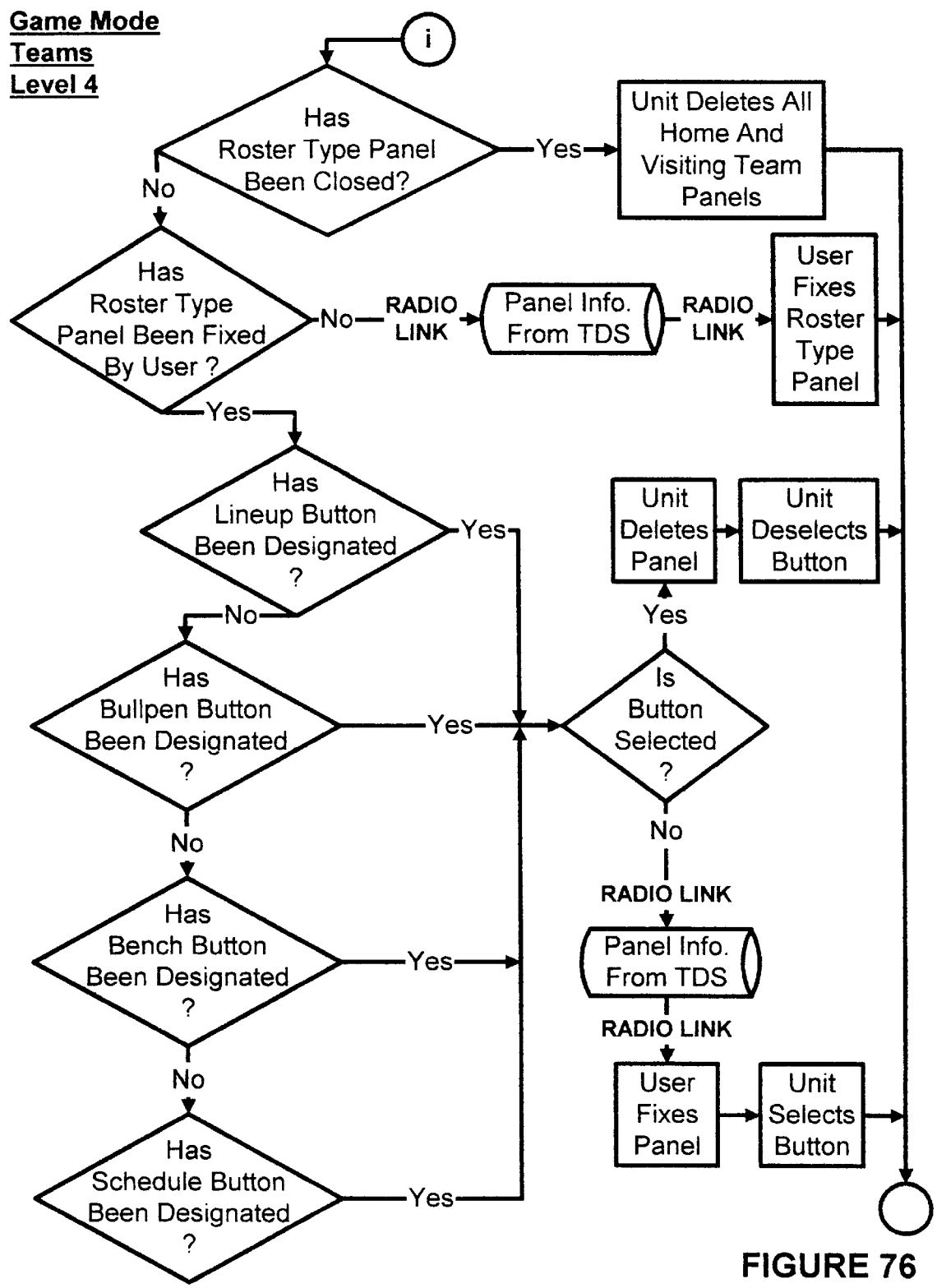
Figure 77:
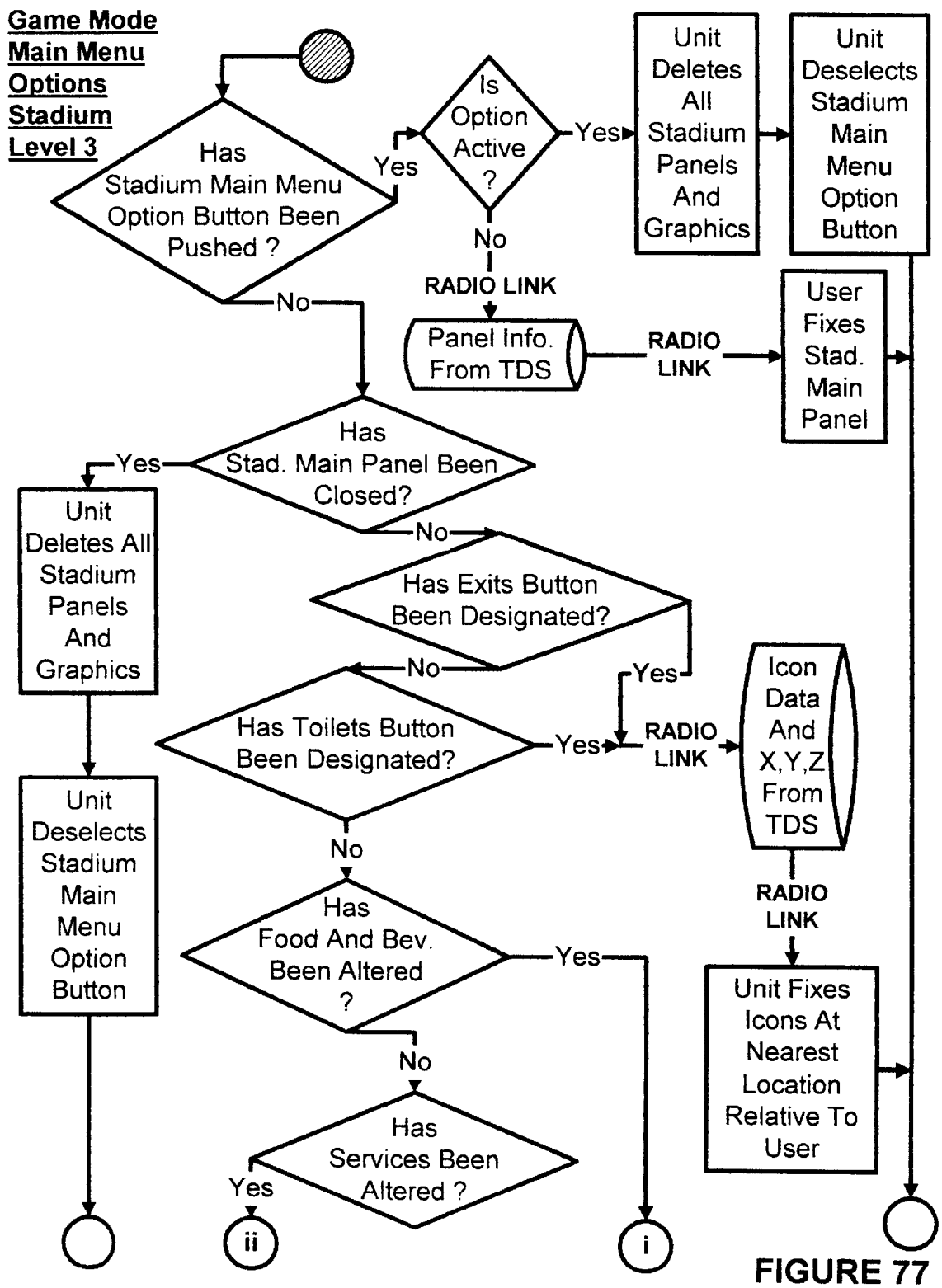
Figure 78:
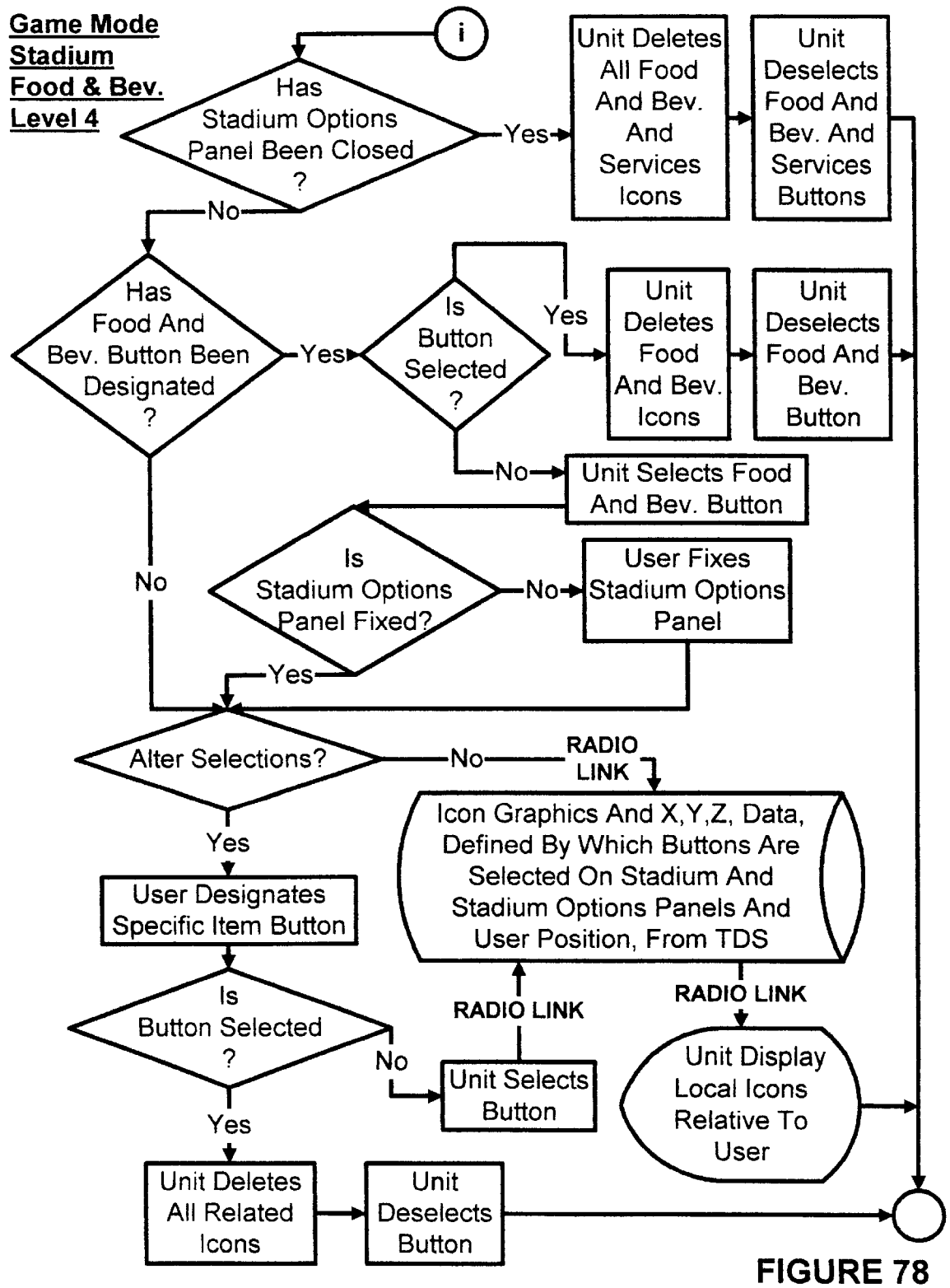
Figure 79:
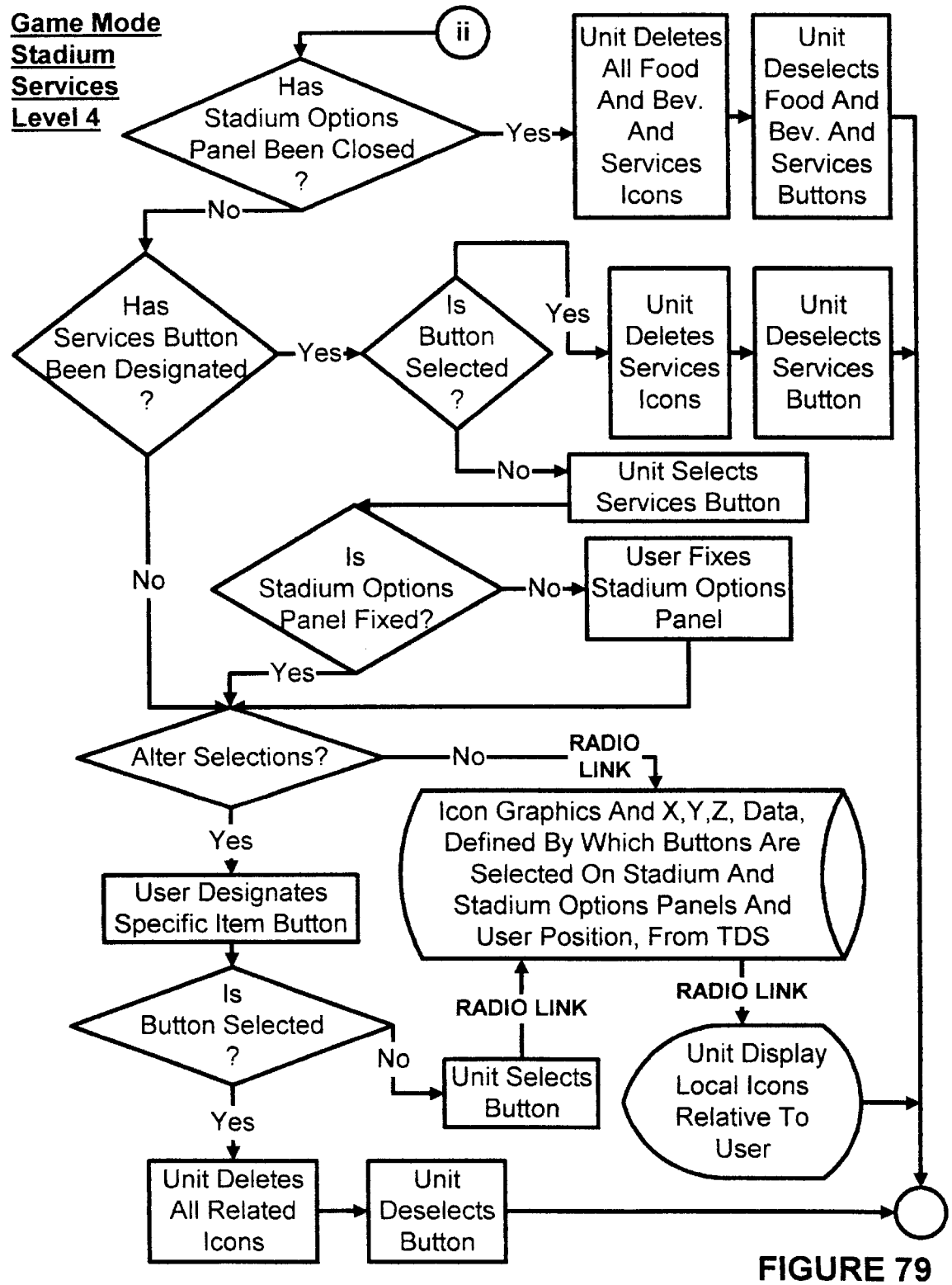
Figure 80:
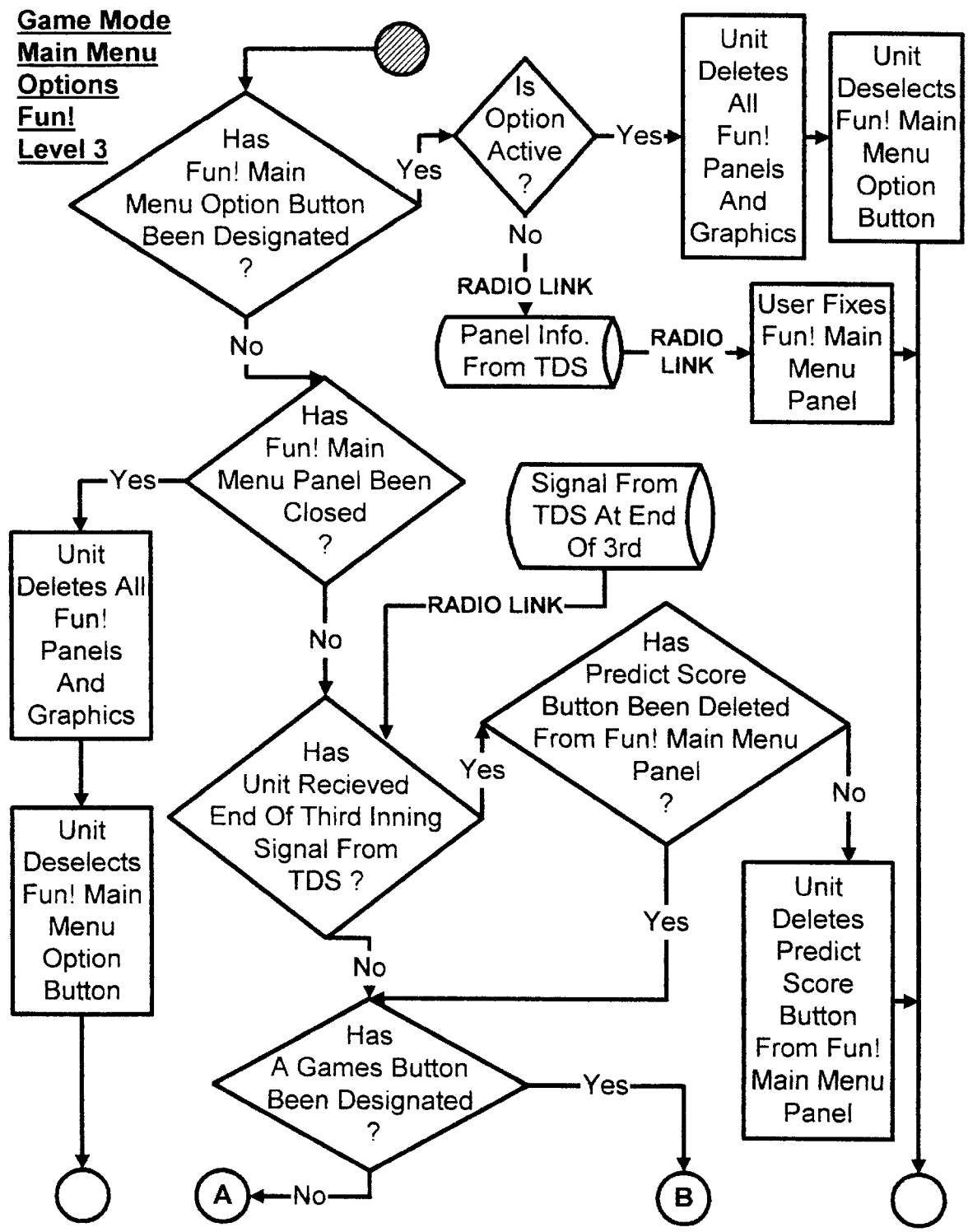
Figure 81:
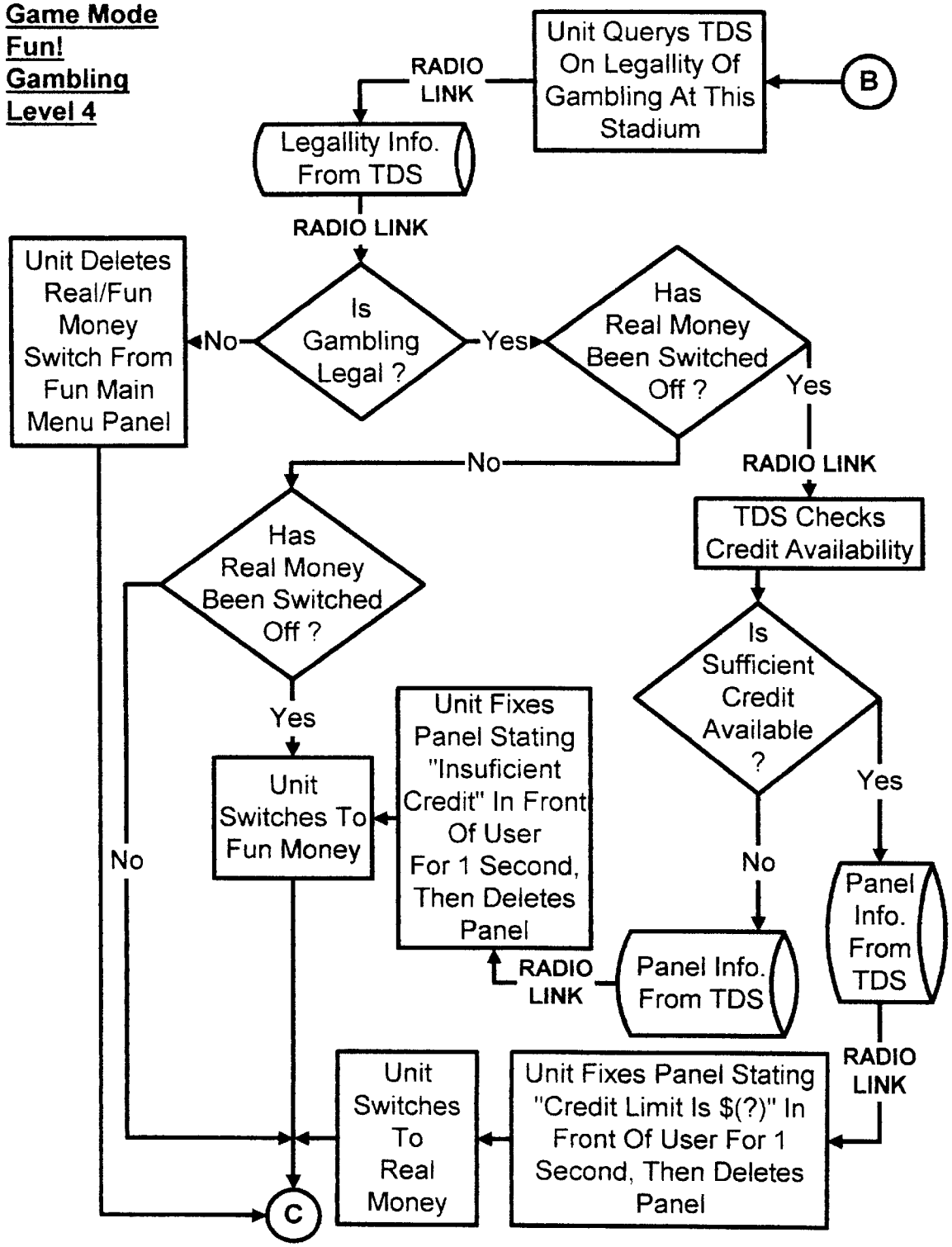
Figure 82:
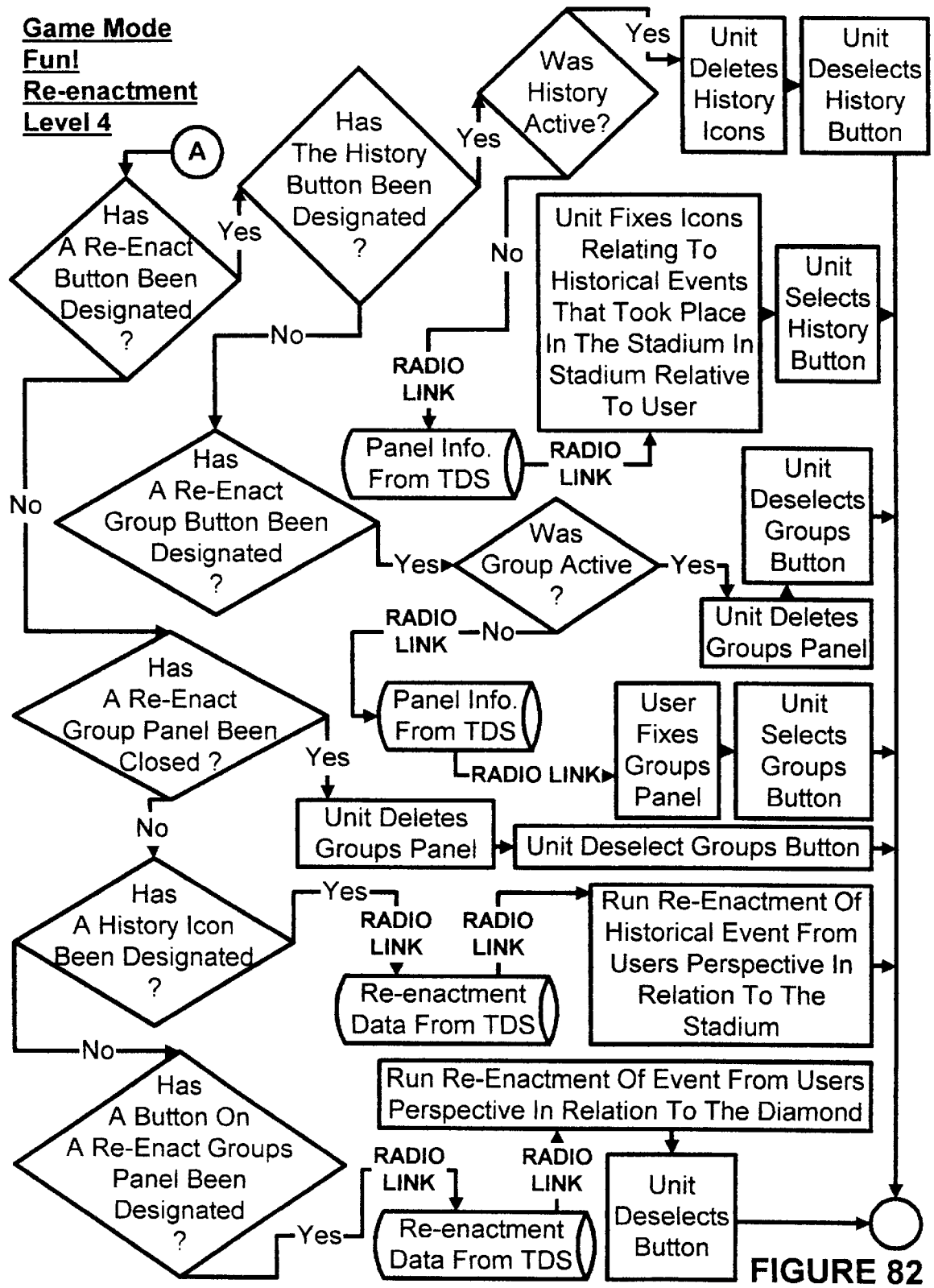
Figure 83:
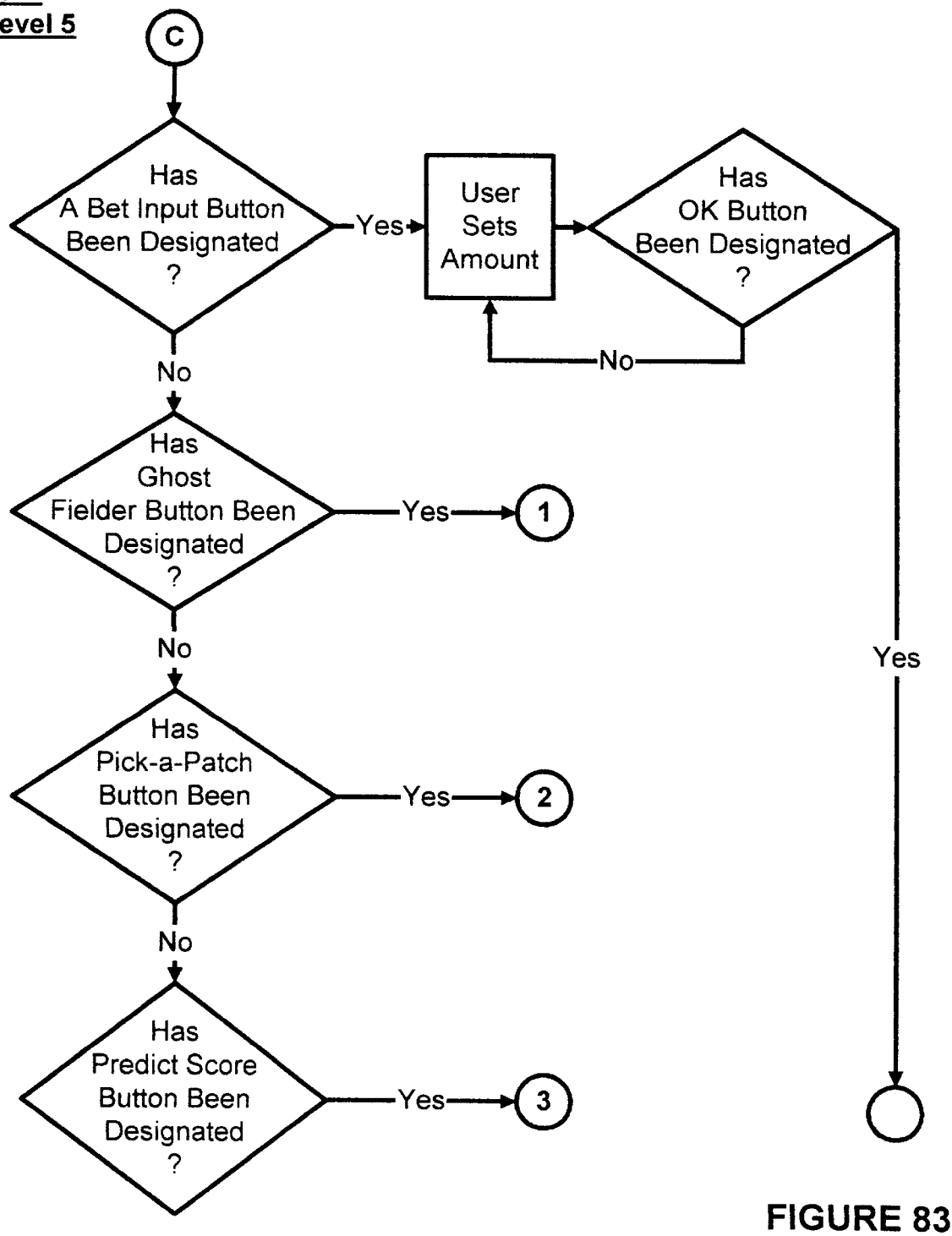
Figure 84:
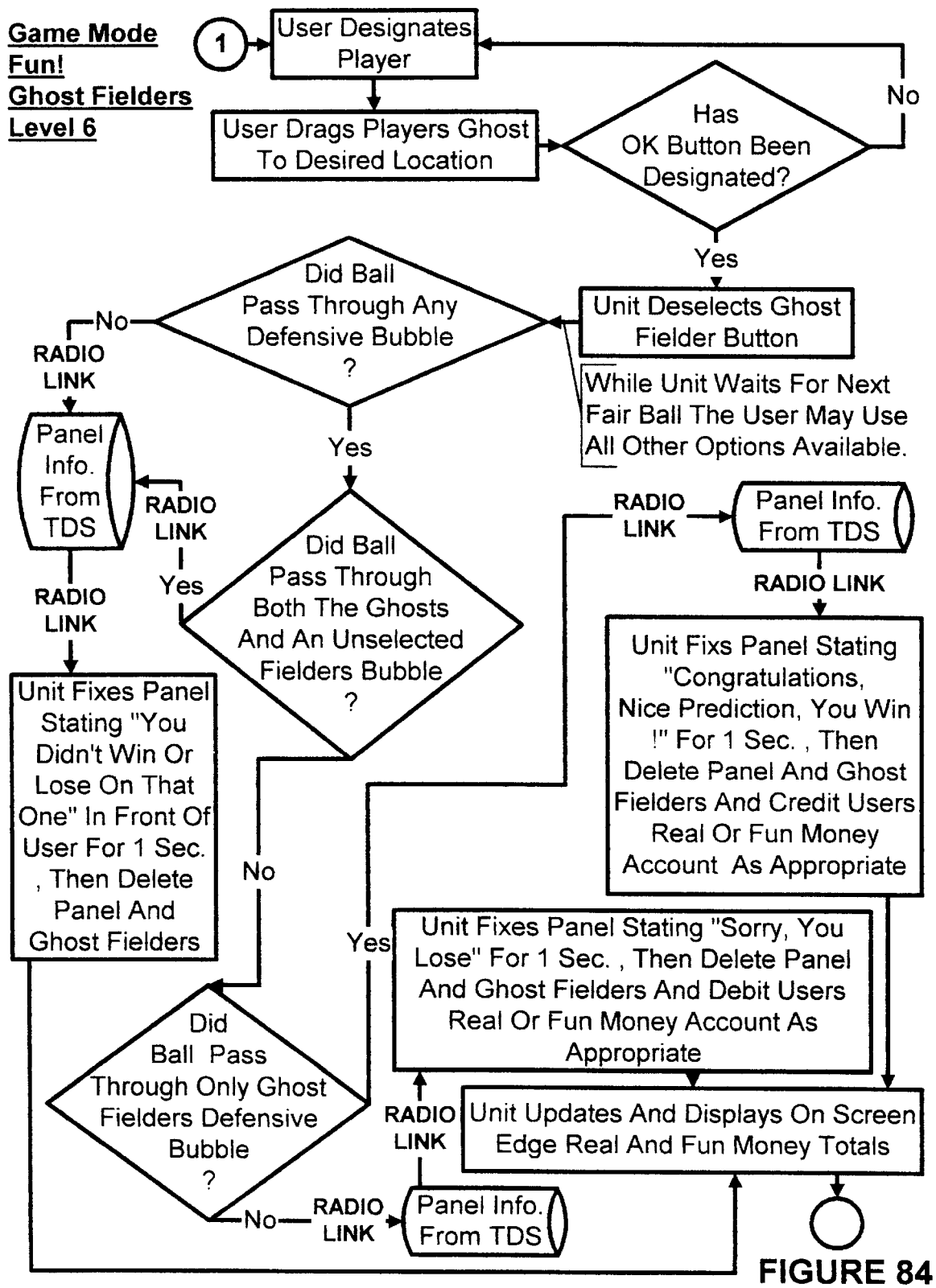
Figure 85:
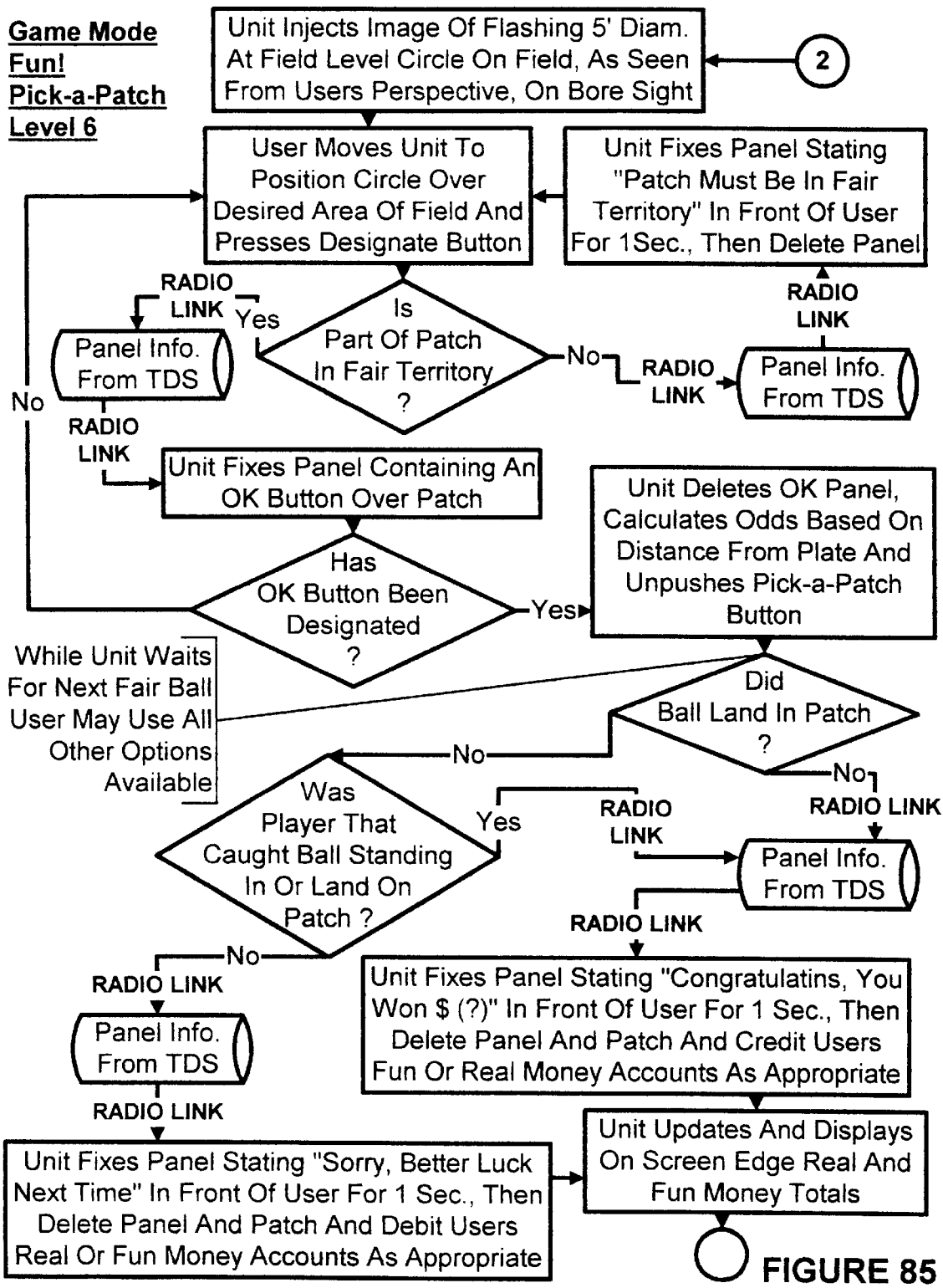
Figure 86:
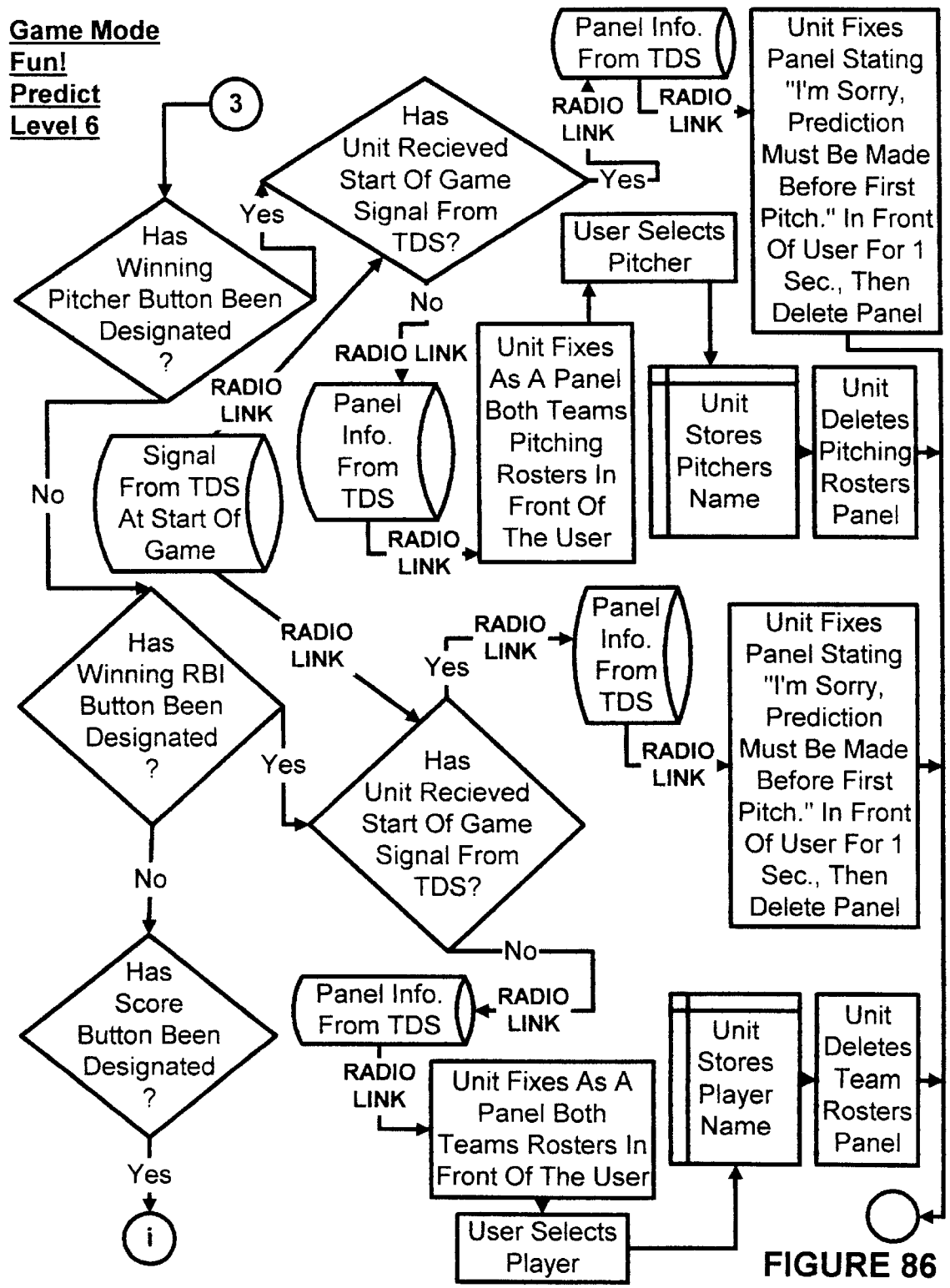
Figure 87:
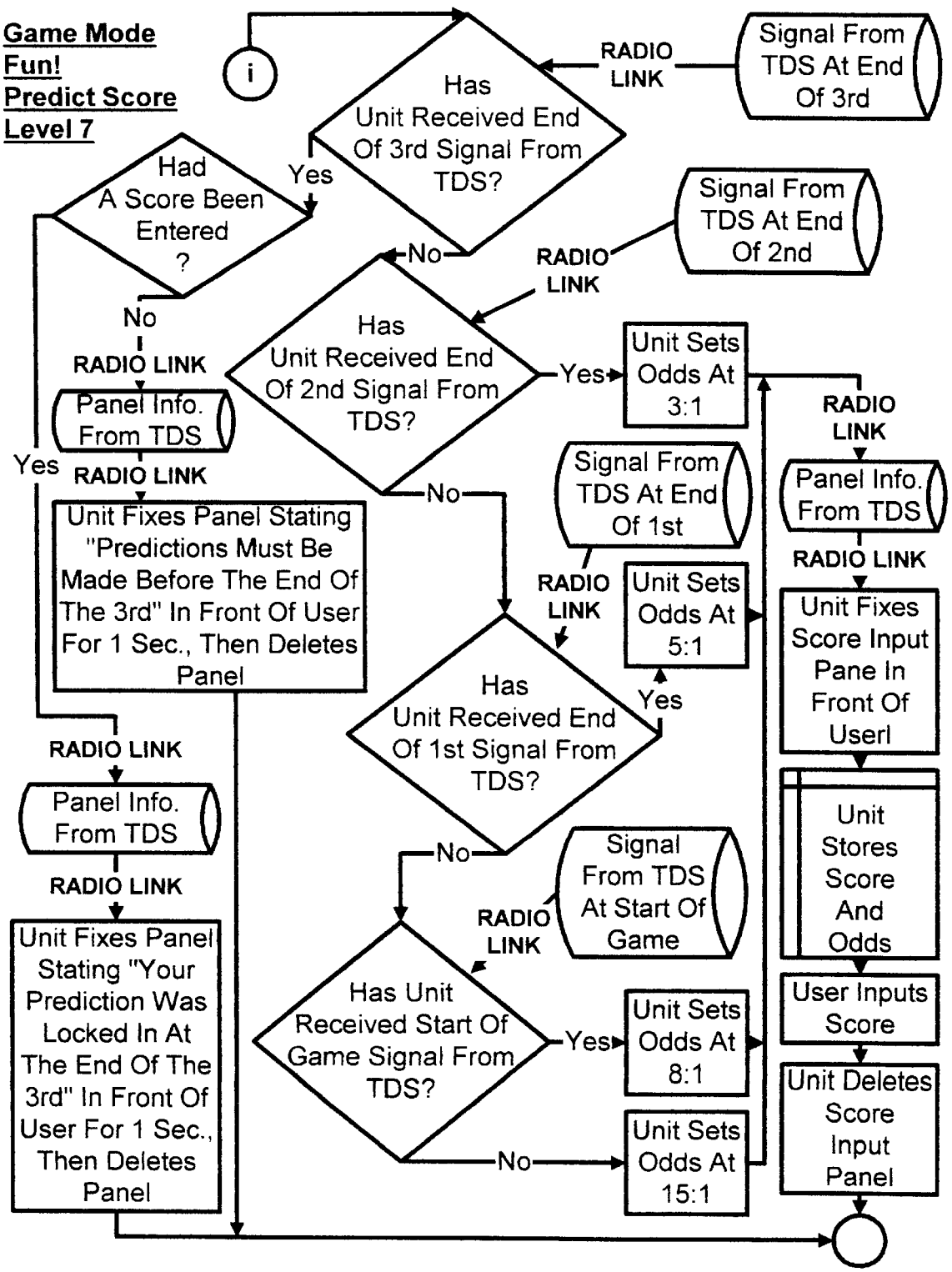
Figure 88:
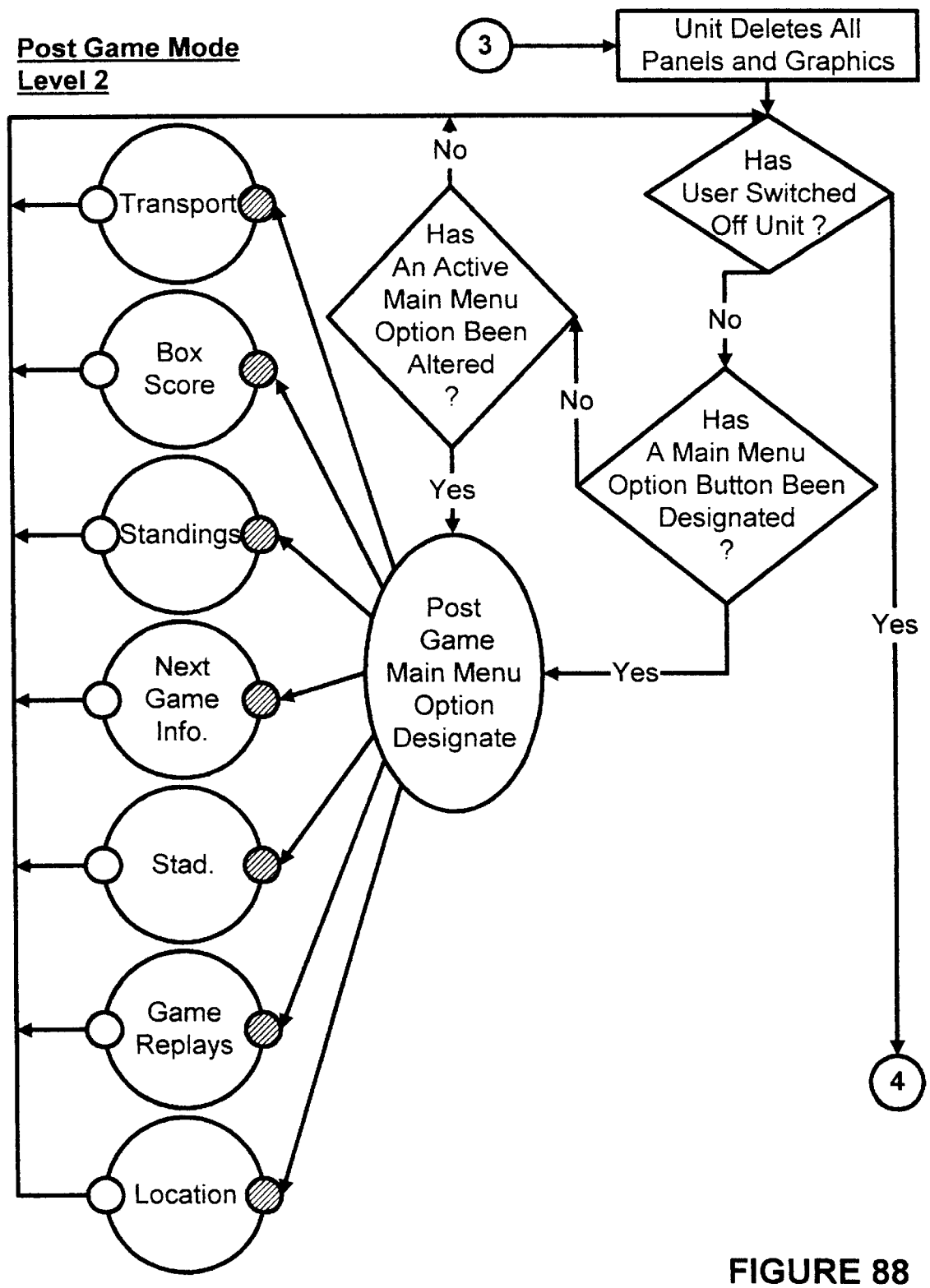
Figure 89:
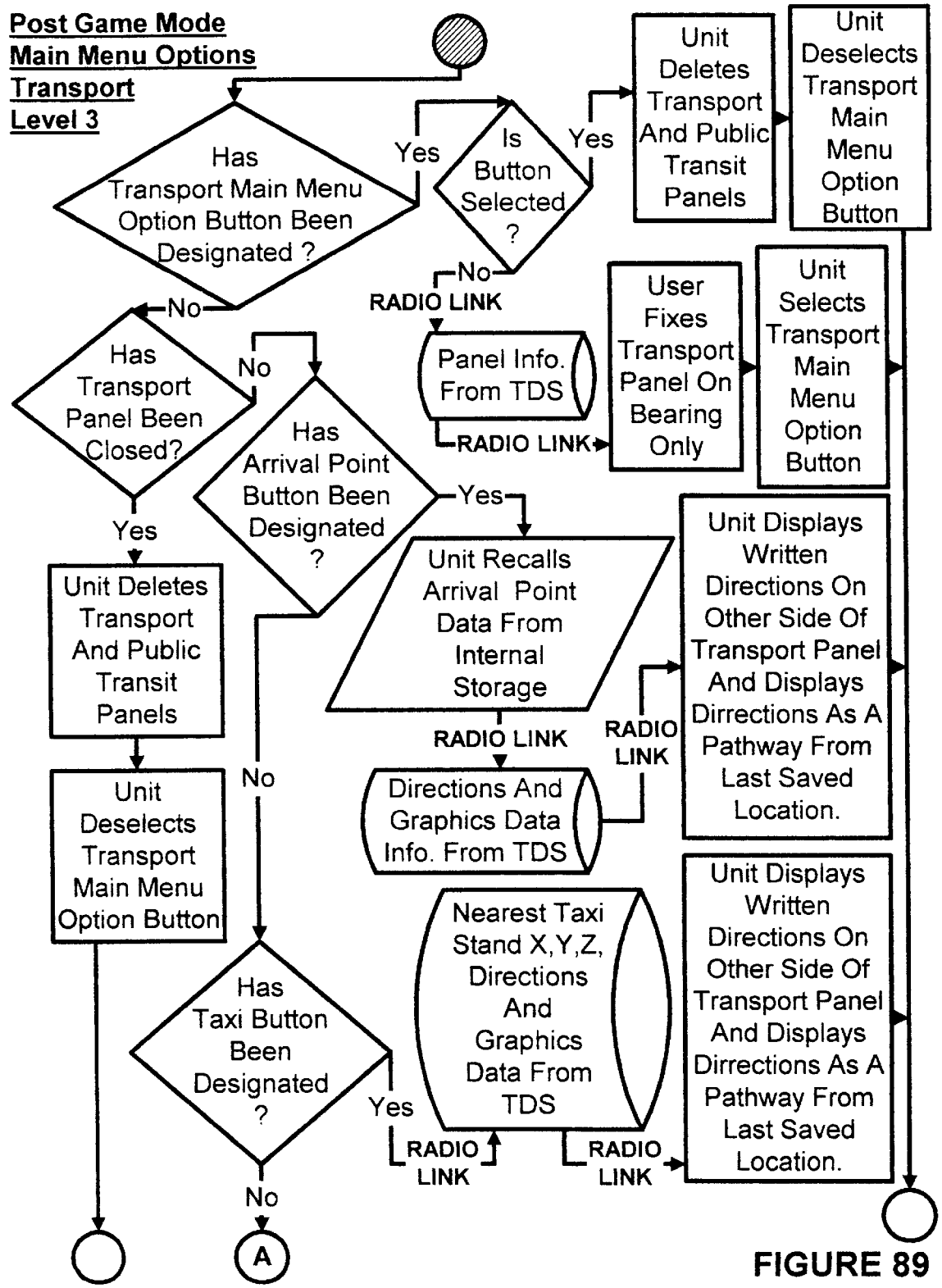
Figure 90:
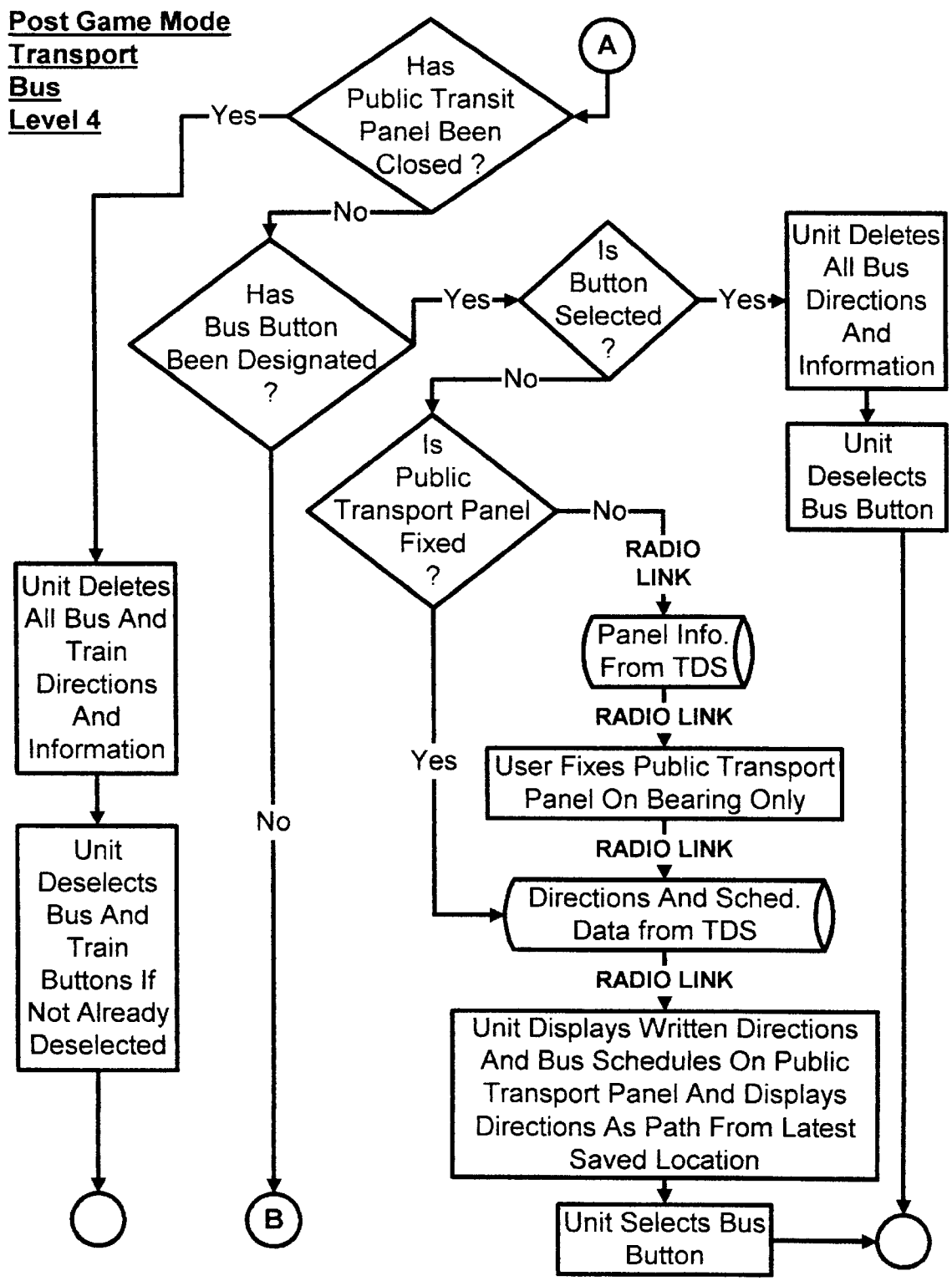
Figure 91:
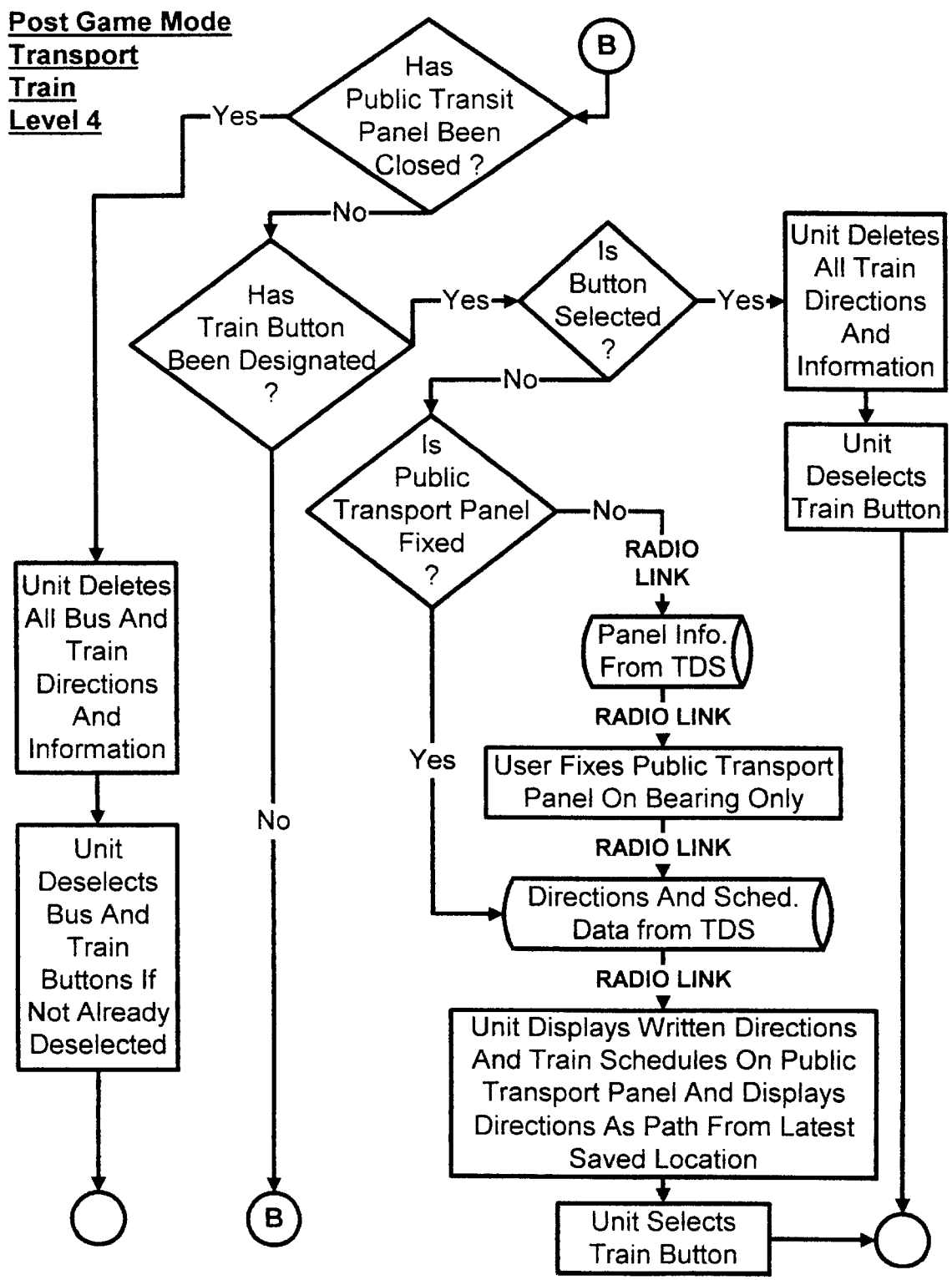
Figure 92:
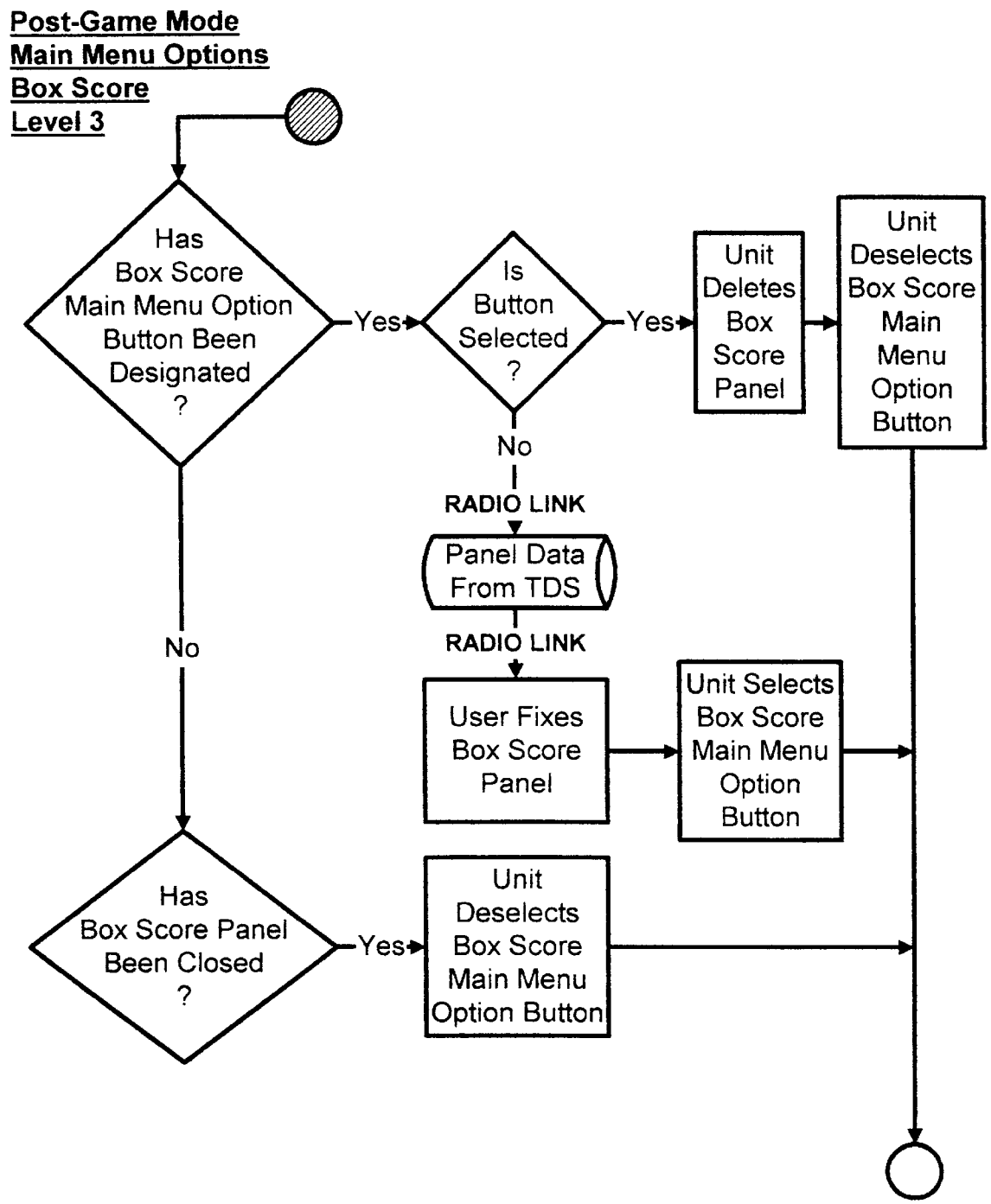
Figure 93:
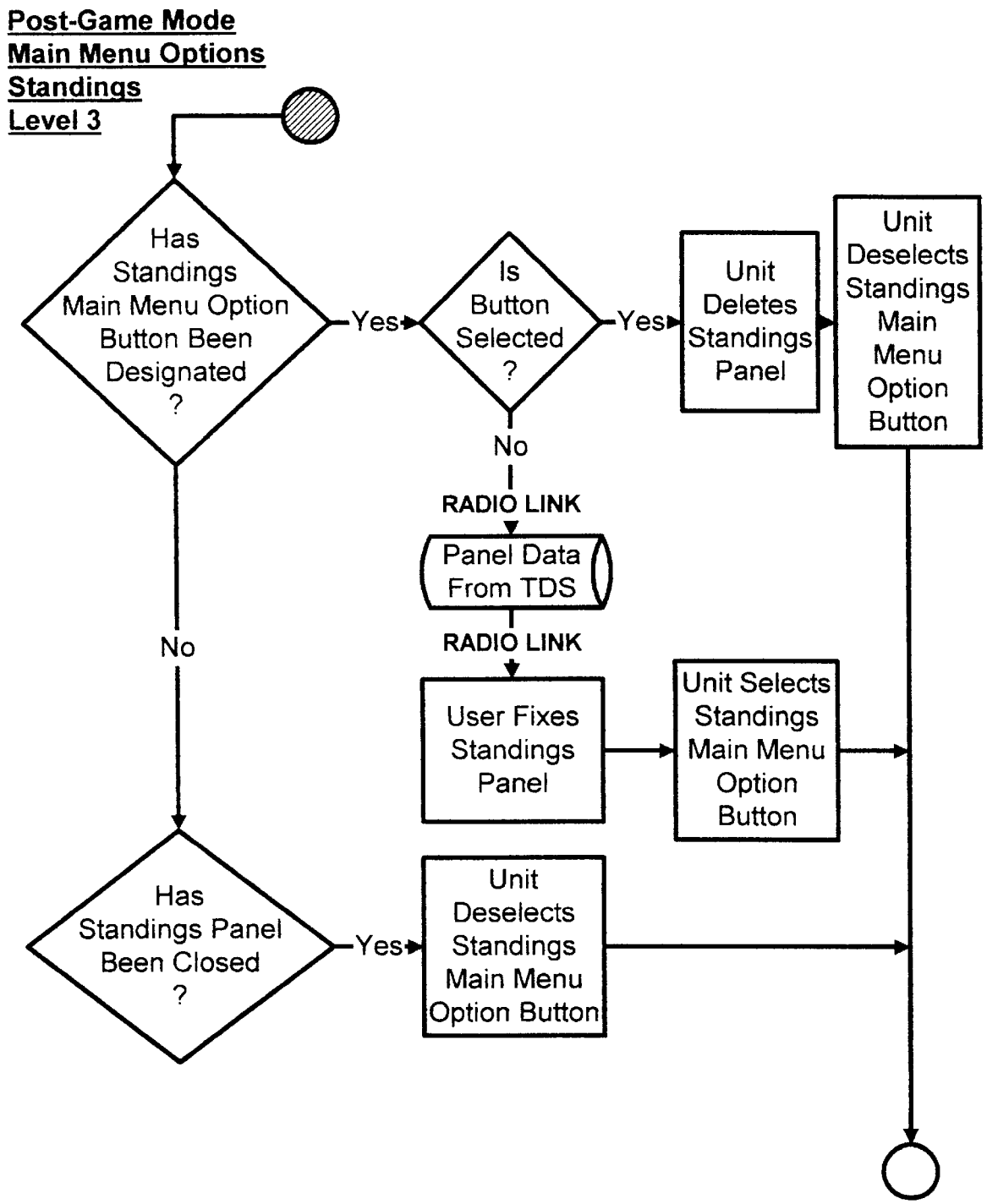
Figure 94:
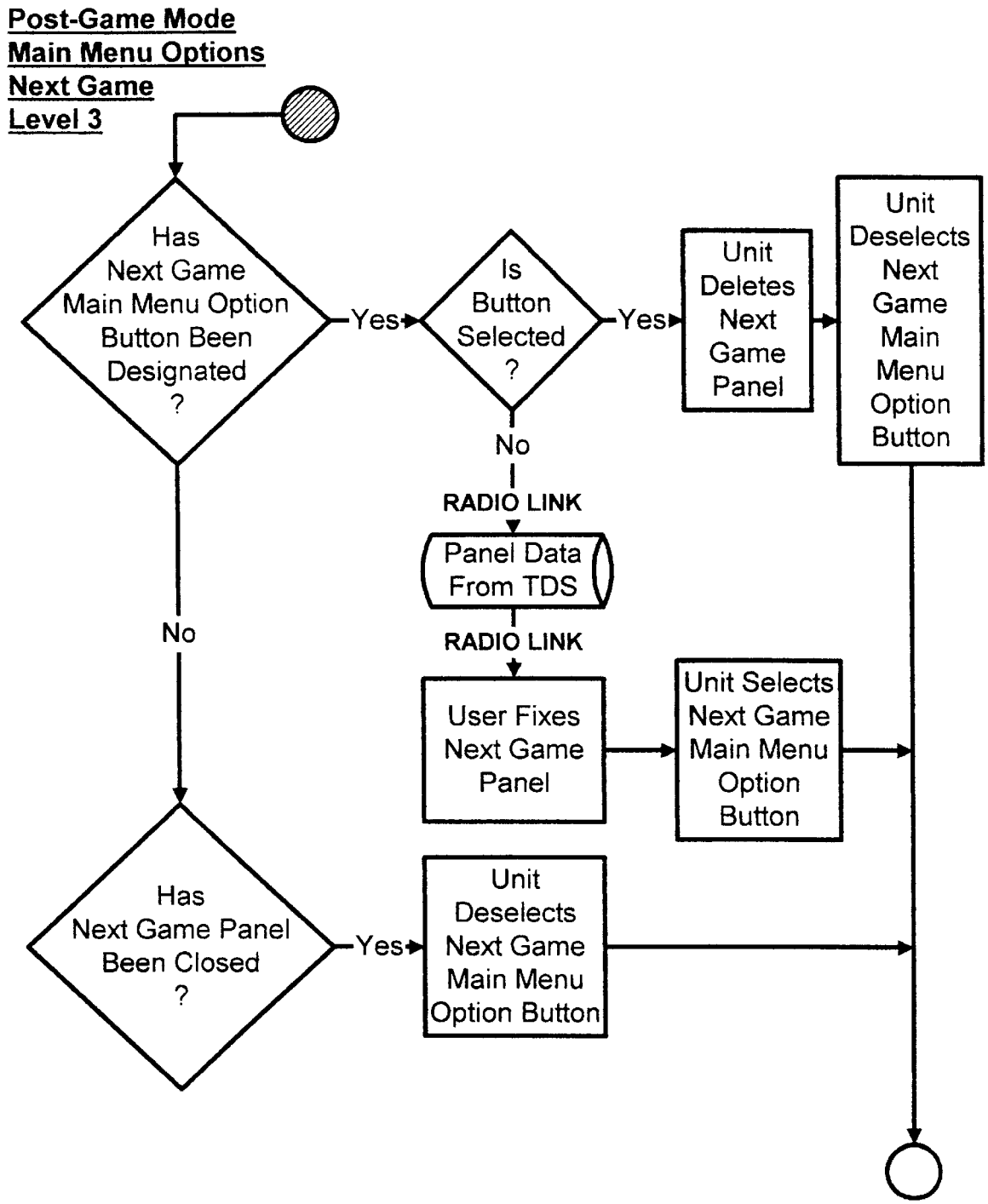
Figure 95:
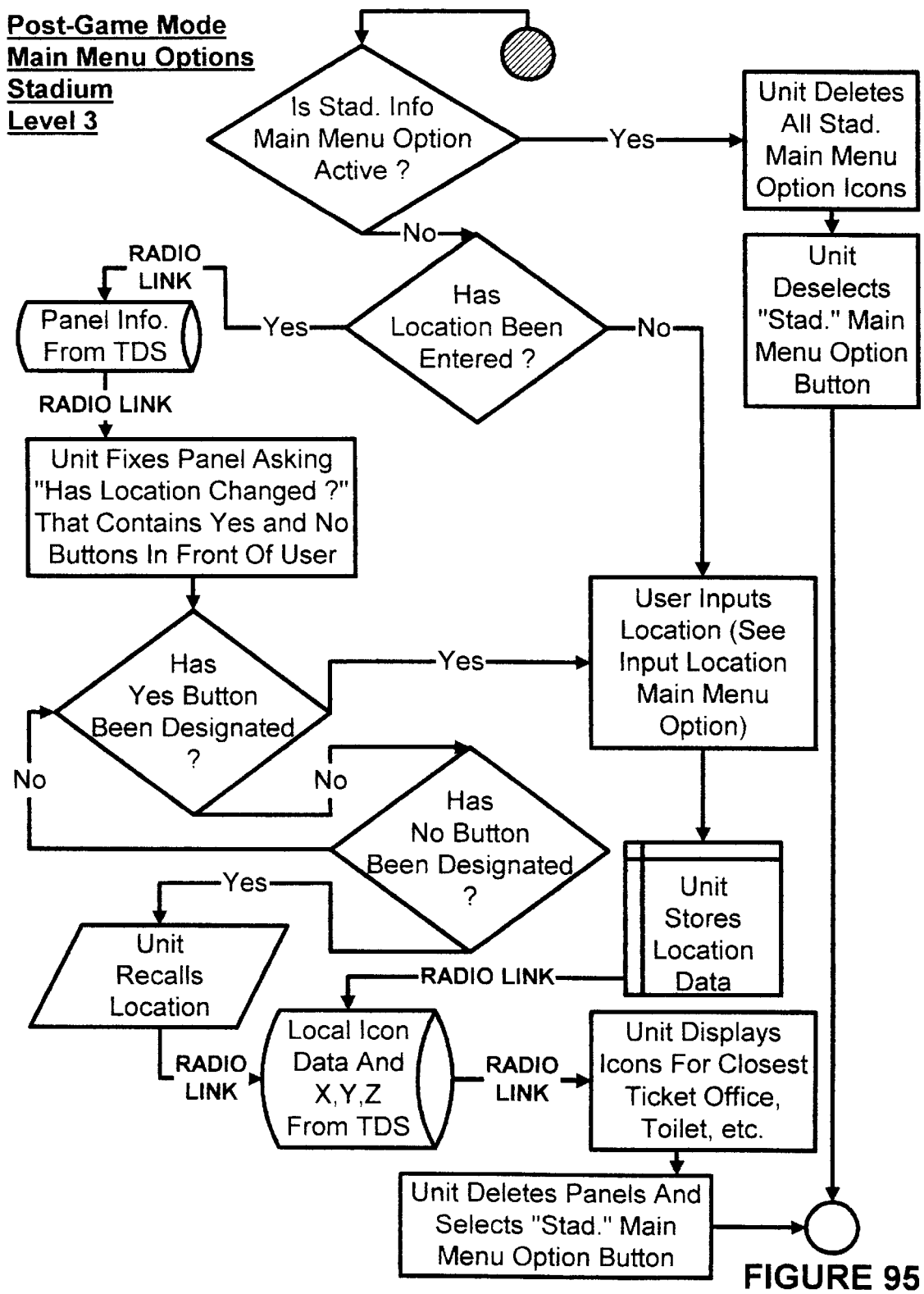
Figure 96:
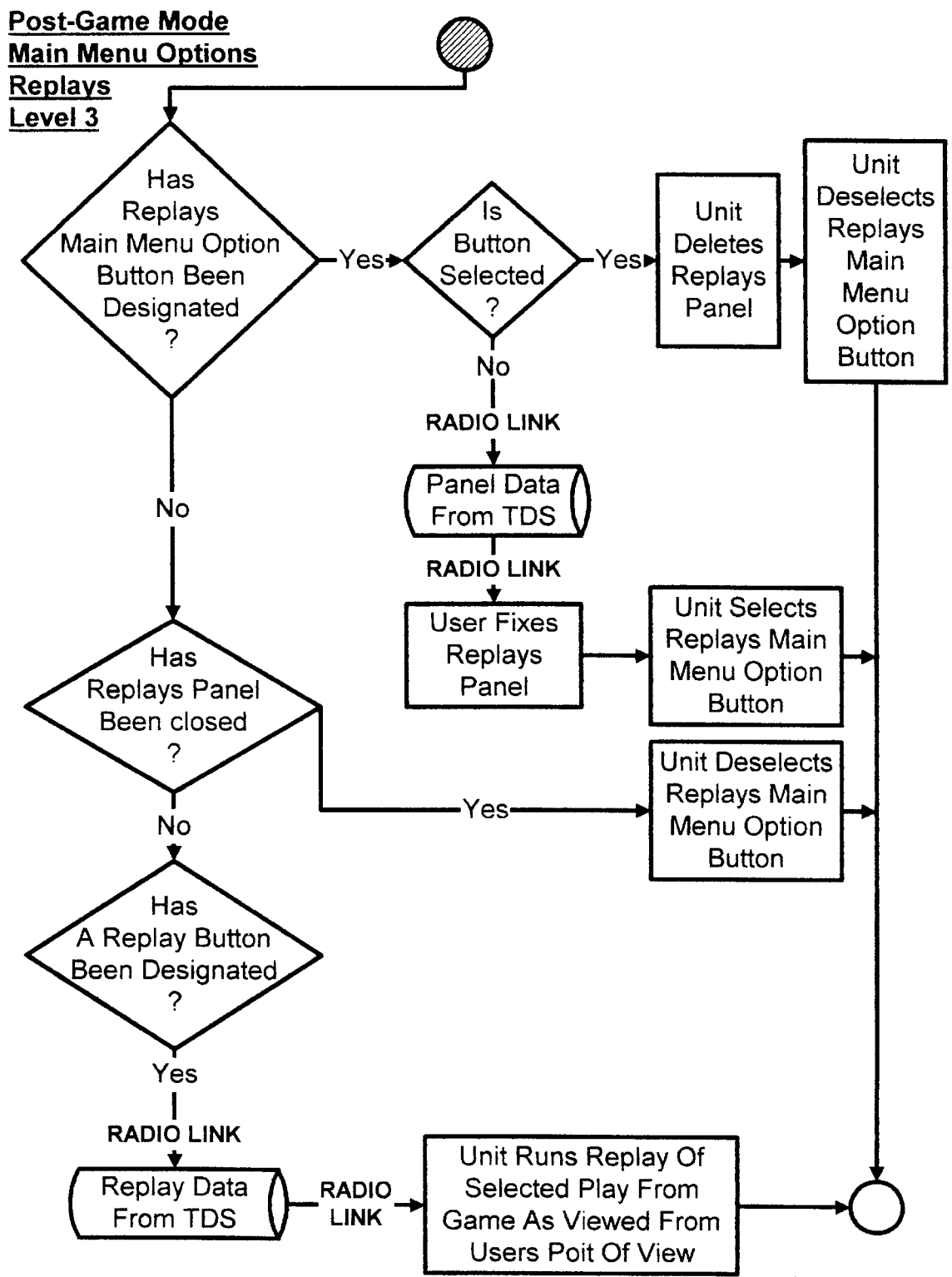
Figure 97:
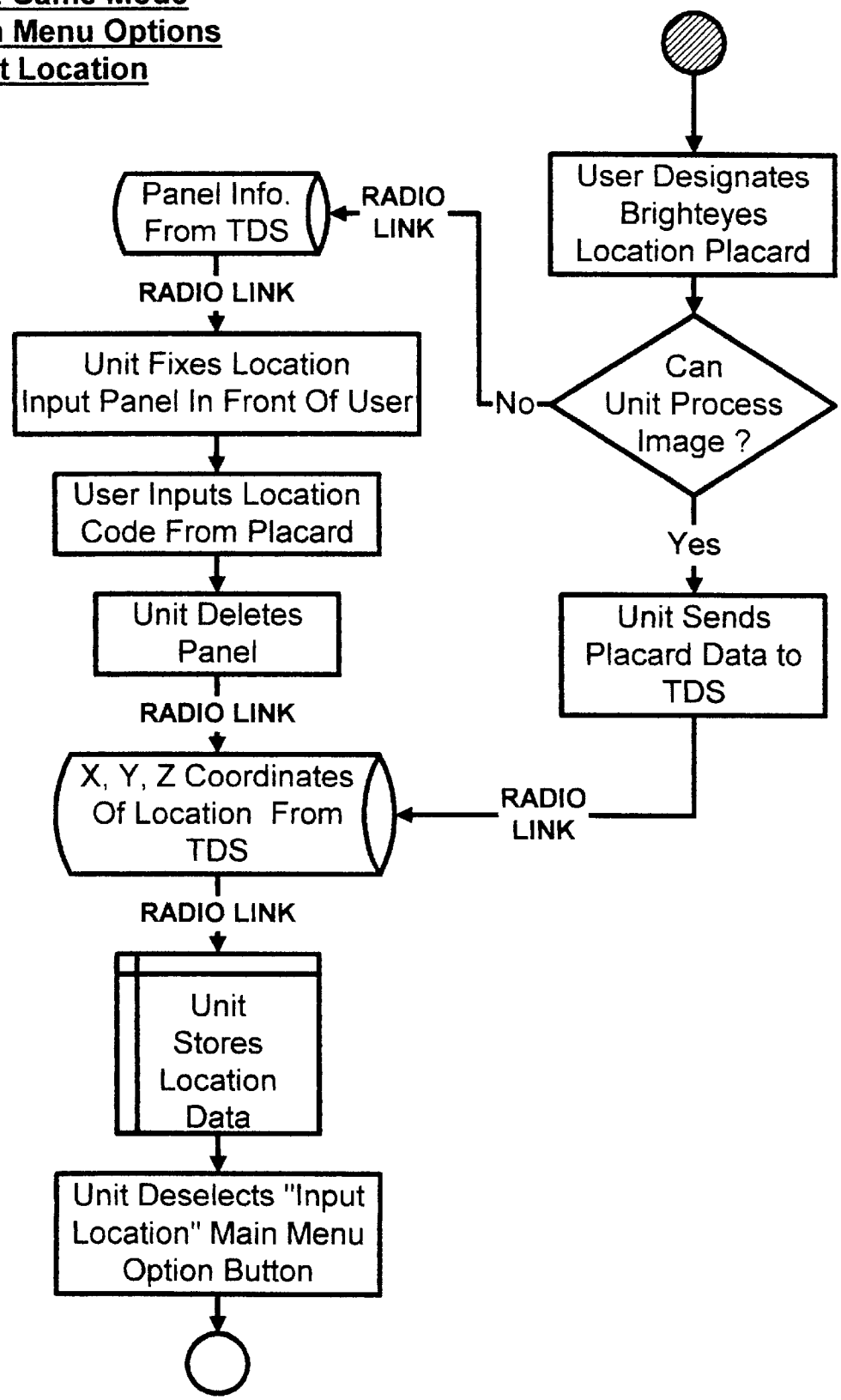

Three examples of composite images which are comprised of an image of a real scene and computer generated augmentation are presented as FIGS. 17, 18 and 19. FIG. 17 shows defensive players and the playing range of those players. FIG. 18 shows an image of computer generated ball tracks representing the last four hits of a particular batter superimposed onto an image of a baseball field. FIG. 19 shows a computer generated "strike zone" laid onto an image of a real scene. In addition, indicia relating to the batter may be displayed as text overlaid on an image.

Figure 16:
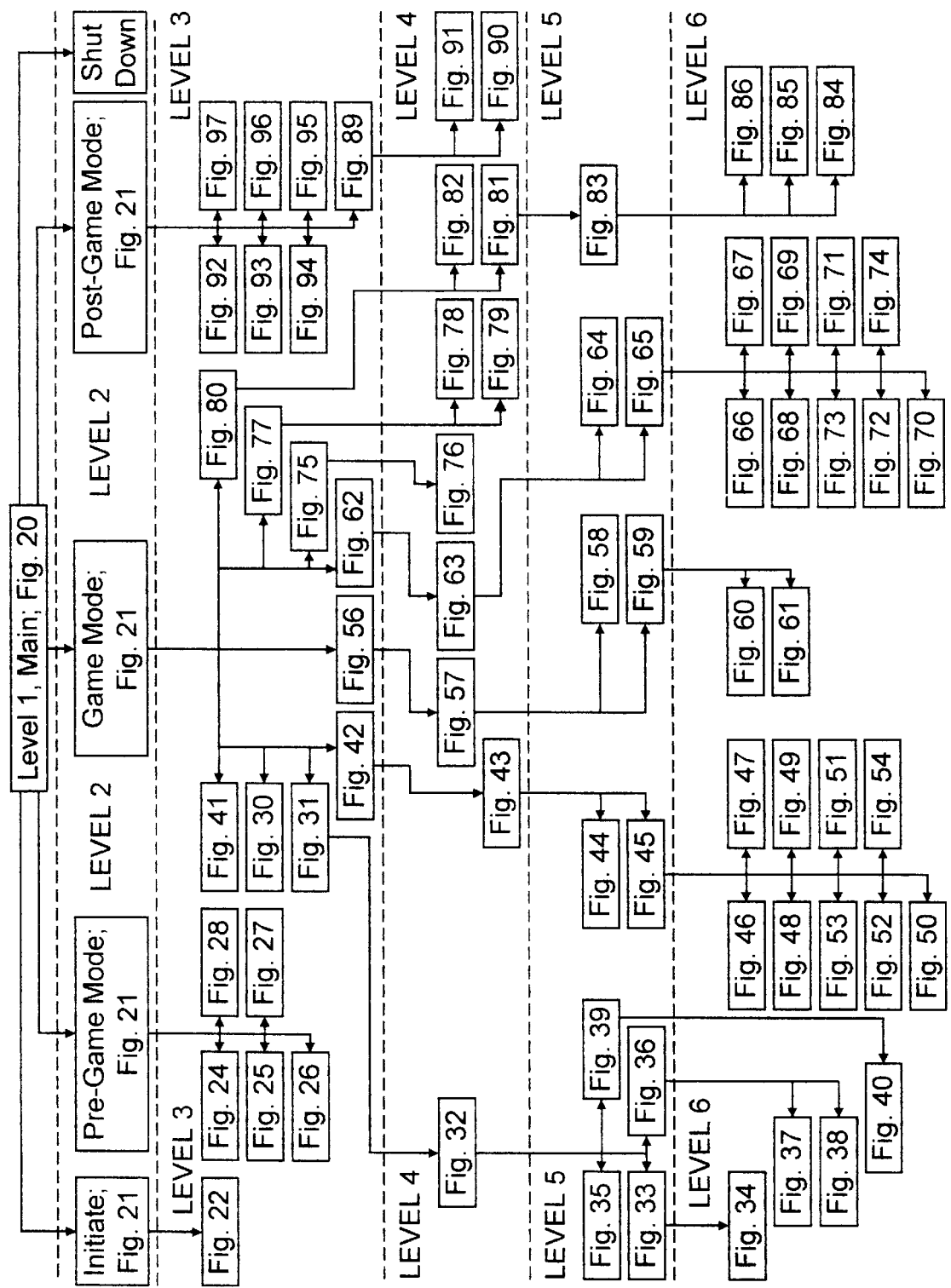
FIG. 16 shows a flow chart hierarchy for a version of the invention.

We teach the system operation of a typical embodiment with the help of flow diagrams to guide the reader through relationships of the various systems. We present the flow diagrams in various levels, the low numbered levels corresponding to fundamental processes and the higher numbered levels corresponding to detailed sub-processes. By correctly placing all higher level flow diagrams into their appropriate places in low level diagrams one could form a single flow diagram. The division onto many pages is for clarity. There is one continuous flow diagram. The flow diagram shows five modes of operation. The five modes are: initiate, pre-game, game, post game, and shut down. FIG. 16 shows how the levels cooperate.

INITIATE, FIG. 21

When the Brighteyes unit is first turned on it would go through a series of self tests 210 to check its hardware integrity and memory. It would then report unit health to the user and retrieve the hardware identification number from internal non-volatile storage. The unit would then request that the user, either orally or by way of a Panel, input their personal identification number 211. The unit would transmit both ID numbers to the Transaction Data System 48 via the two way radio link.

The Transaction Data System 48 would check 212 to see if the unit had been reported as stolen 221. If the unit had been reported stolen the unit would notify security that a suspected stolen Brighteyes unit had checked in to the system. The Transaction Data System 48 would bypass the Personal ID number and credit checks and appear to go into Pre-Game Mode 214 as normal. The Transaction Data System 48 would tag the unit number and when the unit reported a seat location the Transaction Data System 48 would notify security 222 as to the location of the suspected stolen unit.

If the unit was not reported as stolen the Transaction Data System 48 would then recall 223 the user ID number for the unit. If the ID number that was inputted by the user did not match 224 the stored number the Transaction Data System 48 would request a new input 225 from the Hand Held Unit twice. After the third attempt the unit would go into Pre-Game Mode, bypassing the credit check, but would report to security 226 that an unauthorized user had checked into the system. The Transaction Data System 48 would tag the unit number and when the unit reported a seat location the Transaction Data System 48 would notify security as to the location of the suspected user.

The Transaction Data System 48 would then check 227 the users credit to ensure there were sufficient funds to pay for the air time of the game. If sufficient funds were not available the Transaction Data System 48 would ask the unit to request 228 another credit card number from the user. If none were available the unit would be told to shutdown.

If the hardware ID number and the personal ID numbers matched and there was sufficient credit available the Transaction Data System 48 would check 229 to see if it had any record of a ticket for that user for that specific game. If there was a ticket number the Transaction Data System 48 would transmit the X, Y, Z coordinates of the seat to the Brighteyes hand held unit where it would be stored in the units internal memory and used to generate the units own personal set of coordinates in once the user was seated.

Once this sub-routine was completed the Transaction Data System 48 would download 213 all the necessary software to run the Baseball Application to the unit and the unit would activate Pre-Game Mode 214.

PRE-GAME MODE, FIG. 23

Pre-Game Mode is the mode of operation the unit operates in until the user changes to the primary mode of operation, Game Mode, and is activated automatically when the unit is turned on by the user. Pre-Game Mode has six Main Menu Options that allow the user to access information and/or interact with the unit.

Save Arrival Point 230

The Save Arrival Point Main Menu Option allows the user to input the point to which they would like to return to after the game is over. If the point is the location of a car the user would input the code for the parking space, i.e. Red, Row 34, Bay 23 by either designating the parking space code or, if the unit cannot process the image, manually inputting the code via a Panel. If the point was a bus stop, train station, or taxi stand the user would input the Brighteyes location code of that point by designating the location placard posted at the location or manually inputting the location code via a Panel if the unit cannot process the image. If the unit was equipped with a GPS receiver and the point was outdoors the location could be saved as a latitude-longitude position. The unit would store the location in its internal memory.

Input Location 231

The Input Location Main Menu Option allows the user to input their location within the stadium before they get to their seat. Locations around the outside and concourse of the stadium would have Brighteyes location placards, consisting of a number code, posted. The user would activate the Main Menu Option and designate 250 the placard. The unit would process 251 the image, read the code, transmit the code 252 to the Transaction Data System 48 and would receive 253, from the same system, an X ,Y, Z location in relation to the stadium datum. If the unit cannot process the image, the user would input 254 the location code manually via a Panel. If the unit was equipped with a GPS receiver and could see the sky the location update could be continuous up to the point that the unit loses GPS positioning. If the unit was equipped with an audio in/out system the user could activate the Main Menu Option and read the location placard data out loud enabling speech processing software known to the state of the art input the location code. This may be in addition to or in substitution for other means for defining location within the preferred embodiment. The unit then stores the acquired location data 255. The program flow then returns to the pre game mode main menu 256.

Input Seat Number 232

The Input Seat Number Main Menu Option allows the user to input a new seat number, if the user is a season ticket holder and not sitting in their usual seat, or input their seat number for that game. The user would activate the Main Menu Option, hold the ticket up and designate 260 the ticket. The unit would process the image 261, read the seat number, transmit the number to the Transaction Data System 48 and receive 262 an X, Y, Z coordinate for that seat number in relation to the stadium datum. If the unit could not process the ticket image, the user would manually input 263 the seat number via a Panel. If the unit was equipped with an audio in/out system the user could activate the Main Menu Option and read the seat number data out loud enabling speech processing software to input the location code. This may be in addition to or in substitution for other means for defining location within the best versions of the system.

Directions 233

The Directions Main Menu Option allows the user to get directions to their seat from the last saved location. When the Main Menu Option is activated the unit would check to see if a seat number has been saved 270. If one has not then the unit would prompt 271 the user to input the seat number. The unit would then ask 272 if the location has changed. If it has, the unit would prompt the user to input 273 the new location. The unit would then ask the user to fix the Directions Panel on a particular bearing so that as the user moves the Panel would move with them. The Panel would contain written directions 274 to the inputted seat number.

Stadium Information 234

The Stadium Information Main Menu Option allows the user to have icons representing various services available at the stadium fixed over their position. When the Main Menu Option was activated the unit would, if not getting location data from GPS, ask if the location has changed. If it has, the unit would prompt the user to input the new location as described. The unit would then fix icons representing the closest men's and ladies toilets, ticket office, security office, etc. at their locations in relation to the users position.

GAME MODE, FIG. 29

Game Mode is the primary mode of operation for the baseball application. It is active from the time the user activates it till the time that the user designates the Post-Game button on the Post-Game panel that the user fixed after the last out of the game. There are eight Main Menu Options in Game Mode, each allowing the user to interact with the unit and recall a myriad of information should they so desire. The Game Mode consists of the following routines: setup 290, auto, coach, scout 291, offense 292, defense 293, pitching 294, teams 295, stadium 296, and FUN! 297.

Setup 290

The Setup Main Menu Option allows the user to select and customize the way that basic information about the game is presented. Once seated, the user would go through the "setup" procedure for that specific game. The unit would display and fix 310 the Setup Panel in front of the user. This Panel would define how basic information relating to the game would be presented to the user. The Panel would contain a list of options, some of them, if turned on, generating user fixable Panels of their own. For example, a user sitting along the third base line designates the fix scoreline button on the Setup panel. The scoreline would appear in the center of the view. The user would then move the entire unit until the scoreline was positioned on the right field wall, press the designate key and then be able to look away, leaving the scoreline fixed on the wall. If "screen edge" option was designated, the information would appear along the bottom of the view. In this way the user can totally customize how they view the basic information pertaining to the game. The user could place the scoreline on the fence, the lineups on the backstop, the names of players left on the bench over the dugout, the names of players in the bullpen over the bullpen, the batters average and name over his head, the count, score, outs, and innings over home plate. This allows totally customized viewing without the need for a scoreboard. All the information, averages, lineups, etc., would be downloaded by the Transaction Data System 48 to the unit throughout the game via the digital radio link. This information would be updated by the Action Data System 46 and would change as the game progressed. The user may return to the Setup Main Menu Option at anytime to change the parameters they have previously selected. The user may save their favorite setups for each stadium they visit. If the user has a setup saved the unit would ask if the user would like a previously stored Setup. If the answer is yes then the setup automatically takes place. If the answer is no then the user would go through the setup procedure. It is possible that there could be several setup options saved for each stadium from which the user could select. The user may also enter a new seat number in the Setup Main Menu Option if they moved during the game, or the unit was being used by a user in another seat. The user may also save the existing set-up at any time by designating save Setup on the Setup Panel. To enter the new seat number the user would select the Setup Main Menu Option, designate the new seat number button and enter the new seat number. It is also possible that there be a "Multiple User" option in the set up Main Menu Option. If this option were selected by the user the unit would ask the user "how many users today?". If the user entered four then each person who would be using the unit throughout the game would be given a number one through four to identify themselves to the unit. They would each go through all of the steps in the "Set Up" Main Menu Option and the unit would remember all of their individual parameters. To switch between users the user would locate the Multiple Users Panel and designate the desired number button, or of the number of the user who wanted the unit next. As soon as the button was designated the parameters change and the graphics, and Panels would be seen from the point of view of the new user. The user may also select the Auto Option 380 which would execute a default setup. The Auto option may be turned on and off at will during the game by entering the Setup Main Menu Option.

Coach

The Coach option in the Setup Main Menu Option gives the user access to options on defensive and offensive alignments and informed predictions on the play of the game. When Coach is activated the user would fix the Coach Panel in the desired location. The Panel would consist of a selection for each team. When a team is designated Coach depending on whether that team is batting or fielding, would explain the defensive alignment of the fielders or predict the probable offensive strategy of the team. When the Coach is on he will also interject during the game e.g. "Watch the guy on first, he's a flyer". The information could be displayed in the left side of the view as a speech bubble coming from a caricature coach, or the report may be in the form of a full motion and sound film clip. The speech bubble would stay on the screen for a finite period and then disappear. The information would be stored either in the unit itself or in the stadium database and would be compiled through interviews with and analysis of past games by baseball experts.

Scout 291

The scout option in the Setup Main Menu Option would give the user access to expert opinion on the player's or team's offensive or defensive abilities. When the user designates the Scout a Panel that defines which player and what type of report would appear in front of the user. The user would then fix the Panel and select the desired option by moving the unit as a whole, placing the crosshair over the option and pressing the designate key. The "Visual Desig." option would be automatically active, until "Other" was designated, with the crosshair flashing. The user may then either select a player by placing the crosshair on that player, if he is visible, or designating his name in one of the player lists, lineup, bench, bullpen, that could have been placed around the park in the setup stage and then pushing the designate key. If the user selects "other" a new Panel would appear and fix itself in front of the user. The Panel would also enable the user to select a player from a team roster that has not already been fixed.

If Home or Visiting team is selected the complete roster of that team would fix itself in front of the user, the user would designate which player with the crosshair and the Panel would close. If the user selects "other team" the logos of all teams would fix themselves, ordered by division and record, in front of the user. The user would then designate the appropriate team and go through the steps previously described. By choosing one of the options the user would receive either an offensive or defensive scouting report on the desired player or a short biography of the player. The report would either appear on the left side of the screen and remain there until the user closed the report or be in the form of a film clip of a coach, for example, with full motion and sound. Depending upon the memory size of the unit, the information for the scouting reports could be stored within the unit or accessed from the Transaction Data System 48, via the two-way radio link, as needed. A variation of this would be to store the reports on the two teams playing the game in the unit and only access the Transaction Data System 48 for information on other teams. An example of an offensive scouting report would be, "Dead pull hitter, can't lay off the high outside fastball." An example of a defensive report would be, "Covers a lot of ground but has a weak arm." The information would be stored either in the unit itself or in the Transaction Data System 48 and would be compiled through interviews with and analysis of past games by baseball experts.

Auto Option 380

The Auto Main Menu Option would allow the user to take advantage off all the different aspects of the Brighteyes Baseball Application without having to touch another key or switch on the unit. They simply have to look through the unit at the appropriate moment, and at the appropriate place to see the pre-programmed information, in the form of text or graphics, the unit would be displaying for the user. The unit would either access information it needed from it's own memory, or download it via the two way digital radio link. The Auto Option would still allow the user to set seat location, so it could be changed throughout the game. All the Main Menu Options with the exceptions of Setup and Auto would be locked out until Auto had been deactivated. In the Setup Main Menu Option the only active options would be those relating to new or multiple seat numbers. If the unit was equipped with GPS and was receiving positional data from this system the Setup Main Menu Option would also be locked out until Auto was deactivated. To input a new or additional seat number the user would select the temporary Seat Main Menu Option. The same method of seat selection described would be used. The "Seat" option would not be necessary if the unit was equipped with GPS, and was operating in a stadium that had GPS pseudo satellites. The only option left in the main menu in this case would be "Set Up". The unit would display a set selection of Panel and icons throughout the entire game. The user would go through the placement process to fix each Panel in the desired location in the stadium. This allows the user to customize viewing for their individual point of view.

All the information would be constantly updated and displayed automatically by the unit. The unit would receive information from its memory, and transmissions from the stadiums Action and Transaction Data System 48 48s needed for the display. When the Auto Main Menu Option is deactivated the unit reverts to the set-up that was active at the time Auto was activated.

Offense 292

The "Offense" Main Menu Option gives the user access, both graphically and statistically, to information regarding Offense play about the selected player or team. When the user selects 400 the "Offense" Main Menu Option by using the scrolling key and pressing the Main Menu Option activate key the user would asked to fix 401 the "Offense" Panel where desired. On one side this Panel would allow the user to define 402 the player or team they are interested in, turn on or off the statistics and graphics options and the "Statistics Parameters" sub-Panel.

On the other side of the "Offense" Panel the statistics as defined in the "Statistics Parameters" sub-Panel would be displayed along with a Batting/Running button. Batting statistics would consist of RBIs, runs ,batting avg., hits, home runs, et cetera Running statistics would consist of stolen bases, attempts, runs, caught stealing, etc. As different players where designated the Panel would change to display the statistics of the designated player.

If "Area Graphics" 411 was turned on the unit would display the area of the field that the ball is most likely to be hit into. This area would be viewed from the users perspective and its location would be defined by the parameters set in the "Offensive Graphics Main" Panel.

If "Full Graphics" 412 was turned on the unit would show, in the form of colored lines defining the path of the ball from the batters strike zone, all the hits and outs, and where and how far they go, as defined by the parameters in the "Offensive Graphics Main" Panel. The view of these lines would be specific to the perspective of the user. The user could see the tracks of the hits/outs as they would appear from his specific position.

When either of the Graphics options was turned on for the first time, the unit would ask the user to fix 413 the "Offense Graphics Main" Panel. The best location for this Panel would probably be "stacked" with the "Offense" Panel. This Panel consists of all the different parameters that affect the offensive graphics displayed. The sub-Panel in this Panel would cover parameters ranging from the time period to pitch location and include a default setting. When the user has made the desired selections, or changes, the user would select OK and the unit would display the appropriate graphics.

The balltracks or lines would be stored in the unit or in the stadium database. They would be stored as digital information and would be entered either by an ultra fine radar tracking system in each stadium, or by one or several data entry personnel at the stadium as the game progressed. Initially the tracks would have to be entered manually to get the database going. As soon as the database was operational, having all information, statistics, results, balltracks for players still in the league, ball tracks for great players from the past, etc. for the entire history of baseball, then the information would be entered up to the second in each stadium across the country or world. The databases in each stadium would be linked to each other and they would all receive the same information.

The information needed for the displayed items, statistics, ball trajectories, etc., would be either stored in the memory of the unit, or, in the case of a unit with limited memory, downloaded via the two way digital radio link from the stadium database when requested by the user. As soon as the user had finished using information downloaded via the digital radio it could delete it from it's memory and if deleted the unit would have to access the database again if the same information was needed by the user.

Defense 293

The "Defense" Main Menu Option gives the user access, both statistically and graphically, to defensive information about a selected player or team. When the user selects 541 "Defense" the user would fix 542 the "Defense" Panel. On one side this Panel would allow the user to define which player or teams statistics will be displayed, turn on or off the statistics and graphics options and set 551 the "Statistics Parameters" sub-Panel. On the other side the statistics as defined by the selections would be displayed 552.

Defensive statistics could consist of chances, errors, assists, fielding %, throwing arm of player, etc. If the player selected is a catcher the number of runners thrown out stealing and % thrown out would be included in the statistics list. All statistics would be in the unit memory, or down loaded as needed from the stadium database. As different players where designated the Panel would change to display the statistics of the designated player.

Figure 10:
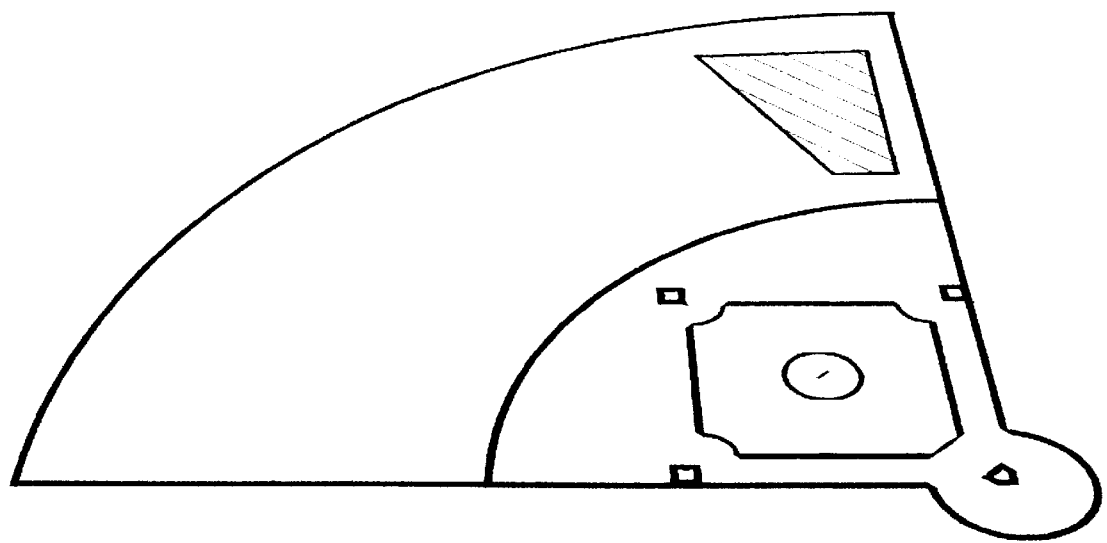
Figure 11:
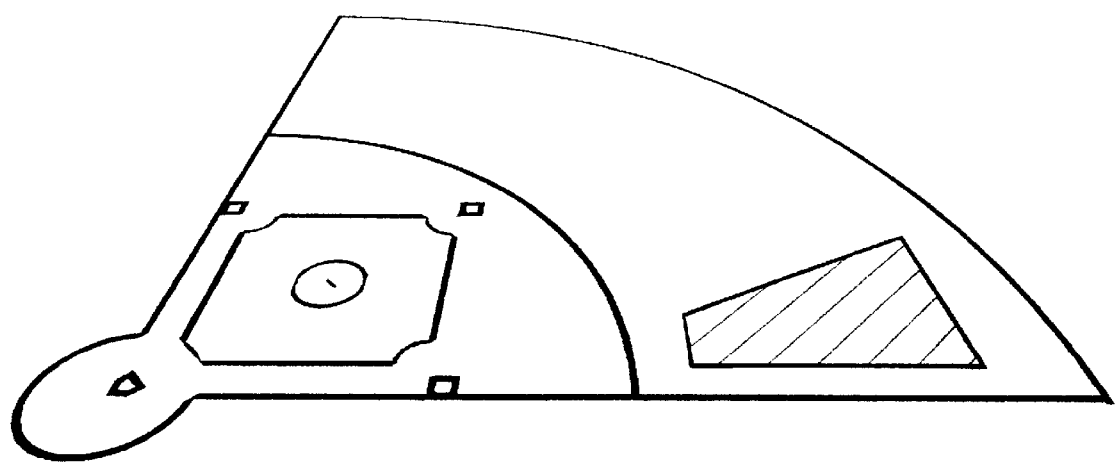

If "Graphics" is turned on, the unit would graphically represent, in the form of 'domes', the defensive range of the selected players according to the selections made in the "Graphics Parameters" Panel. The defensive range of a player is defined by the players physical ability along with distance from the plate and velocity of the batted ball. This is illustrated in FIG. 10. Before the pitch is thrown, the defensive bubble would be displayed as defined in the "Graphics Parameters" Panel. If the velocity of the struck ball can be measured, and the data sent to the unit, in near real time the defensive bubble would shrink or grow accordingly. When "Graphics" turned on for the first time the unit would ask the user to fix "Graphics Parameters" Panel. This Panel would allow the user to select the players who have their bubbles displayed and also select the strength of the hit. This Panel, would define the configuration of the defensive bubbles before the ball was struck. The information would be stored either in the unit itself or in the stadium database and would be compiled through interviews with and analysis of past games by baseball experts.

Pitching 294

The "Pitching" Main Menu Option gives the user access, both graphically and statistically, to pitching information about the selected player or team. When the user selects the "Pitching" Main Menu Option the user would be asked to fix the Pitching Panel. On one side this Panel would allow the user to define the pitcher or team they are interested in, turn on or off the graphics and statistics options and set the "Statistics Parameters" sub-Panel.

On the other side of the Pitching Panel the statistics as defined in the Statistics Parameters sub-Panel would be displayed. Pitching statistics would consist of ERA, wonlost record, strike outs, walks, wild pitches, innings pitched, run against, saves, appearances, etc. As different pitchers where designated the Panel would change to display the statistics of the designated pitcher.

If "Area Graphics" was turned on the unit would display the area of the field that the ball is most likely to be hit into. This area would be viewed from the users perspective and its location would be defined by the parameters set in the "Pitching Graphics Main" Panel.

If "Full Graphics" was turned on the unit would show, in the form of colored lines defining the path of the ball from the batters strike zone, all the hits and outs against the selected pitcher, and where and how far they go, as defined by the parameters in the "Pitching Graphics Main" Panel. The view of these lines would be specific to the perspective of the user. i.e. The user could see the tracks of the hits/outs as they would appear from his specific position.

When either of the "Graphics" is turned on for the first time the unit would ask the user to fix the "Pitching Graphics Main" Panel. This Panel would probably be "stacked" with the "Pitching" Panel. This Panel consists of all the different parameters that affect the pitching graphics displayed. The sub-Panel in this Panel would cover parameters ranging from time period to pitch location and playing conditions and include a default setting.

When the user has made the desired selections, or changes, the user would select OK and the unit would display the appropriate graphics.

The information needed for the displayed items, statistics, balltracks, et cetera, would be either stored in the memory of the unit, or, in the case of a unit with limited memory, downloaded via the two way digital radio link from the stadium database when requested by the user. As soon as the user had finished using information downloaded via the digital radio it would delete it from it's memory. The unit would have to access the database again if the same information was needed by the user.

Teams 295

The "Teams" Main Menu Option gives the user access to, and the ability to fix around the stadium, lists of players or team schedules. These lists may also be used to designate players for other Main Menu Options such as Offense and Pitching. If the user selects "Teams" the unit would display and the user would fix a Panel, the "Team Select" Panel.

If the user selects "Other Team" the unit would fix the logos of all teams, ordered according to division and standing, as a Panel in front of the user. On one side of the Panel the National League would be displayed and on the other side the American League. The user would then select a team, the Logos Panel would be deleted and the user fix that teams entire roster as a Panel. If the home or visiting team was selected the user would fix the Roster Type Panel consisting of "Lineup", "Bullpen", "Bench" and "Schedule" buttons. The user would select the desired list and the selected list would be fixed as a Panel by the user. If "Schedule" was selected the teams schedule, including information on previous wins and losses, times of games etc. would appear as a Panel and be fixed by the user.

Stadium 296

The Stadium Main Menu Option gives the user access to information about stadium services, amenities and infrastructure and visually displays the information to the user. If the user selects "Stadium" the unit would display the Stadium Main Panel which would be fixed where desired. This Panel would contain all the different categories available to the user.

As the various category buttons on the Stadium Main Panel are designated icons representing the closest locations in the selected categories, based upon the selections made in Stadium Options, would be displayed or deleted throughout the stadium. These icons would be displayed either directly over the location, if it is visible, or over the nearest door to the actual location of the selection with appropriate arrows/ directions. If the user selected the "Stadium Options" Main Menu Option the unit would display, as a Panel to be fixed by the user, the "Stadium Options" Panel listing all the option in each category. By making the appropriate selections the user can define what is displayed in the "Stadium" Main Menu Option.

FUN! 297

When the Fun! Main Menu Option is activated the user would be asked to fix the Fun! Main Menu Panel. On one side the panel would contain the interactive sub-panels and on the other the reenactment sub-panel.

Interactive Betting and Gambling

The "Interactive" sub-panels allow the user to try and predict what is going to happen during the game.

The Real Money sub-Panel gives the user the choice of betting real money, in states where this is legal of course, or "Fun Money" by way of a switch set to one or the other. The unit would know if this type of gambling was legal in that state and if it was not would not display the Real Money sub-Panel, instead automatically setting "Fun Money" as the coinage for the interactive sub-Panel. If "Fun Money" is selected the user is given a set amount of "fun dollars" which may be wagered in the games. At the end of the game the three Brighteyes user at the game with the most "fun dollars" would win prizes. If real cold hard cash was selected the unit would check the users credit, via the Transaction Data System 48 and inform them of their limit. If there was insufficient credit available the unit would inform the user and switch to Fun Money. All losses and gains would be credited or debited to or from the appropriate Real or Fun Money accounts and would be displayed on the screen edge.

The Bet sub-Panel allows the user to set amount they would bet per selection. To set an amount the user would 'click' on the different notes until the desired total is reached, i.e. to bet fifteen dollars the 'five' would be designated three times. The amount would remain unaltered until the user selected "Change" and then reentered a new amount. The on/off switch in the real money option is to enable the gambler to take a break, or practice for a while, and play the games without any wagering. The reason for not having this switch in Fun Money option is that the user has nothing real to lose and everything to gain.

The "Ghost Fielder" sub-Panel gives the user access to the first game. To play the user would switch on, set a bet amount per fielder moved, designate "Select" and then designate which fielder or fielders they feel are in the wrong position. The user would then position 'ghost images' of these fielders in the positions on the field they desire and designate the "OK" button. The unit, or central database, would then track the next ball in fair ground. If the ball passed through the ghosts 'defensive bubble' and not through the real players bubble the user would win. If the ball passed through the ghosts 'defensive bubble' and through the real players bubble the user would lose. If the ball passed through the real players bubble and not through the ghosts the user would lose. If the ball passed through the real fielders bubble and also through another unselected fielders bubble the bet would be off. If the ball passed through neither bubble the bet would be off. After each fair ball the ghost images would disappear. This game would require tracking of the ball, including altitude.

The "Pick-a-Patch" sub-Panel would give the player access to a game that lets them try to predict where the next fair ball would first hit the ground or if caught where the fielder is either standing or lands. To play the player would turn on the sub-Panel, set a bet amount if different from that displayed, designate the Pick-a-Patch button and then pick their "patch" by targeting the desired area with the crosshair and pressing the designate key. Only one patch may picked per play and it would have to be at least partially in fair territory. Once the player is satisfied with the patch they have picked they would designate the OK button in the associated Panel. The "patch" would be represented by a 5' diameter, at field level, red circle centered on the selected position as it would be seen relative to the user. The odds would increase the further from home plate the patch was. If the ball or player who caught the ball was in their patch the player would win.

The "Predict Score" sub-Panel allows the player to try and predict the final outcome of the game, the winning pitcher and the player that drives in the winning run. The player may bet on all or some of the options with the same or different amounts as they see fit. To select a final score the user would designate the score button. A Panel containing the team names and numbers one to nine would be fixed in front of the user, the user would designate each team name and score and designate "OK". The selected score would be entered as the prediction. The score prediction could be changed for the first three innings, with lower and lower odds, and at the end of the third would be fixed. The names of the winning pitcher and player who drove in the winning run would be entered by designating the appropriate button and designating the name from rosters fixed in front of the user in the normal way. Each players odds would be different according to their seasons performance in the appropriate categories. The names could only be put in before the first pitch. If the final score was predicted, before the game, and the correct two names were also picked, the Trifecta, the user would win a substantial prize.

The Fun Main Menu Option would also contain a reenactment sub-panel. This sub-panel would contain buttons for historical events that have taken place in that stadium and buttons for different groupings of reenactments. When the History button is designated the unit would display or delete icons around the stadium that mark a historic spot in the stadiums history. For example, there is a history icon located in the left field bullpen area. The user would place the crosshair of their unit over the icon and press the designate key. The icon would change to a description of the historical significance of the spot, a "Re-enact" button and a 'Done' button. In this example the description would read, "Hank Aaron's 715th home run to break the Babe Ruth's record. Hit on Apr. 8th, 1974". If the user designated the "Re-enact" button the user would see, from their perspective, a computer animated version of the actual event. The animated sequence would be down loaded from the Transaction Data System 48 and the unit would block out all present players and replace them with images generated by the computer. When the re-enactment was started by designating home plate the animation sequence would run, complete with audio. They would see Hank Aaron hit that home run, and it would be seen by them as if they were there, occupying the very seat that they were sitting in for the present game. Not the same old footage run on television. The user could view the action again by designating the "Re-enact" button, or close the description by designating the "Done" button. The description would disappear and the icon would reappear over the historic spot. The number and placement of these icons would depend on which stadium you were at. Chicago's Wrigley field would have a great deal of historic icons due to the age if the stadium, but a fairly new stadium like Baltimore's Camden Yards would have relatively few historical icons.

The re-enact sub-panel would also have several buttons, such as the "This Day in Baseball" button, that when designated would ask the user to fix a panel containing related reenactment buttons. If this button was designated the unit, knowing what date it was by referring to it's internal clock, or querying the Transaction Data System 48, would list several historic events that had taken place that date. The user would designate an event button and a "Description" Panel for that event would appear on the screen. The "Description" Panel would be exactly like the historical "Description" Panel with a "Re-enact" button and a "Close" button. If the user chose to re-enact the event the database would down load the computer animated sequence complete with audio. The surroundings would gradually change, as viewed through the unit, and the user would find themselves seated in either a totally different stadium, but in a seat with the exact view of the field as their view of the real game, or in the same stadium years ago in the same seat. The playing field, especially the infield diamond, would still be the real surface they were seeing that day, and the animation would take place on top of that surface. If the user were seated in a seat that did not exist in the stadium they appear to be in they would see the re-enactment as if they were floating in mid air. If their seat position was located such that their ability to see the playing field was blocked, then these obstructions would automatically be removed from the field of view so the user's perspective of the playing field would remain the same. The user would watch the event until the sequence was complete and then the view would morph back to the present day view of the stadium. The user could either view the sequence again, or close the description with the close button located on the description Panel. There would also be other buttons that covered other types of plays such as Homers of the month, Pitching magic and Flying fielders that would function exactly the same way as "This day in Baseball".

Once an option had been designated the unit would fix a Panel listing the individual plays on the bore sight in front of the user and the user would designate the desired play. After the desired play had been designated the Panel would be deleted and the unit would fix the "Description" Panel for that play, and re-enact the designated play from the users perspective if desired.

The Fun Main Menu Panel would also have a "Fantasy Player" sub-panel. This would allow the user to make an existing player appear to look like a great player from the past, uniform and all. The user could, for instance, make it look like Willie Mays, the "Say Hey Kid", was playing center, instead of some green rookie who had just been called up from the minor leagues. It could not make the player play any differently, it would just make him appear, only while viewed through the Brighteyes unit, to be someone else. The user would designate the "Fantasy Player" option and a Panel containing a list of players from the past would be fixed by user. The list would include a button for each name. The user would designate a player from the list. The crosshairs would now be blinking, and the user would designate the real player they wished to cover up with their Brighteyes. The player designated would be replaced by the player previously chosen from the list. The user could access information about the Fantasy Player just as they could a normal player. To cancel the effect the user would return to the Fantasy Player Panel and switch the player's name off.

POST GAME MODE, FIG. 86

Post Game Mode is active from the time that the Post Game Button on the Post Game Panel in Game Mode has been designated, and confirmed, until the time that unit is turned off. There are seven Main Menu Options in Post Game Mode. The Post Game Mode consists of the following routines: Transport, Box Score, Standings, Next Game Info., Stadium, Game Replays, and Location.

Transport

The Transport Main Menu Option gives the user access to directions to the various methods of transport available at that stadium. When the Main Menu Option is activated, the unit will ask the user to fix the Transport Panel on bearing only. This is so that the Panel will stay in the same place in relation to the user when the user moves. The user may ask for directions to the stored arrival point (see Pre Game Mode), the nearest taxi stand or, if available, bus stops or trains. To receive directions the user simply designates the desired selection. If arrival point or taxi was designated the appropriate directions would appropriate directions would appear on the other side of the Transport Panel, once again on bearing only. This Panel would contain a list of available buses or trains. When a specific bus or train has been designated the directions to that site would be displayed of the "back side" of the Transport Panel as before. All directions would be from the last saved location.

Box Score

The Box Score Main Menu Option allows the user to fix the box score of the game as a Panel to be looked at later.

Standings

The Standings Main Menu Option allows the user to fix the current league standings as a Panel, National on one side and American on the other.

Next Game

The Next Game Main Menu Option Allows the user to fix next game information as a Panel. This information would be: location, start time, opposing team, and anticipated pitchers.

Stadium

The Post-Game Mode Stadium Main Menu Option functions in exactly the same way as the Game Mode Stadium main Menu Option.

Replays

The Replays Main Menu Option gives the user access to a list of replays from the just completed game. When the option is activated the user would fix the Replay Panel. This Panel would contain the list of replays available. By designating the desired replay the user would see the play run again from the perspective of their seat during the game or, in the case of multiple users, from the perspective of the last user. Note that the user does not have to be in their seat to see a replay but they must be within range of the Transaction Data System 48 radio link.

Location

The Location Main Menu Option allows the user to input their location around the stadium. The Post Game Mode Location Main Menu Option functions exactly as the Pre-Game Mode Location Main Menu Option does.

Although the present invention has been described in considerable detail with reference to certain preferred versions thereof, other versions are possible. Therefore, the spirit and scope of the appended claims should not be limited to the description of the preferred versions presented here. In particular, it would be an obvious extension of the invention to other sports which are enjoyed by spectators.

What is claimed is:

1. An electro-optic vision system comprising:
    a camera for producing an electronic image of a scene being addressed;
    a position and attitude determining means for determining the position and attitude of the vision system;
    a data store responsive to outputs of position and attitude determining means, the data store having information stored therein;
    a computer operable for combining the stored information with the electronic image to produce an augmented image;
    and an electro-optic display operable for displaying the augmented image.

2. A vision system of claim 1, further comprising transducers in communication with the computer, the transducers being fixed about an event forum and directed to make measurements from objects within a field of interest whereby said measurements are converted into information which relates to the scene being addressed.

3. An apparatus of claim 2, said transducers being operable for measuring the dynamic position of an element from the group; players; baseball; coaches; referees; umpires; bat, in play.

4. A vision system of claim 1, said position determining means being further comprised of a plurality of transducers at fixed locations about the event forum operable for transmitting a signal which enables said computer to determine the position of the camera.

5. A vision system of claim 1, further comprising an electro-optic display operable for displaying the augmented image, said position determining means being further comprised of a second data store having prior knowledge of seating locations about an event stadium, and a means to enter a spectator seat number.

6. A vision system of claim 1, said data store further comprising recorded data which represents events from a previous time in a format that can be combined with images of a real scene being addressed by said camera.

7. A vision system of claim 1, said data store further comprising recorded data which represents symbols in a format that can be combined with the images of a real scene being addressed by the camera.

8. A vision system of claim 1, said electro-optic display further being operable for displaying the augmented image, said data store further comprising recorded data which represents statistical information in a format that can be combined with the images of a real scene being addressed by the camera.

9. A vision system of claim 1, said data store further comprising recorded data which represents action traces in a format that can be combined with the images of a real scene being addressed by the camera.

10. A vision system of claim 1, said data store further comprising recorded data which represents computer graphical interface devices in a format that can be combined with the images of a real scene being addressed by the camera.

* * * * *